United States Patent
Van Gerwen et al.

(10) Patent No.: US 10,736,329 B2
(45) Date of Patent: Aug. 11, 2020

(54) FOOD FORMING CONCEPT

(71) Applicant: GEA FOOD SOLUTIONS BAKEL B.V., Bakel (NL)

(72) Inventors: Hendrikus Petrus Gerardus Van Gerwen, Someren (NL); Petrus Hubertus Maria Schoenmakers, Gennep (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 37 days.

(21) Appl. No.: 16/139,202

(22) Filed: Sep. 24, 2018

(65) Prior Publication Data

US 2019/0053498 A1 Feb. 21, 2019

Related U.S. Application Data

(62) Division of application No. 14/764,664, filed as application No. PCT/EP2014/052050 on Feb. 3, 2014, now Pat. No. 10,182,575.

(30) Foreign Application Priority Data

Feb. 1, 2013 (EP) .................................... 13153652
Apr. 16, 2013 (EP) .................................... 13163855

(Continued)

(51) Int. Cl.
*A22C 7/00* (2006.01)
*A23P 30/10* (2016.01)
(Continued)

(52) U.S. Cl.
CPC ............ *A21C 5/003* (2013.01); *A22C 7/0069* (2013.01); *A23P 30/10* (2016.08); *B29C 31/006* (2013.01)

(58) Field of Classification Search
CPC .............................. A22C 7/0069; A23P 30/10
See application file for complete search history.

(56) References Cited

U.S. PATENT DOCUMENTS 2,235,492 A   3/1941 Weidenmiller
2,651,808 A   9/1953 Burnett et al.
(Continued)

FOREIGN PATENT DOCUMENTS

CN    1949981 A      4/2007
CN    102480977 A    5/2012
(Continued)

OTHER PUBLICATIONS

Potentially related Appliation. U.S. Appl. No. 13/982,377, Published as U.S. Pat. No. 2013/0337128, dated Dec. 19, 2013.
(Continued)

*Primary Examiner* — James P Mackey
(74) *Attorney, Agent, or Firm* — The Dobrusin Law Firm, P.C.

(57) ABSTRACT

The present invention relates to a food forming drum comprising a multitude of rows product cavities, each row comprising a multitude of product cavities, wherein the product cavities are provided as one or more at least partially porous members made from a porous material with interconnecting pores. The present invention further relates to a food forming apparatus comprising a food forming drum and a porous member. Additionally, the present invention relates to a movable unit to transport a drum and a method to change a drum or clean the food forming apparatus.

12 Claims, 44 Drawing Sheets

(30) Foreign Application Priority Data

May 24, 2013 (EP) .................................... 13169224
Oct. 16, 2013 (EP) .................................... 13188962

(51) Int. Cl.
*A21C 5/00* (2006.01)
*B29C 31/00* (2006.01)

(56) References Cited

U.S. PATENT DOCUMENTS

| | | | |
|---|---|---|---|
| 2,657,423 A | 11/1953 | Elsaesser | |
| 3,177,524 A | 4/1965 | Gause | |
| 3,205,837 A | 9/1965 | Fay | |
| 3,213,486 A | 10/1965 | Blake | |
| 3,347,176 A | 10/1967 | Hall | |
| 3,416,466 A | 12/1968 | Weidenmiller | |
| 3,427,649 A | 2/1969 | Fay | |
| 3,501,807 A | 3/1970 | Selbach | |
| 3,503,342 A | 3/1970 | Ilines | |
| 3,724,026 A | 4/1973 | Gernandt | |
| 3,727,308 A | 4/1973 | Ross | |
| 3,738,785 A | 6/1973 | Reinhardt et al. | |
| 3,750,232 A | 8/1973 | Holly | |
| 3,823,633 A | 7/1974 | Ross | |
| 3,856,680 A | 12/1974 | Elmore | |
| 3,991,440 A | 11/1976 | Hendrickson | |
| 3,998,574 A | 12/1976 | Blake | |
| 4,038,010 A | 7/1977 | Bremer | |
| 4,182,003 A | 1/1980 | Lamartino et al. | |
| 4,212,609 A | 7/1980 | Fay | |
| 4,272,864 A | 6/1981 | Holly | |
| 4,338,702 A | 7/1982 | Holly | |
| 4,356,595 A | 11/1982 | Sandberg et al. | |
| 4,372,008 A | 2/1983 | Sandberg | |
| 4,418,446 A | 12/1983 | Sandberg | |
| 4,582,226 A | 4/1986 | Doak | |
| 4,625,612 A | 12/1986 | Oliver | |
| 4,630,425 A | 12/1986 | Reed | |
| 4,630,426 A | 12/1986 | Gentry | |
| 4,632,655 A | 12/1986 | Benkwitz | |
| 4,768,325 A | 9/1988 | Lindee et al. | |
| 4,821,376 A | 4/1989 | Sandberg | |
| 4,849,113 A | 7/1989 | Hills | |
| 4,957,425 A | 9/1990 | Fay | |
| 4,987,643 A | 1/1991 | Powers et al. | |
| 5,006,056 A | 4/1991 | Mainstone et al. | |
| 5,021,025 A | 6/1991 | Wagner | |
| 5,064,584 A | 11/1991 | Jefferies | |
| 5,102,238 A | 4/1992 | Contzen | |
| 5,536,329 A | 7/1996 | St. Martin | |
| 5,567,463 A | 10/1996 | Schaaf | |
| 6,131,372 A | 10/2000 | Pruett | |
| 6,368,092 B1 | 4/2002 | Lindee | |
| 6,371,278 B1 | 4/2002 | Hart et al. | |
| 6,764,293 B2 | 7/2004 | Kashulines et al. | |
| 6,884,058 B2 | 4/2005 | Becker et al. | |
| 7,146,992 B2 | 12/2006 | Elick et al. | |
| 7,467,636 B2 | 12/2008 | Welch | |
| 7,819,650 B2 | 10/2010 | Meskendahl et al. | |
| 7,931,461 B2 | 4/2011 | Van Der Eerden et al. | |
| 8,029,206 B2 | 10/2011 | McCarthy | |
| 8,371,836 B2 | 2/2013 | Van Der Eerden et al. | |
| 9,162,375 B2 | 10/2015 | Van Gerwen | |
| 10,182,575 B2 * | 1/2019 | Van Gerwen | A22C 7/0069 |
| 2001/0022328 A1 | 9/2001 | Oh | |
| 2002/0012731 A1 | 1/2002 | Van Esbroeck et al. | |
| 2002/0046696 A1 | 4/2002 | Lang | |
| 2005/0013895 A1 | 1/2005 | Azzar | |
| 2005/0042321 A1 | 2/2005 | LaBruno | |
| 2005/0214399 A1 | 9/2005 | LaBruno et al. | |
| 2005/0220932 A1 | 10/2005 | Van Der Eerden | |
| 2007/0098862 A1 | 5/2007 | Hansen et al. | |
| 2007/0224305 A1 | 9/2007 | Meskendahl et al. | |
| 2008/0008799 A1 | 1/2008 | Zuger | |
| 2008/0202226 A1 | 8/2008 | Heim et al. | |
| 2009/0134544 A1 | 5/2009 | Van Der Eerden et al. | |
| 2010/0196564 A1 | 8/2010 | Mendoza et al. | |
| 2011/0014344 A1 | 1/2011 | Meskendahl et al. | |
| 2011/0151082 A1 | 6/2011 | VanGerwen et al. | |
| 2012/0003374 A1 | 1/2012 | Van Der Eerden et al. | |
| 2012/0058213 A1 | 3/2012 | Lindee et al. | |
| 2012/0177786 A1 | 7/2012 | Van Der Eerden et al. | |
| 2013/0045294 A1 | 2/2013 | VanGerwen et al. | |
| 2013/0164403 A1 | 6/2013 | Boogers et al. | |
| 2013/0224357 A1 | 8/2013 | Van Gerwen | |
| 2013/0273192 A1 | 10/2013 | Van Gerwen | |
| 2013/0280393 A1 | 10/2013 | Van Gerwen | |
| 2013/0291483 A1 | 11/2013 | Van Gerwen | |
| 2013/0337128 A1 | 12/2013 | Van Gerwen et al. | |
| 2014/0037811 A1 | 2/2014 | Colosimo | |
| 2014/0199423 A1 | 7/2014 | Van Gerwen et al. | |

FOREIGN PATENT DOCUMENTS

| | | |
|---|---|---|
| DE | 102006020361 A1 | 8/2007 |
| EP | 0 638 371 A1 | 2/1995 |
| EP | 0818148 A1 | 1/1998 |
| EP | 1365081 A2 | 11/2003 |
| EP | 1521480 A1 | 4/2005 |
| EP | 1676490 A1 | 5/2006 |
| EP | 1920847 A1 | 5/2008 |
| EP | 2064956 A1 | 6/2009 |
| EP | 2253219 A2 | 11/2010 |
| EP | 2319326 A2 | 5/2011 |
| EP | 2380442 A2 | 10/2011 |
| EP | 2319326 A3 | 11/2011 |
| EP | 2595489 A1 | 1/2012 |
| EP | 2468104 A1 | 6/2012 |
| EP | 2253219 A3 | 10/2014 |
| FR | 2387609 A1 | 11/1978 |
| GB | 1015820 A | 1/1966 |
| GB | 2312641 A | 11/1997 |
| JP | 56-001868 A | 1/1981 |
| JP | H03-108471 | 5/1991 |
| JP | 10-058463 A1 | 3/1998 |
| JP | 2001299317 A | 10/2001 |
| JP | 2004-085877 A | 3/2004 |
| JP | 2004-224135 A | 8/2004 |
| JP | 2005-530514 A | 10/2005 |
| JP | 2007-536927 A | 12/2007 |
| JP | 2011078423 A | 4/2011 |
| WO | 88/07003 A1 | 9/1988 |
| WO | 96/09210 A1 | 3/1996 |
| WO | 98/12934 A2 | 4/1998 |
| WO | 2004/002229 A2 | 1/2004 |
| WO | 2005/009696 A1 | 2/2005 |
| WO | 2005/107481 A2 | 11/2005 |
| WO | 2006/020139 A1 | 2/2006 |
| WO | 2008/091634 A2 | 7/2008 |
| WO | 2010/110655 A1 | 9/2010 |
| WO | 2012/012581 A1 | 1/2012 |
| WO | 2012/055454 A2 | 5/2012 |
| WO | 2012/059188 A1 | 5/2012 |
| WO | 2012/084215 A1 | 6/2012 |
| WO | 2012/107236 A2 | 8/2012 |
| WO | 2014/118368 A3 | 8/2014 |

OTHER PUBLICATIONS

Potentially related Application, U.S. Appl. No. 13/944,973 Published as U.S. Pat. No. 2013/0273192, dated Oct. 17, 2013.
Potentially related Application, U.S. Appl. No. 13/883,152 Published as U.S. Pat. No. 2013/0224357, dated Aug. 29, 2013.
Potentially related Application, U.S. Appl. No. 14/232,970 Published as U.S. Pat. No. 2014/0199423, dated Jul. 17, 2014.
Townsend Further Processing News, brochure, published Jun. 2010.
Japanese Office Action for Japanese Patent Application No. 2015-555739, dated Sep. 14, 2018.
International Preliminary Report on Patentability, dated Nov. 18, 2015 for Application PCT/EP2014/052050.

(56) References Cited

OTHER PUBLICATIONS

International Search Report and Written Opinion, dated Feb. 9, 2015 for Application PCT/EP2014/052050.

\* cited by examiner

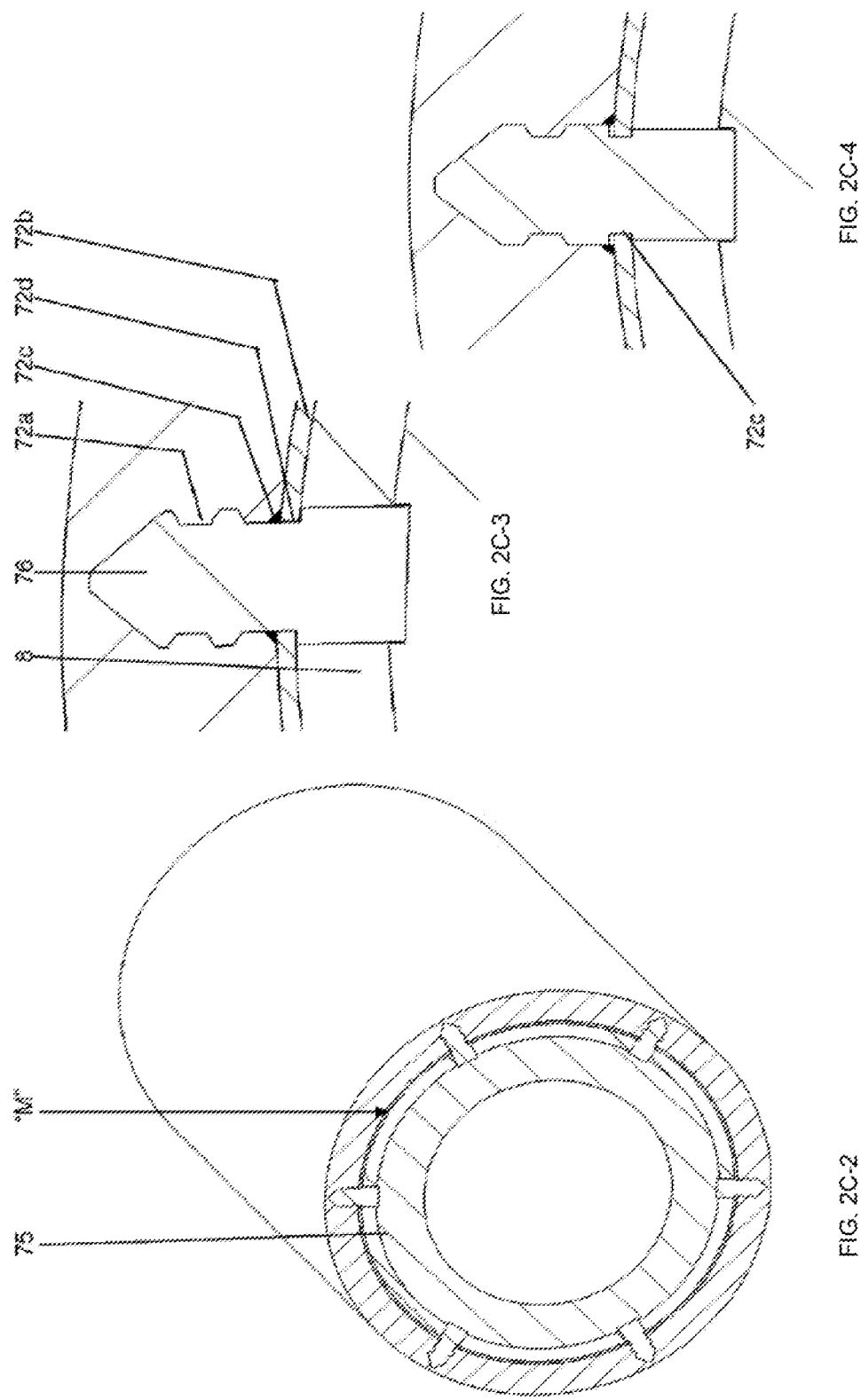

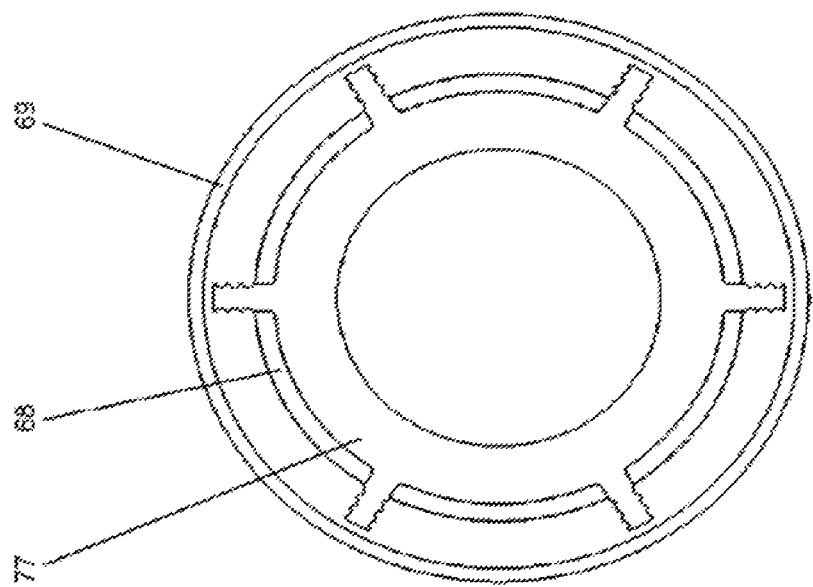
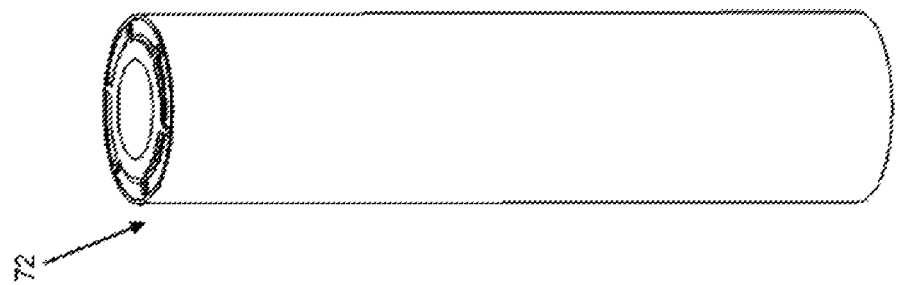
FIG. 2H
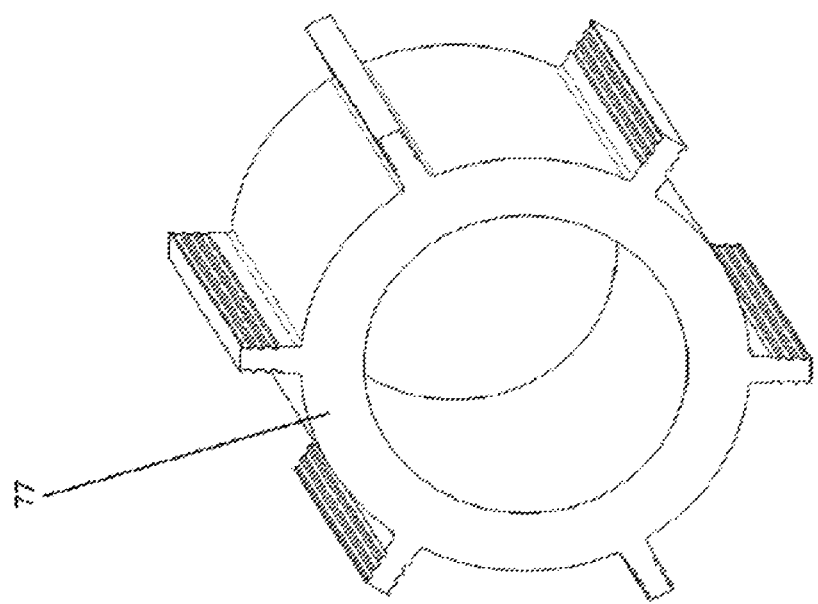
FIG. 2G

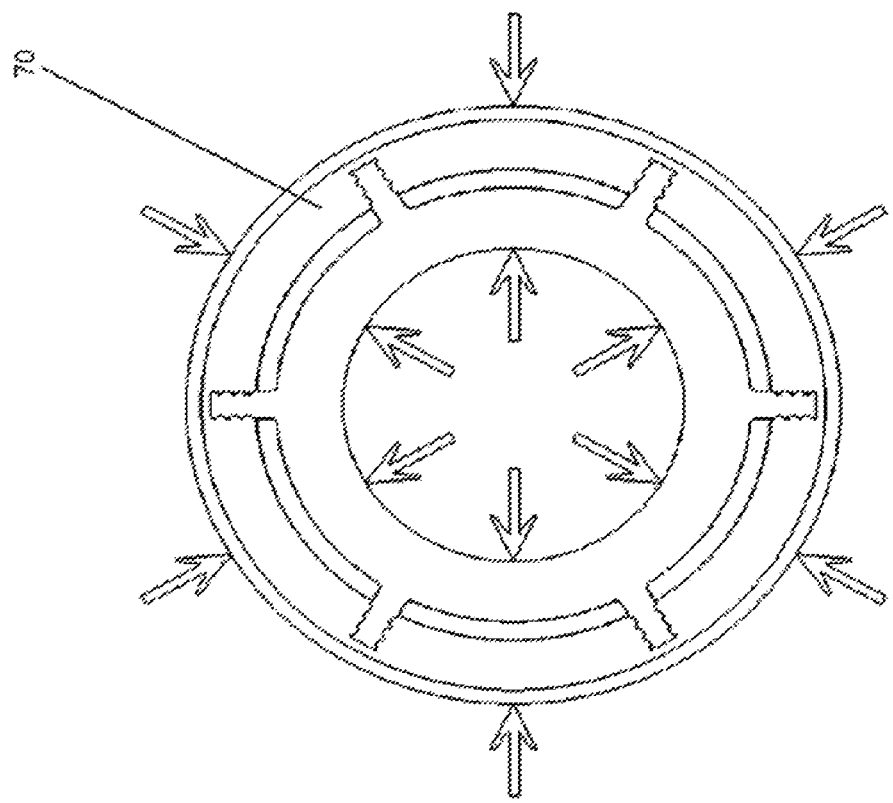
FIG. 21
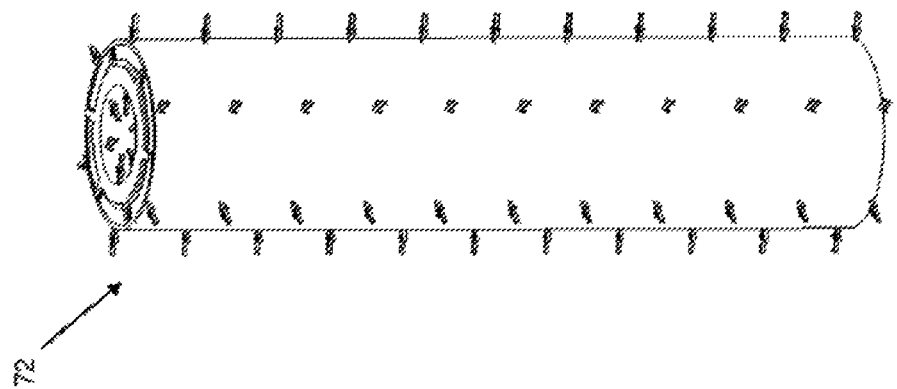

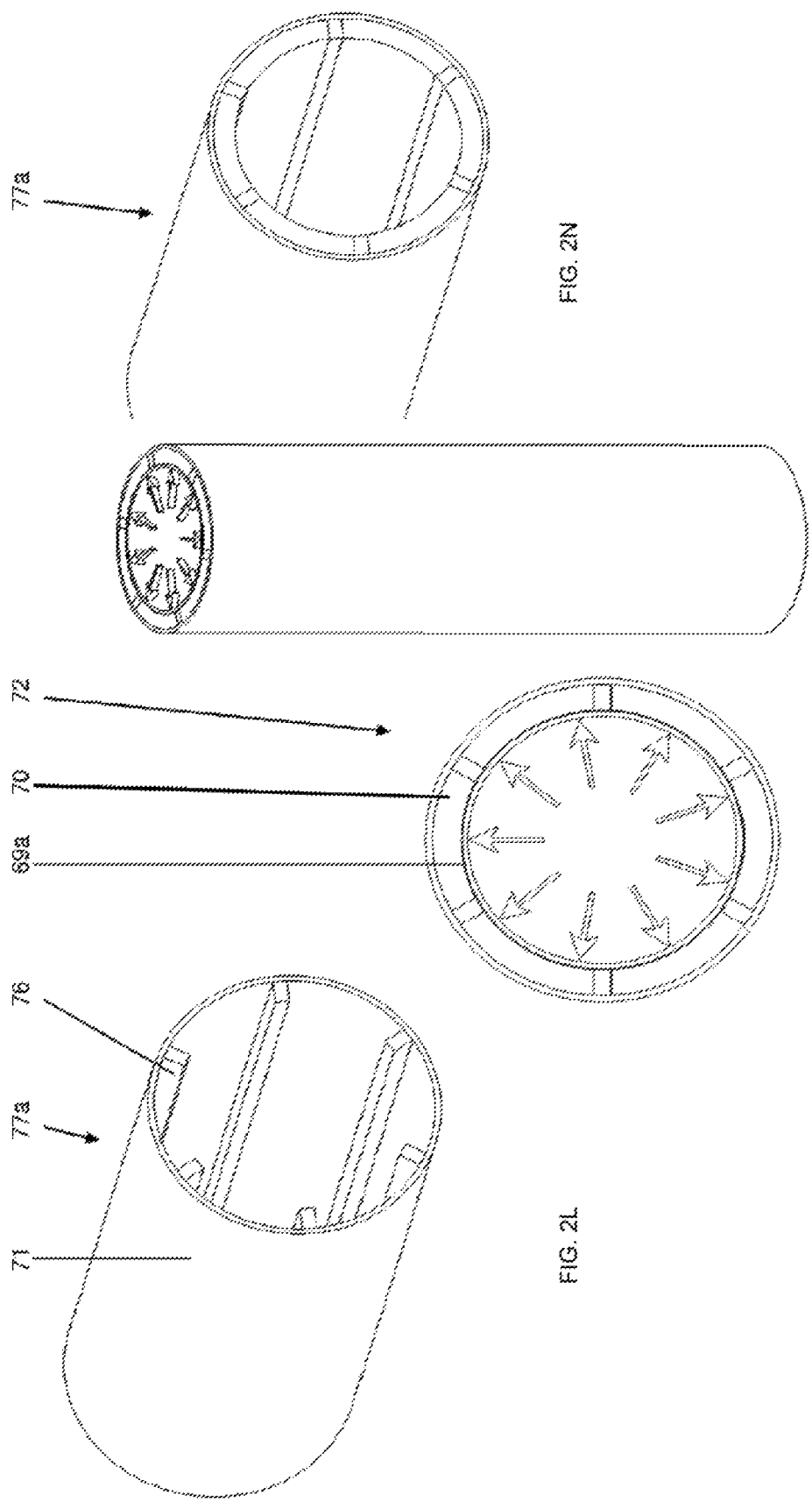

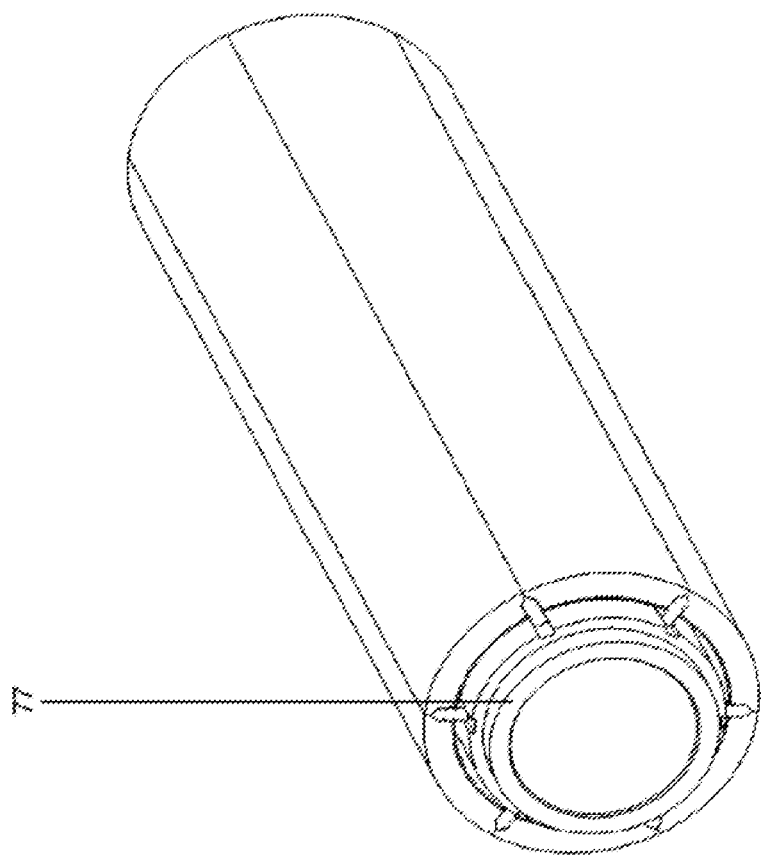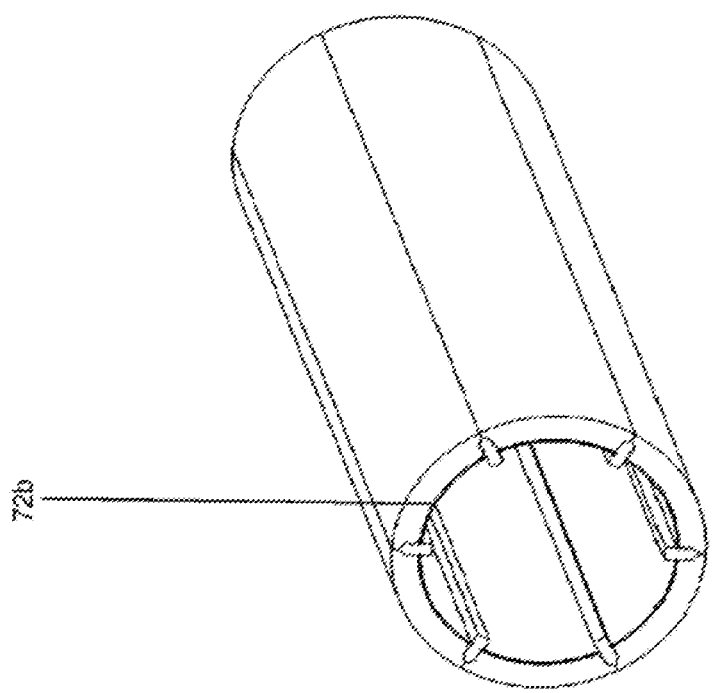
FIG. 2R

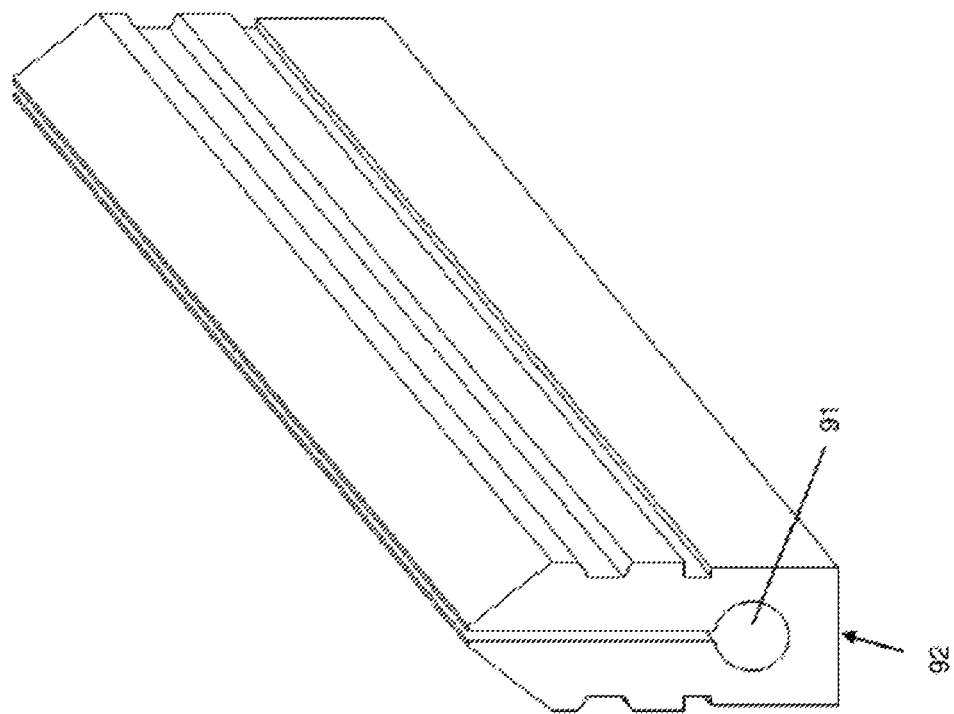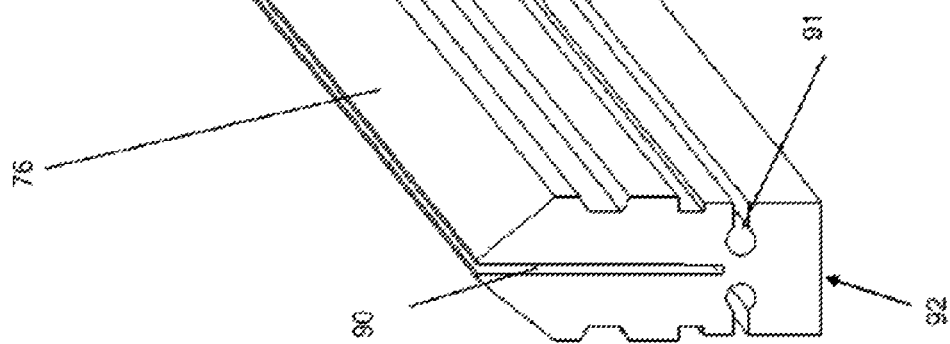
FIG. 2V

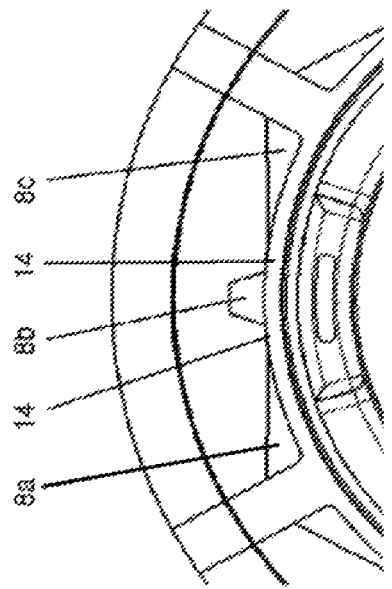

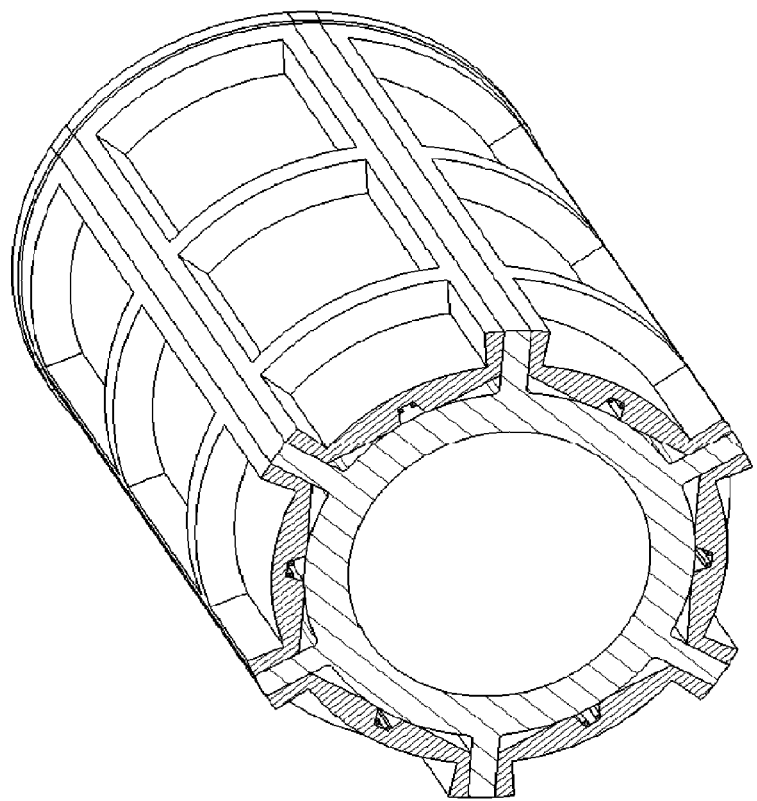
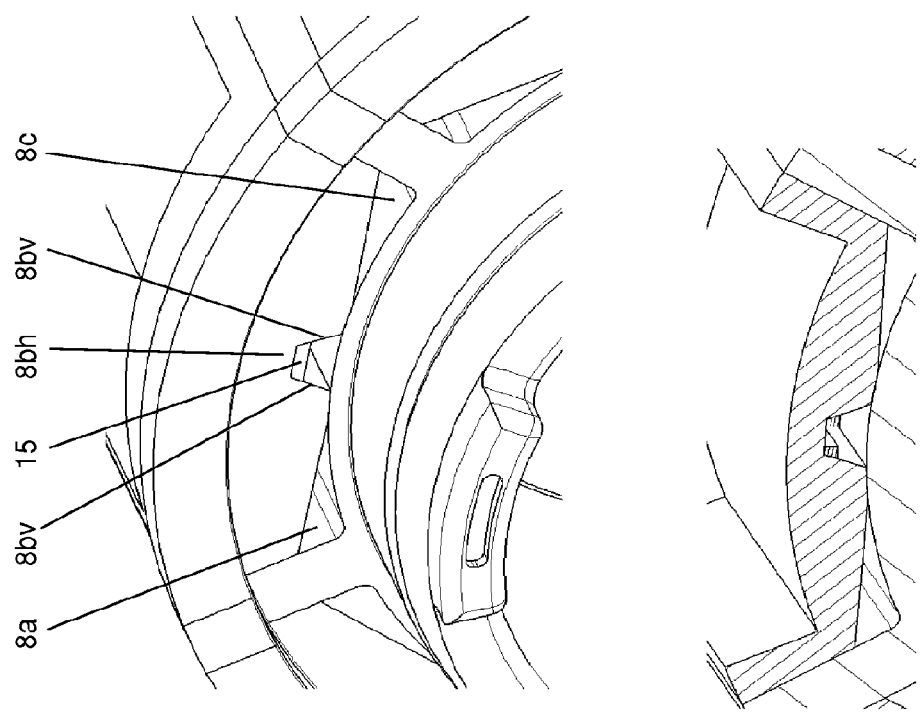
Fig. 6

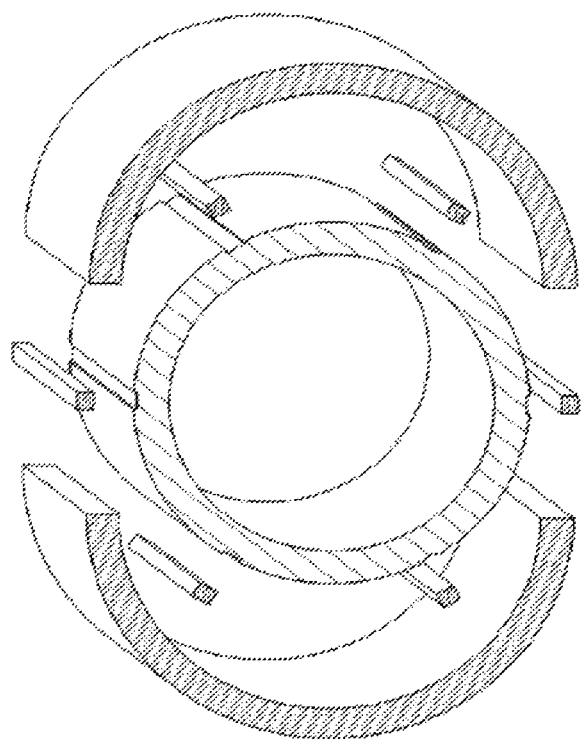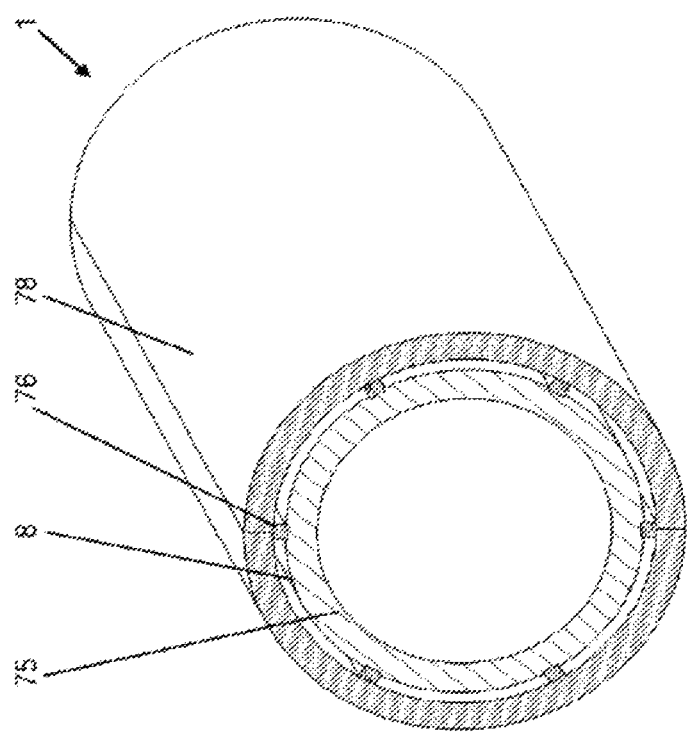
FIG. 7C

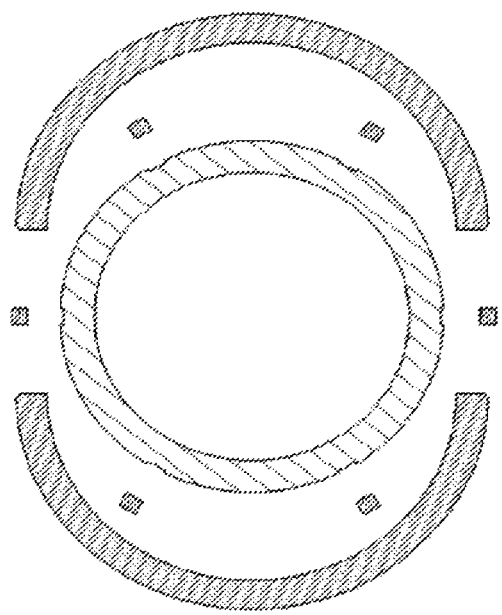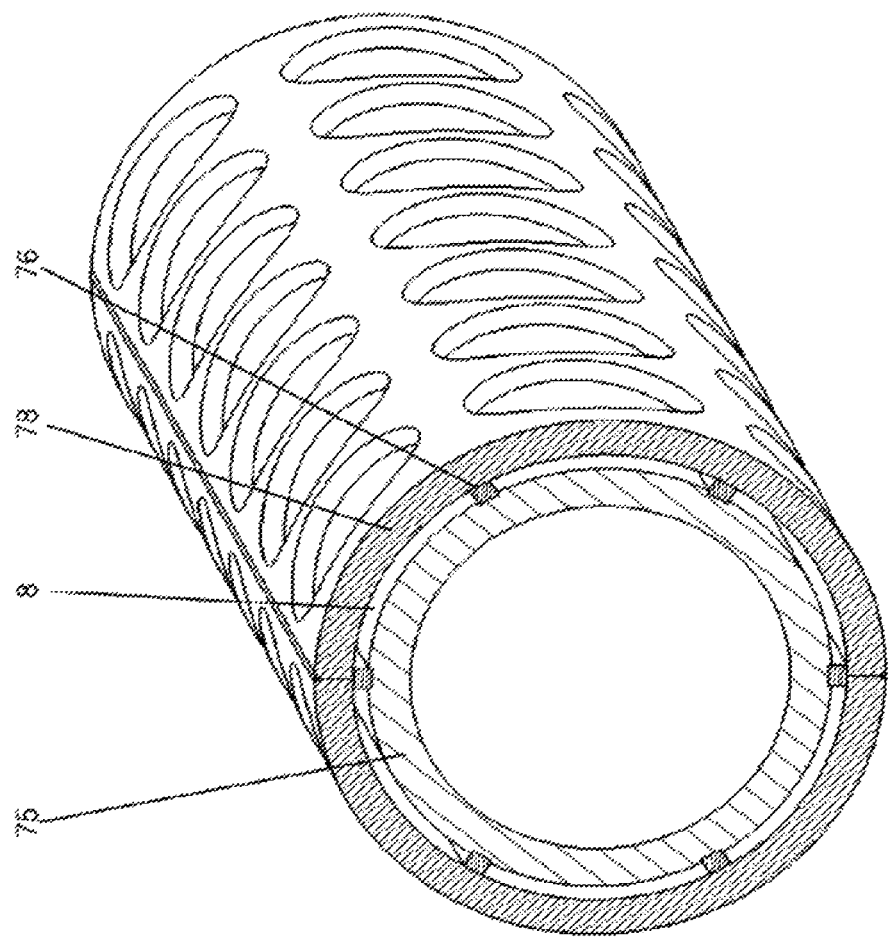
FIG. 7E

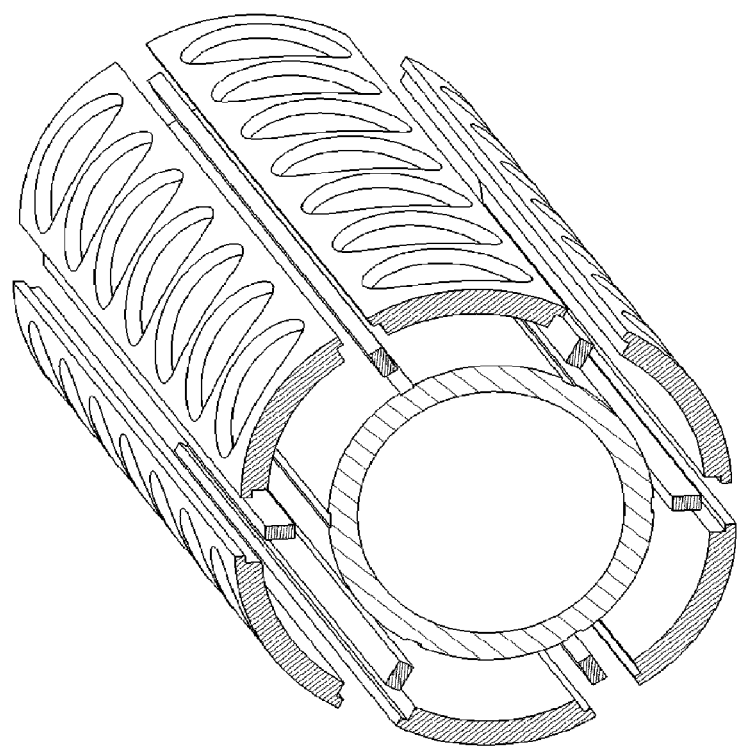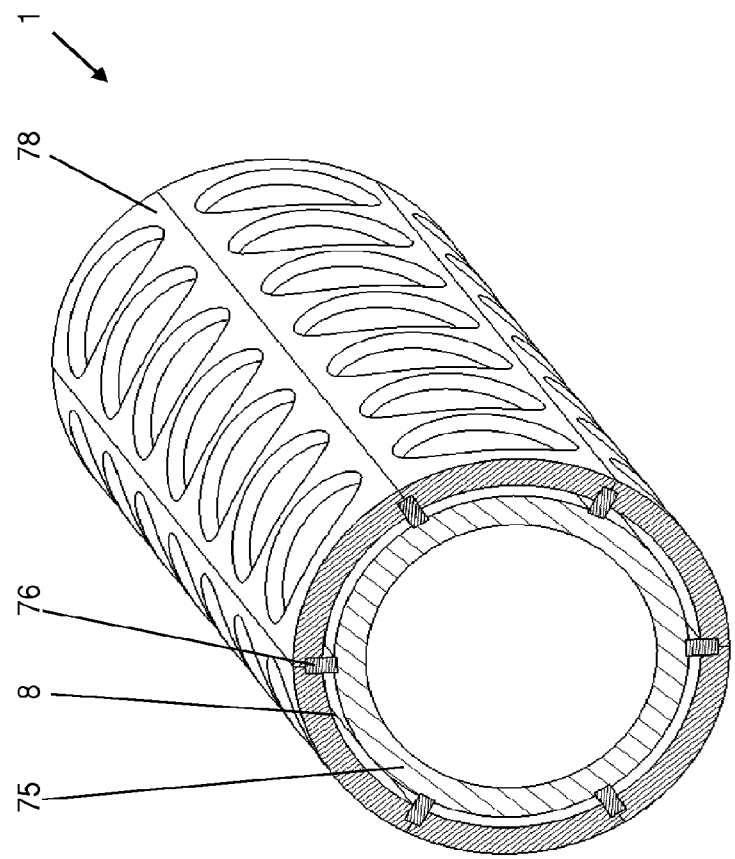
Fig.8

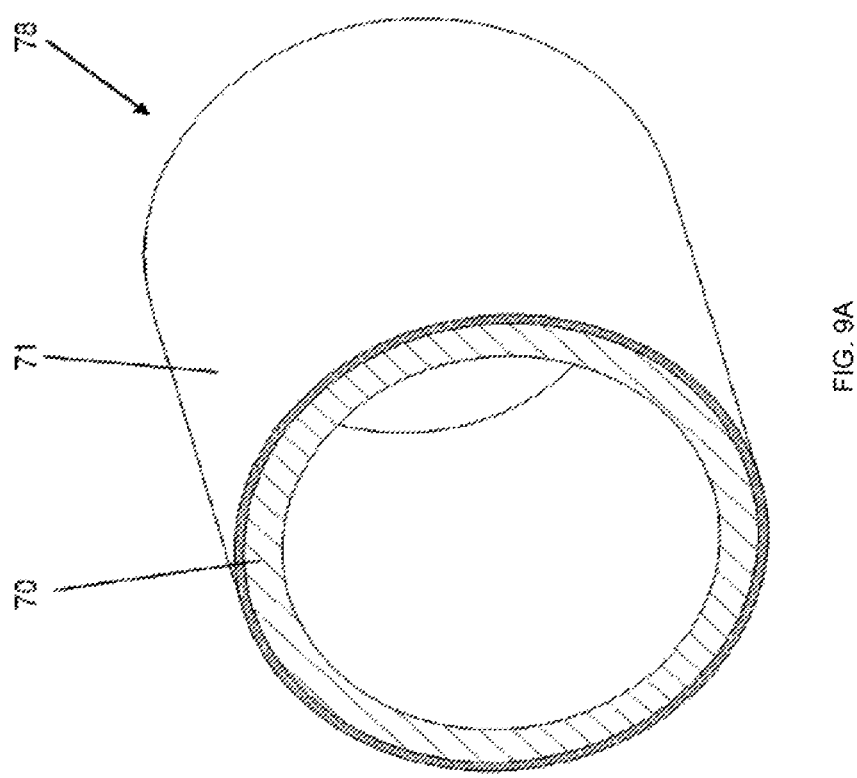

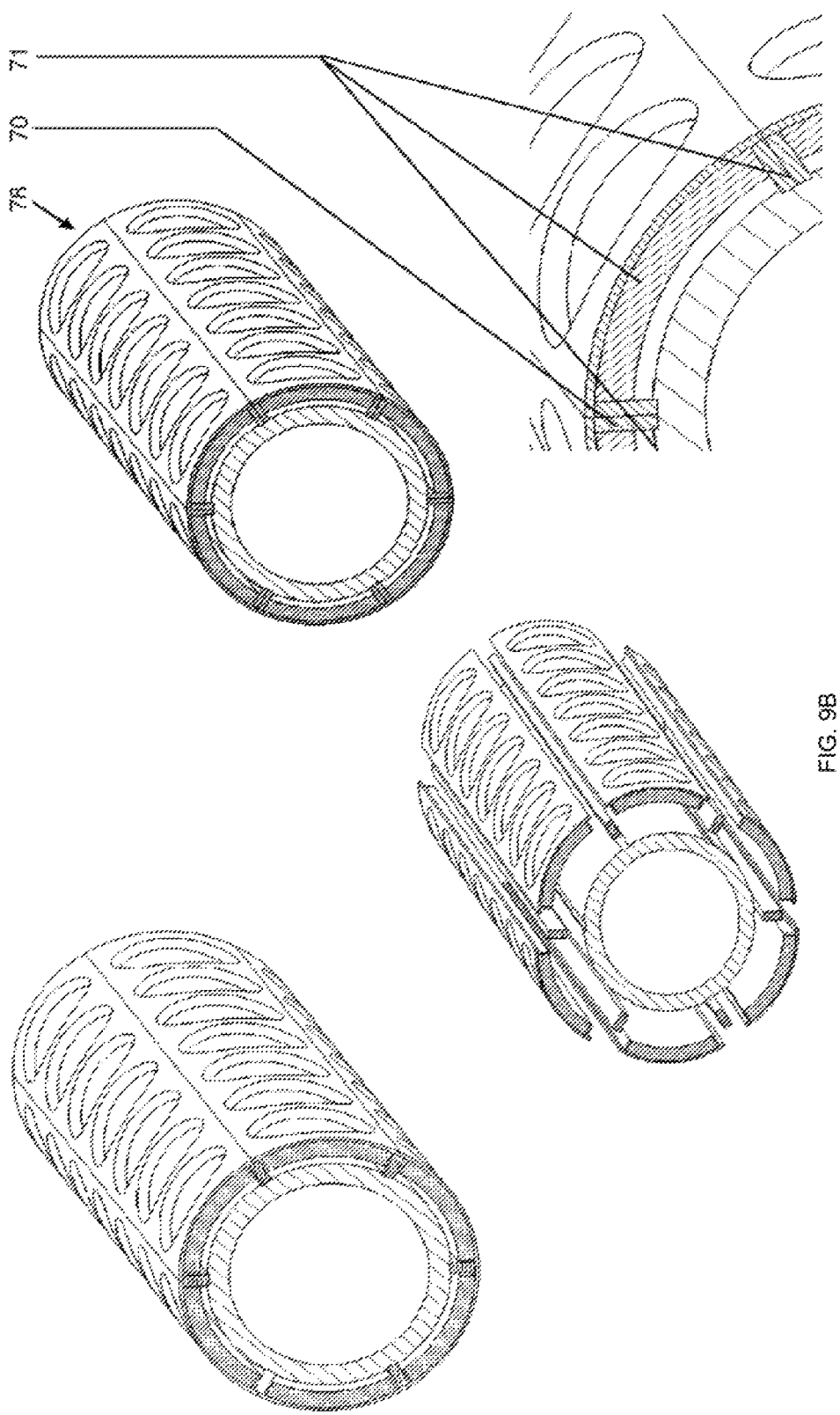

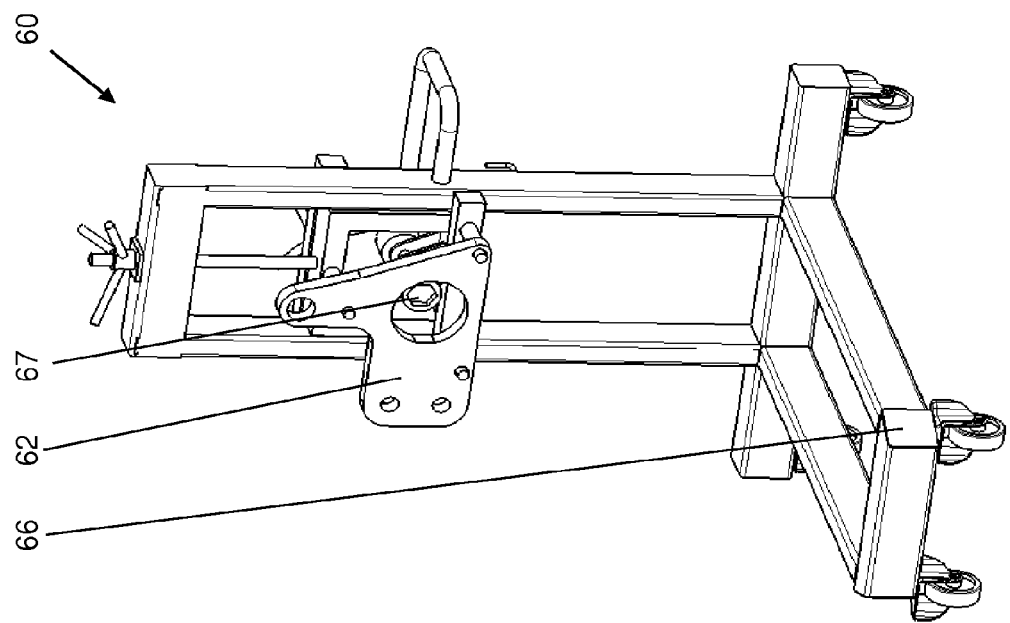
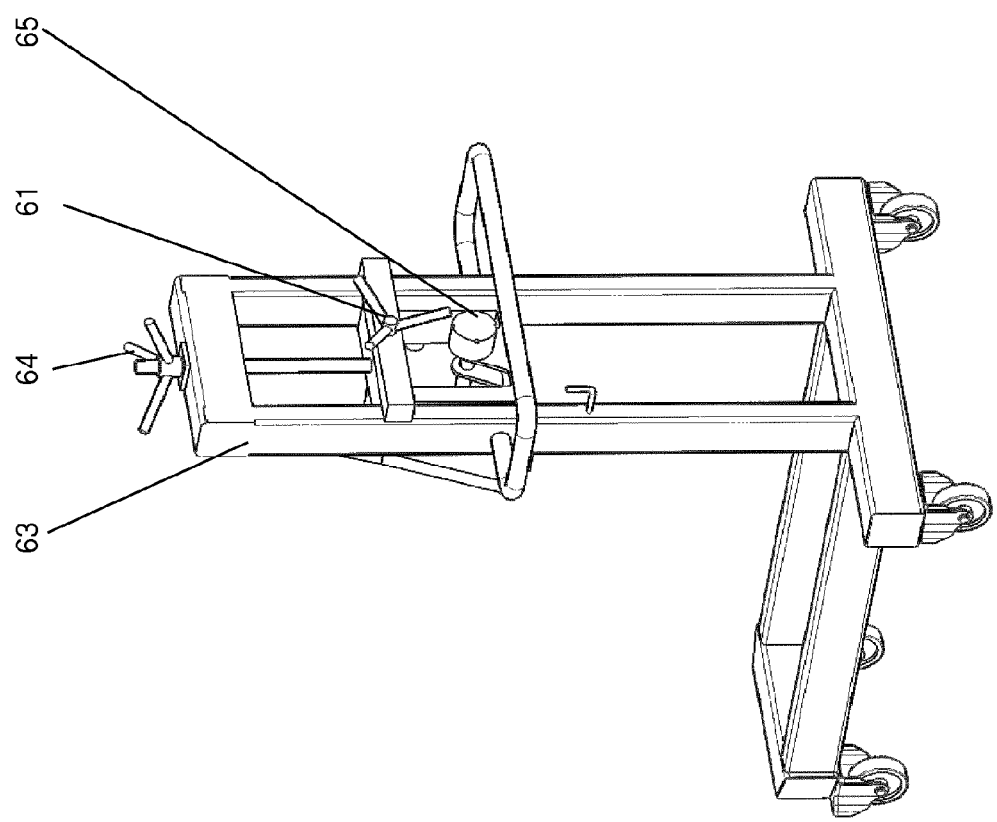
Fig. 12

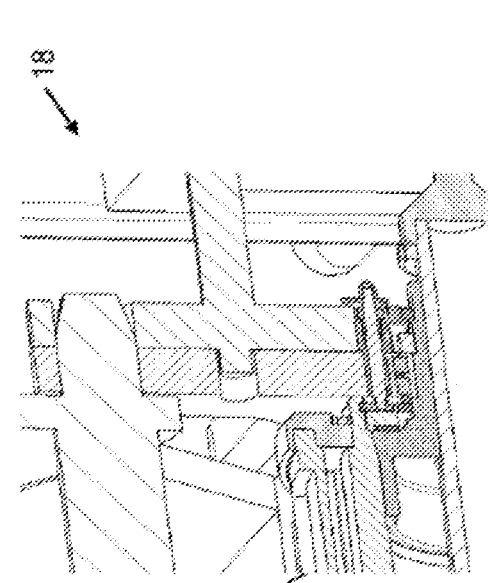
FIG. 14C
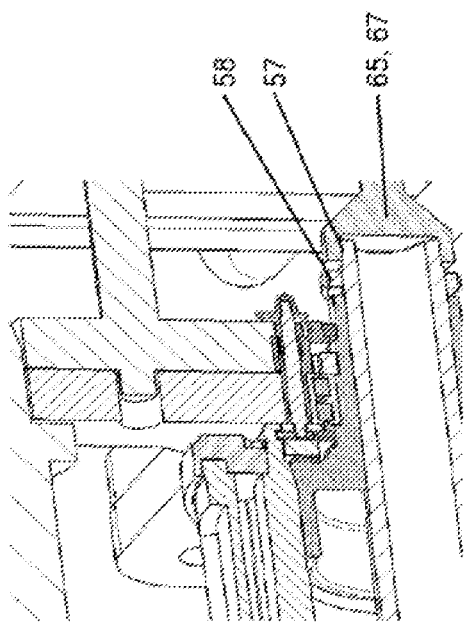
FIG. 14D
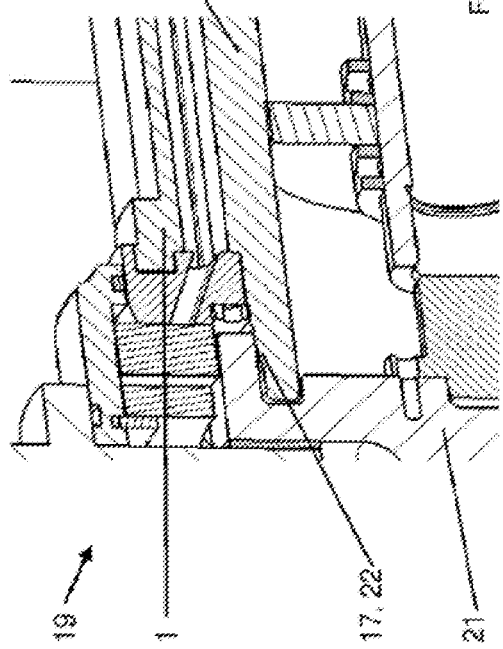
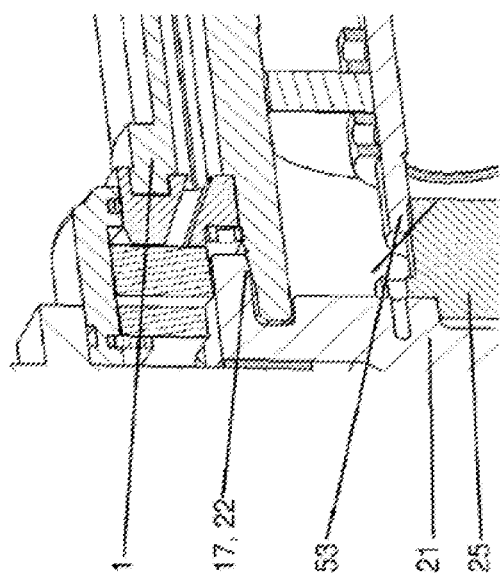

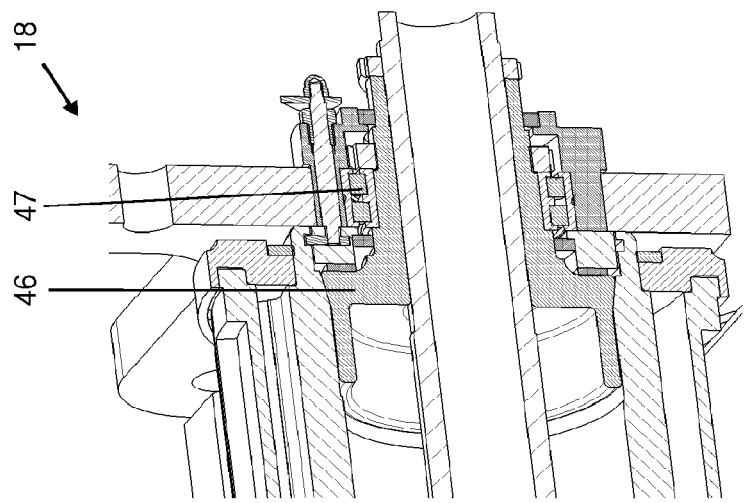
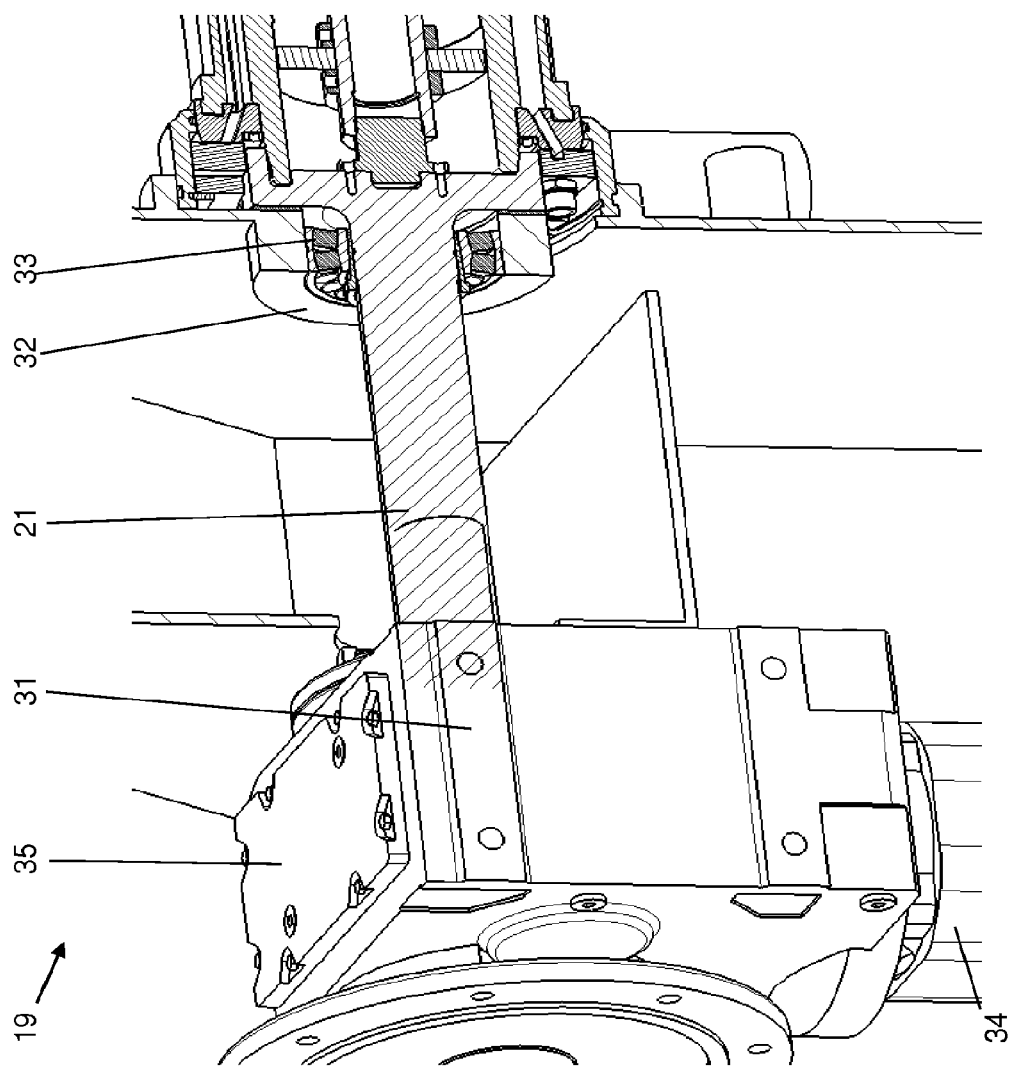
Fig. 15

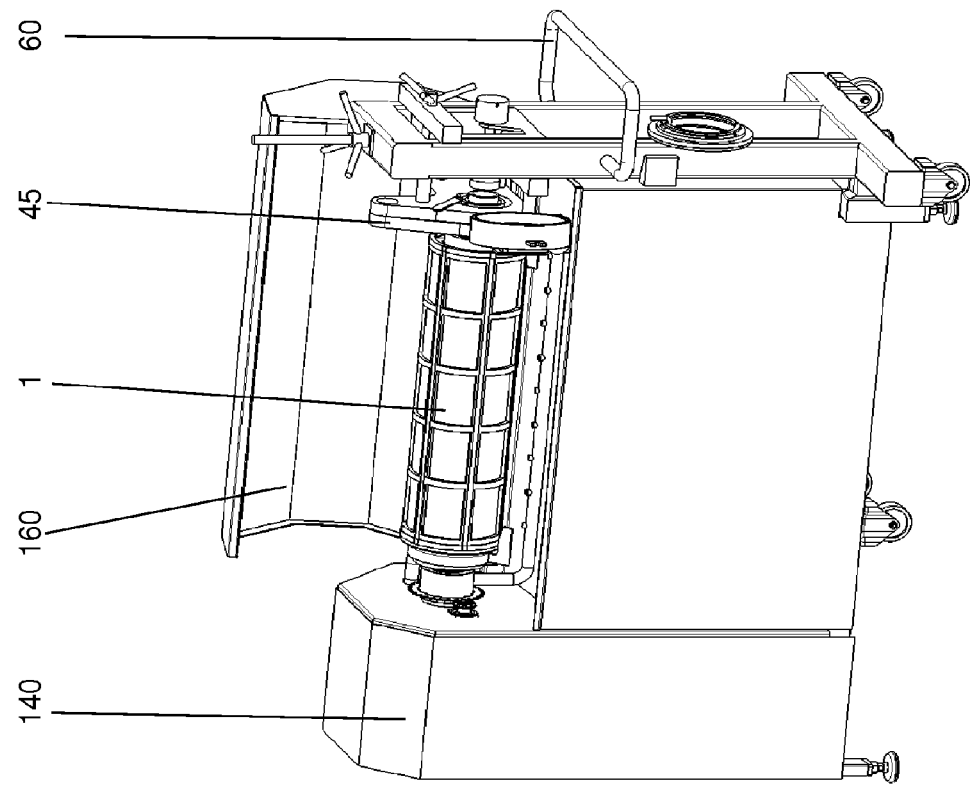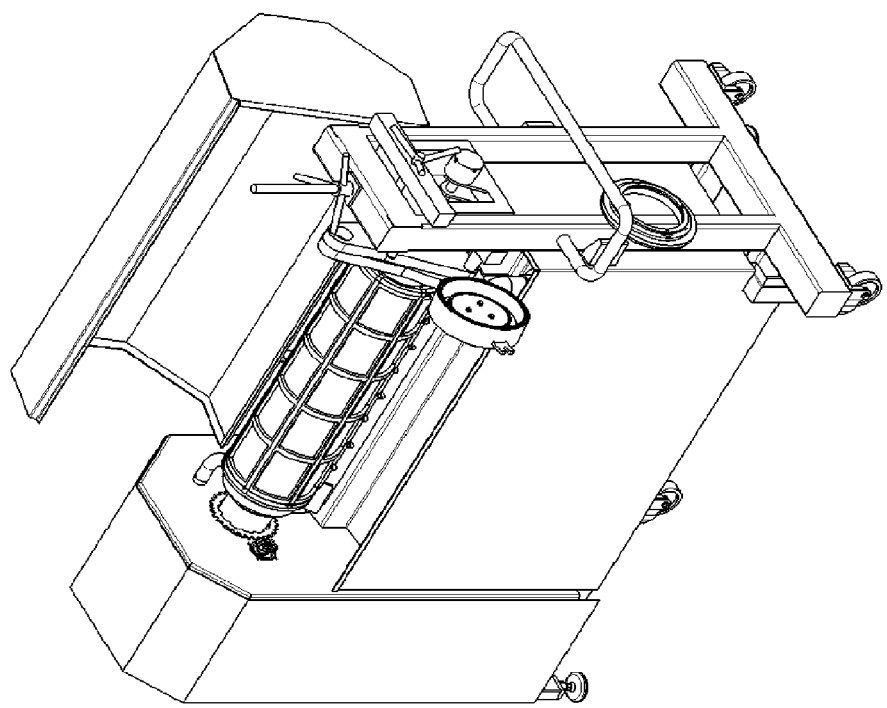
Fig. 17

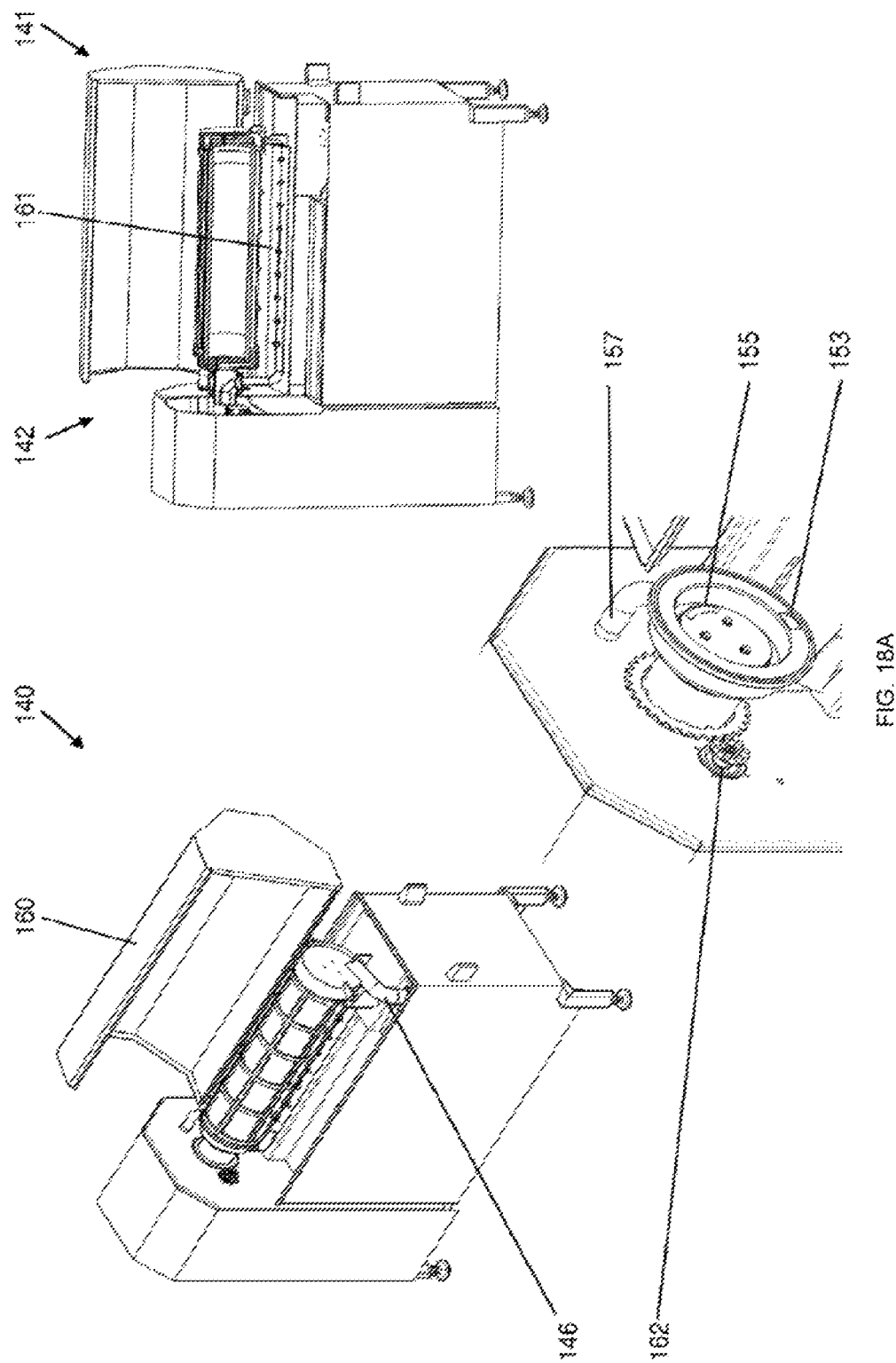

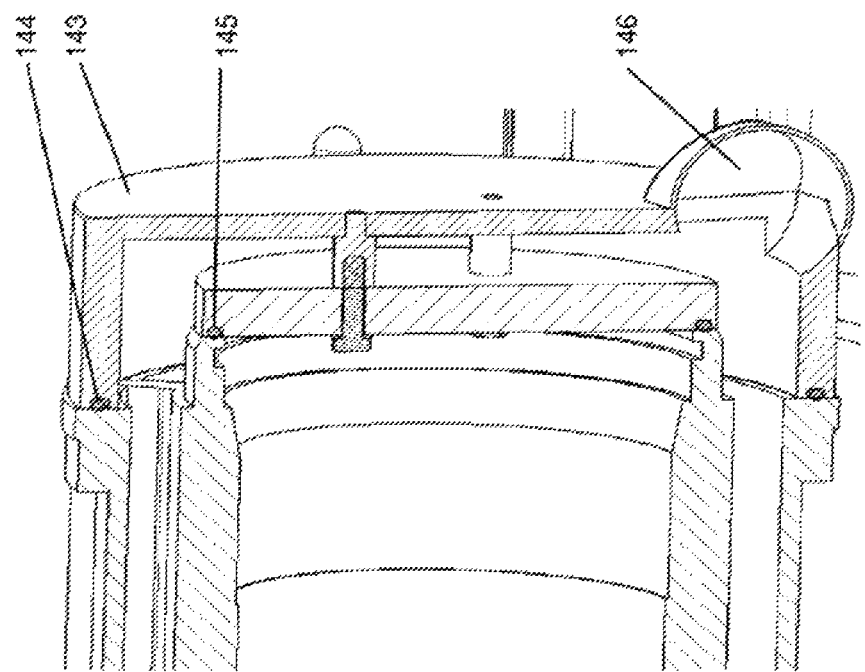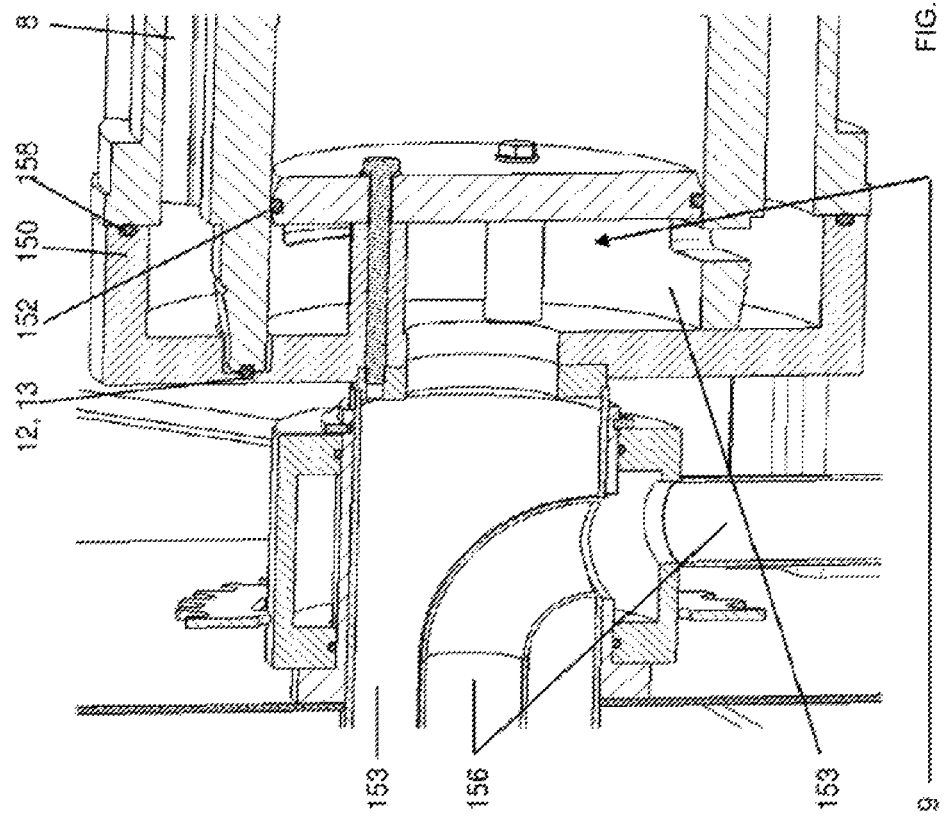
FIG. 19B

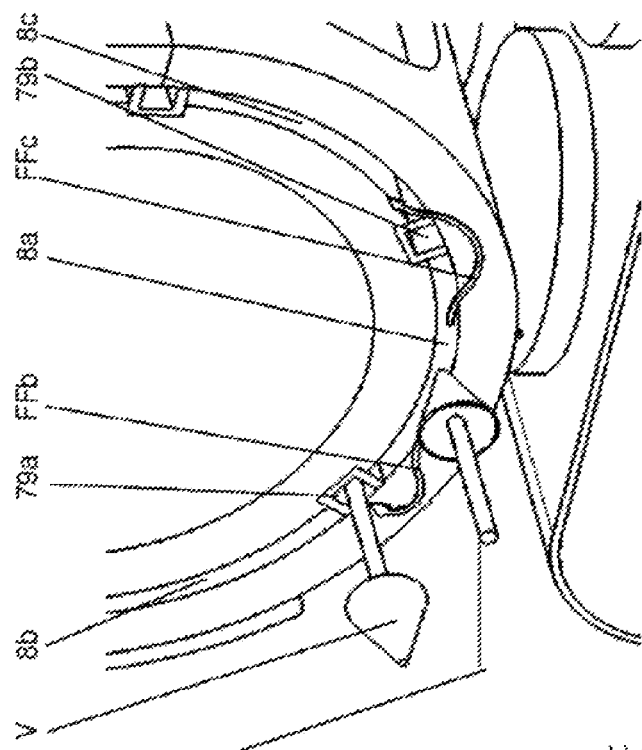
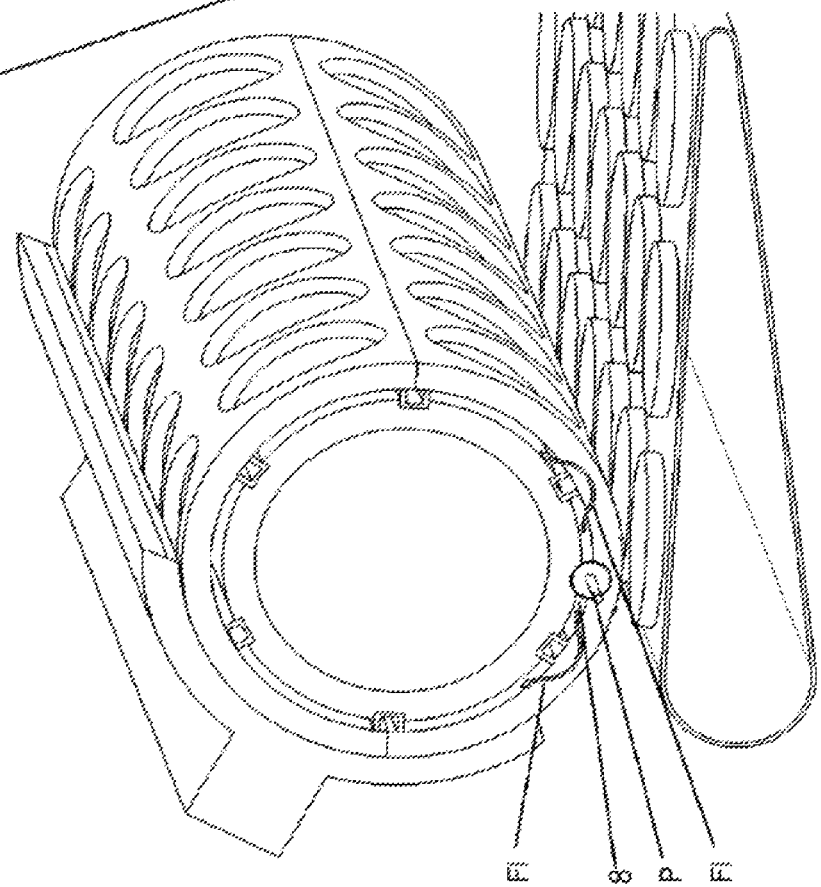

FOOD FORMING CONCEPT

FIELD

The present invention relates to a food forming drum comprising a multitude of rows product cavities, each row comprising a multitude of product cavities, wherein the product cavities are provided as one or more at least partially porous members made from a porous material with interconnecting pores. The present invention further relates to a food forming apparatus comprising a food forming drum and a porous member. Additionally, the present invention relates to a movable unit to transport a drum and a method to change a drum or clean the food forming apparatus.

BACKGROUND

Food forming drums are utilized in machines, which form food products, like patties from a food mass. Such an apparatus is for example described in the U.S. Pat. No. 3,205,837. However the food forming drum described in this patent application is difficult to produce and has hygienic problems.

It was therefore the objective of the present invention to provide a food forming drum, which does not have the deficiencies of the devices according of the state of the art.

This problem is attained by a food forming drum comprising a multitude of rows product cavities, each row comprising one or a multitude of product cavities, wherein the product cavities are provided as one or more at least partially porous members made from a porous material with interconnecting pores.

SUMMARY

The disclosure made to this embodiment of the present invention also applies to the other inventive embodiments of the present invention and vice versa.

The present invention relates to a food forming drum, which is part of a food forming apparatus. This food forming drum has at its outer surface a multitude of product cavities, which are open towards the circumference of the drum and in which the food mass is formed into a food product, for example a patty. This food forming drum comprises, according to the present invention, a multitude of rows of product cavities, whereas each row comprises one or a multitude of product cavities, side by side. The rows are arranged in parallel to the middle axis of the inventive drum. During production, the drum turns and in one position the product cavities in one row are filled with the food mass and in a downstream position, the formed food mass is discharged from the product cavities, located in one row. Subsequently, the product cavities in one row of cavities can be filled again and so on. In order to vent the product cavities during their filling and/or in order to support the discharge of the product, the product cavities are at least partially made of a porous material, for example sintered metal, which is gas-permeable and via which the product cavity can be vented or through which gas, for example air, can be discharged, to loosen the formed product from the surface of the product cavity. Preferably, the porous material comprises pores/channels, which are interconnected to each other.

The food forming drum further preferably comprises fluid channels, which extend in the longitudinal direction of the drum, i.e. parallel to the center axis of the drum and extend preferably from one end to the other end of the drum. Via each fluid channel, ventilation air can be discharged, for example to the ambient, and/or compressed gas can be forced into the cavities to discharge the formed product. Additionally, a cleaning fluid can be forced through the channels and/or the porous material of the product cavities.

The at least partially porous product cavities are provided as one or more porous members, wherein the cavities are recesses in the porous material. The porous members are preferably a cylinder or cylinder segments. The porous member(s) can extend entirely around an inner drum or can be inserts, which are inserted and then fixed to a preferably drum-like structure. Each segment may comprise one or more rows of cavities.

The porous member is part of a mould drum, which will be used for moulding products, e.g. patties, from a mass of food material, for example meat, which mass will be delivered by a mass supply system. The drum comprises one or more rows with one or more cavities where a product cavity wall having at least partially a porous structure. A movable unit will be used to loading/unloading the mould drum easily from the forming apparatus and/or a cleaning apparatus and/or a storage unit and to move the mould drum between the forming apparatus and/or cleaning apparatus and/or a storage unit.

According to a preferred or inventive embodiment of the present invention, the member is directly or indirectly connected to an inner cylinder at least one bonding location, wherein the pores at the surface of the porous member in the bonding location are at least partially closed.

The disclosure made to this embodiment of the present invention also applies to the other inventive embodiments of the present invention and vice versa.

By closing the pores of the porous material at the bonding location, it is assured, that the bonding material, for example glue or a brazing solder will not penetrate into the porous material.

Preferably, each porous member is provided as an insert, with will be at least partially inserted into a recess of a drum like inner member and bonded to this member. This bonding is preferably done by brazing or soldering. Alternatively or additionally, each insert can be connected to the drum by a form-, force and/or a friction-connection between the insert and the drum and/or an inner member of the drum.

According to another inventive or preferred embodiment of the present invention, the pores at the surface of the porous member adjacent to a front end of the drum are at least partially closed.

The disclosure made to this embodiment of the present invention also applies to the other inventive embodiments of the present invention and vice versa.

After the bonding of the porous members to the inner member, the resulting drum assembly will be preferably further machined. Particularly, the outer diameter of the drum assembly will be machined to its final diameter and/or, the pores at the outer circumference of the drum will be closed and/or should be kept closed. With this step, for example grinding, or with an additional machining step the drum obtains its final diameter.

The pores can be closed for example by grinding with a suitable grinding wheel and suitable grinding parameters and/or it is preferably done by deep rolling. During deep rolling, a rolling element, for example a ball but preferably a roller, is pressed against the porous surface to be closed or in case of a drum assembly, against the outer surface of the drum. The compression created by the roller creates stress in the contact area whereby this area will exceed the yield point and a plastic deformation takes place in the surface layer of the mould drum. The pores of the porous inserts will be closed by this action. An additional advantage is that the increased density in the surface layer will increase the strength and wear resistance in this layer. The drum can now be stored. Once there is an order for a drum, the desired product cavities can be machined.

Additionally or alternatively, the pores of the porous member are at least partially closed by shot-peening. Shot peening is a cold working process used to close the pores at the surface of the porous material and/or to produce a residual layer. It entails impacting a surface with shot (round metallic, glass, or ceramic particles) with force sufficient to create plastic deformation. It is similar to sandblasting, except that it operates by the mechanism of plasticity rather than abrasion: each particle functions as a ball-peen hammer that closes the pores.

The disclosure made to this embodiment of the present invention also applies to the other inventive embodiments of the present invention and vice versa.

According to another preferred or inventive embodiment of the present invention, the mould drum comprises an inner cylinder and at least one porous member and at least one rib between the cylinder and the porous member, wherein the rib is connected to the cylinder by a form- and/or force-fit or by an adhesive bond.

The disclosure made to this embodiment of the present invention also applies to the other inventive embodiments of the present invention and vice versa.

Preferably, the ribs are connected to the porous member and/or the inner cylinder by brazing.

Each rib can utilized to provide a certain distance between the porous member and an inner cylinder, to support the porous member, to provide a channel and/or to at least partially block fluid flow through the porous material.

According to another preferred or inventive embodiment of the present invention, the porous member comprises a recess, which partially accommodates a rib and that the rib preferably reduces the fluid exchange between two rows of product cavities.

The disclosure made to this embodiment of the present invention also applies to the other inventive embodiments of the present invention and vice versa.

Another preferred or inventive embodiment of the present invention is a food forming drum comprising an inner cylinder and at least one porous member and at least one rib between the cylinder and the porous segment, wherein in the rib a fluid channel is provided.

The disclosure made to this embodiment of the present invention also applies to the other inventive embodiments of the present invention and vice versa.

The fluid channel in the rib is preferably open towards the porous material. The cross section of the fluid channel is, for example, U- or V-shaped. This channel can be for example connected to a pressure medium or to a vacuum source. Due to the vacuum, air that tries to flow from one row of cavities to the next can be at least reduced.

According to a preferred or inventive embodiment of the present invention, the food forming drum, comprises a multitude of rows of preferably porous product cavities, the drum further comprising at least two form-fit-means to rotate the drum, wherein the form-fit-means can have a different shape.

The disclosure made to this embodiment of the present invention also applies to the other inventive embodiments of the present invention and vice versa.

The form-fit-means which are part of the drum cooperate with corresponding form fit means associated with rotational means, for example a motor and/or a gear box. The form-fit-means transfer the moment of momentum from the rotational means to the drum. Since the form-fit-means at the drum and thus the form-fit-means at the rotational means comprise at least two form-fit-means which are different, the drum can only be connected to the rotational means of the food forming apparatus. Thus, the rotational position of the drum relative to the rotational position of the rotational means is fixed and known by a control system of the inventive apparatus.

Another preferred or inventive embodiment of the present invention is a food forming drum comprising a multitude of rows product cavities, each row comprising one or a multitude of product cavities, wherein the product cavities are provided as one or more at least partially porous members made from a porous material with interconnecting pores, wherein the member is directly or indirectly connected to an inner member at least one connecting region, wherein the connection is made by an adhesive connection and/or by form- and/or force- and/or friction-fit-means.

The disclosure made to this embodiment of the present invention also applies to the other inventive embodiments of the present invention and vice versa.

According to this subject matter of the present invention, the porous member is directly or indirectly connected to an inner member, for example ribs at the inner cylinder. This connection can be adhesive connection and/or by form- and/or force- and/or friction-fit-means. Particularly the combination of an adhesive connection, for example by soldering and/or brazing together with a form- and/or force- and/or friction-connection is preferred.

The form- and/or force- and/or friction-means can be made from metal and/or a plastic material. The material of the form- and/or force- and/or friction-means can be inserted between the porous member and the drum or a rib at the drum as a liquid, which subsequently solidifies.

The inner member is preferably a cylinder, preferably a cylinder with indentations and/or ribs to which the porous members are connected Possible form- and/or force- and/or friction-connections between the porous member and the inner member are disclosed in WO 2012 107 236, particularly FIG. 13 and the corresponding description. The disclosure of this patent application is enclosed herewith by reference and thus part of the disclosure of the present patent application.

Each porous member can be fixed to the inner member by one or more separate form- and/or force- and/or friction-means or one form- and/or force- and/or friction-means can fix a multitude of porous members to the inner member. Preferably one form- and/or force- and/or friction-fit-means extends through a multitude of porous members, more preferably through the entire axial length of the inner member.

Preferably, the form- and/or force- and/or friction-fit-means create a pre-tension between the porous member and the form- and/or force- and/or friction-fit-means and/or the inner member. This can be, for example, achieved by providing a form- and/or force- and/or friction-means with a larger diameter than the diameter of an opening in the dinner member and/or the porous material. The form- and/or force- and/or friction-means is pressed into this opening and thereby pretensions the porous member against the inner member.

Preferably, each porous member is fixed by two form- and/or force- and/or friction-fit-means at the inner member.

According to another inventive or preferred concept of the present invention, the food forming drum comprises a multitude of rows of preferably porous product cavities, which is bared rotationally at a forming apparatus, wherein the drum comprises at least at one of its front ends a truncated cone.

The disclosure made to this embodiment of the present invention also applies to the other inventive embodiments of the present invention and vice versa.

After the food forming drum has been placed into a food forming apparatus, this cone preferably, at least partially form fits with a cone that is provided at the food forming apparatus, preferably at the side of the food forming apparatus which provides the torque to rotate the food forming drum.

Another preferred or inventive embodiment of the present invention is therefore a food forming apparatus with a seal member, preferably a flexible plate and a food forming drum, which comprises a truncated cone at its drive- and/or support side for the food forming drum.

The disclosure made to this embodiment of the present invention also applies to the other inventive embodiments of the present invention and vice versa.

The truncated cone at the food forming drum and/or at the food forming apparatus can be utilized to center, fix, preferably clamp and/or secure the food forming drum at the food forming apparatus.

Another preferred or inventive embodiment of the present invention is a food forming drum comprising a porous member (78) with a multitude of rows of porous product cavities, each row comprising a multitude of porous product cavities, and wherein a gas is utilized to flush the cavities and/or remove formed products from the cavity and/or wherein a fluid is utilized to clean the cavities, wherein the porous member designed to allow a gas- and/or fluid exchange through the porous member between two rows and/or between two passages.

The disclosure made to this embodiment of the present invention also applies to the other inventive embodiments of the present invention and vice versa.

Due to this fluid flow, a gas exchange between two rows of cavities is possible. Additionally or alternatively, a cleaning fluid can flow through the porous material from one cavity row to another.

Another preferred or inventive embodiment of the present invention is a food forming drum comprising a porous member with a multitude of rows of porous product cavities, each row comprising a multitude of porous product cavities, and further comprising a source of reduced pressure, characterized in that this source of reduced pressure is connected to the porous member in an area between two rows, to reduce gas exchange between two adjacent rows for example during the discharge of formed products.

The disclosure made to this embodiment of the present invention also applies to the other inventive embodiments of the present invention and vice versa.

Preferably, the formed products are removed from the mould cavities by ejecting a gas, preferably air through the bottom and/or the sidewall of the cavity. In order to avoid that during this ejection air passes unintentionally to adjacent rows, a negative pressure can be applied to an area or a volume between two adjacent rows of cavities.

Another preferred or inventive embodiment of the present invention is a food forming apparatus comprising a food forming drum and a flexible plate, which abuts on the circumferential surface of the drum, wherein the drum and/or the flexible plate comprise identification means and that, based on the identification, the operational parameters of the apparatus are automatically set and/or that it is checked, whether the flexible plate and the drum fit.

The disclosure made to this embodiment of the present invention also applies to the other inventive embodiments of the present invention and vice versa.

The flexible plate abuts against the radial surface of the drum and extents around a manifold through which the cavities are filled with the food mass and works as a seal for the food mass. The plate is pressed against the surface of the food forming drum. The plate is flexible, so that is contact area with the surface of the drum is maximized.

According to this embodiment, the flexible plate and/or the food forming drum comprises an identification, for example an RFID, a bar-code or the like. This identification can be manually or automatically entered into a control system of the food forming apparatus. Based on this identification, it can be checked whether the food forming drum fits to the flexible plate, e.g., whether the length and/or is width of the flexible plate matches the food forming drum. If this is not the case, the food forming apparatus will not start and/or a warning will be dispatched.

Alternatively or additionally, operational parameters of the food forming apparatus, e.g. the feeding pressure of the product, the speed of rotation of the drum, the amount of gas ejected out of each cavity to remove the product from the mould cavity, the pressure which is maintained or set after the filling is completed and/or the rotational position at which the products are removed from the drum, are automatically set. This reduces the effort of the workers at the machine and/or avoids mistakes and/or accidents during the operation of the food forming apparatus.

Another preferred or inventive subject matter of the present invention is a food forming drum comprising a porous member, wherein the porous member comprises two layers with different porosity which are bonded together, wherein the layer at the surface of the food forming drum has a lower porosity than the layer inside the outer layer.

The disclosure made to this embodiment of the present invention also applies to the other inventive embodiments of the present invention and vice versa.

According to this embodiment of the present invention, the outside layer of the porous member has preferably a denser structure than the inner layer and can be, for example, a foil, a rolled plate or a thin walled tube. This can be advantageous because it saves the process-step to close the pores at the outer circumference of the porous member. It is also possible that the layered structure of the porous member, for example the porous drum, is made by providing different powders in the mold which will after pressing and sintering result in a two layer structure, wherein the outer layer is at least essentially closed, so that no compressed air can exit through this layer. After the sintering process the porous base will adhere to the outside layer. The porous cavities are produced by removing the outer layer and the inner layer at least partially in the locations in which a cavity is desired.

In a preferred embodiment, the outside layer is provided in the circumferential direction as at least partially at one or more of the end faces of the insert. The outside layer in both circumferential end faces is advantageous for the bonding between inserts and/or other parts of the drum. The outside layer in the two axial end faces of the insert is advantageous to seal the insert in this location.

The outside layer can be for example foil, plate(s) or made by providing different powder in the mold which will after pressing and sintering result in a closed structure. After the sintering process porous base will adhere to the outside layers.

Another preferred or inventive subject matter of the present invention is a food forming drum comprising an inner cylinder and at least one porous member and at least one rib between the cylinder and the porous member, wherein the rib is connected to the cylinder by a form- and/or force-fit or by an adhesive bond, and wherein the rib is provided movable relative to the cylinder.

The disclosure made to this embodiment of the present invention also applies to the other inventive embodiments of the present invention and vice versa.

Due the movement and or the deformation of the rib between two porous segments, the rib can follow the porous segment during its shrinkage after or during the sintering process. Hence the connection, particularly the material bond between the rib and the porous material will not be damaged and/or overloaded. The movement of the rib relative to the cylinder is preferably a rotation.

Preferably, the rib provided deformable. This can be achieved by providing the rib in a relatively soft material with a relatively low modulus of elasticity and/or a relatively thin rib and/or constructional means such as indentations notches or the like, which improve the deformation of the rib in the desired direction.

According to an inventive or preferred embodiment of the present invention, each rib is provided as two parts.

The disclosure made to this embodiment of the present invention also applies to the other inventive embodiments of the present invention and vice versa.

The two parts are preferably mirror-symmetrically and extend both over the entire length of the drum. Both parts are preferably connected to the cylinder. Preferably, a gap is provided between the two parts, which preferably extends in radial direction. During the shrinkage of the porous material this the size, particularly its width increases. Preferably, the gap is closed and/or filled, for example by welding, after the shrinkage is completed.

In a preferred embodiment the size of the gap is increased beyond the degree of shrinkage so that the porous segment between two ribs is compressed. This can be achieved for example by mechanical or thermal forces. Subsequently, this gap is filled with a material, for example a welding material, that fixes the gap in its desired shape so that the porous segments remain compressed.

Another preferred or inventive embodiment of the present invention is a food forming apparatus, wherein the food forming drum rotates on a spindle and wherein the spindle is designed to be removed preferably together with the drum.

The disclosure made to this embodiment of the present invention also applies to the other inventive embodiments of the present invention and vice versa.

According to this embodiment of the present invention, the food forming drum rotates around a spindle, which is connected to the inventive food forming apparatus. In case the food forming drum has to be removed, for example for a product change or for cleaning purposes, the drum is removed together with the spindle. Prior to removing the spindle, it has to be disconnected from the food forming apparatus.

The removal of the spindle together with the drum has the advantage, that the food forming apparatus can better be cleaned and that the spindle can be utilized to bear the drum on a transportation trolley.

Preferably, the spindle is part of a production support means, which comprises a support structure, bearings for the drum. This production support means support the food forming drum on the food forming apparatus. More preferred, this entire production support means are removed together with the drum.

Another preferred or inventive embodiment of the present invention is a food forming apparatus with a seal member, preferably a flexible plate and a food forming drum, which is beared with bearings on a spindle, wherein the seal member and the bearings are mechanically connected such that they build a force closed system.

The disclosure made to this embodiment of the present invention also applies to the other inventive embodiments of the present invention and vice versa.

The seal member, e.g. a flexible plate abuts against the radial surface of the drum and extents around a manifold through which the cavities are filled with the food mass and works as a seal for the food mass. The plate is pressed against the surface of the food forming drum. The plate is flexible, so that is contact area with the surface of the drum is maximized.

Due the closed force system, the force that as to be absorbed by the frame of the food forming apparatus is reduced and/or the contact between the seal member and the radial circumference of the drum is more intimate.

Another preferred or inventive embodiment of the present invention is a porous member, which is part of a food forming drum, wherein it comprises an embedded fluid channel and/or a support area parallel to the centre axis of the drum.

The disclosure made to this embodiment of the present invention also applies to the other inventive embodiments of the present invention and vice versa.

According to this embodiment of the present invention, the porous material comprises an embedded fluid channel. This fluid channel is not the pores of the porous material, but a channel, that preferably extends parallel to the axis of rotation of the drum and connects the mould cavities of one row of fluid cavities fluid-wise. Via such a channel a gas can be supplied to the mould cavities of one row to eject the products from the mould cavities and/or the mould cavities can be vented via this channel during their filling. The channel is preferably machined into the porous material or part of the form which is utilized to produce the porous member.

Another preferred or inventive embodiment of the present invention is a movable unit to transport the drum, wherein it comprises a support frame for a production support means, the production support means comprising a spindle and a support structure to bear the spindle.

The disclosure made to this embodiment of the present invention also applies to the other inventive embodiments of the present invention and vice versa.

The movable unit is designed such that comprises a support frame to which the entire production support means can be attached. This production support means preferably remains at the movable unit in case the mould drum is stored in a storage and/or in case that the drum is cleaned in a cleaning unit.

Another subject matter of the present invention is a method to change a food forming drum at a food forming apparatus comprising a frame the production support structure of the food forming drum is connected, wherein the drum is changed together with the production support means.

The disclosure made to this embodiment of the present invention also applies to the other inventive embodiments of the present invention and vice versa.

Another subject matter of the present invention is a method to clean a food forming apparatus comprising a spindle around which bears a rotating food forming drum, wherein the spindle is removed prior to cleaning, preferably together with the drum.

The disclosure made to this embodiment of the present invention also applies to the other inventive embodiments of the present invention and vice versa.

Another subject matter of the present invention is a method to operate a food forming apparatus, which comprises a mould drum with a multitude of rows of mould cavities, whereby each row is connected to a passage which can be subjected to a medium with positive or negative pressure relative to the ambient pressure, characterized in that at two adjacent passages one passage is subjected to a medium with positive pressure and the adjacent passage to a medium with negative pressure.

The disclosure made to this embodiment of the present invention also applies to the other inventive embodiments of the present invention and vice versa. With this embodiment, it is avoided that during discharge of a product from a certain row of cavities, products in an adjacent row are removed from the product cavities unintentionally.

Another subject matter of the present invention is a method to produce a food forming drum, which comprises an inner cylinder and a porous member, which is made from a sintered powder, wherein the powder is directly applied to the inner cylinder and/or to ribs which are part of the inner cylinder.

According to this embodiment of the present invention, the sintering of the porous material takes place in situ, i.e. at the inner member, for example the inner cylinder of the drum. After pressing and sintering of the power, for example a metal powder, a porous structure remains wherein product cavities can be made and/or pores at the surface can be closed.

The porous member can be a cylinder made of one or more pieces or can be inserts, each being placed between and/or above one or more rib(s).

The porous member is preferably made form a sintered material, preferably sintered metal.

Each rib can be provided as a single piece together with the inner member or each rib can be attached to the inner member for example by an adhesive connection.

Preferably the axis of rotation of the inner member is provided parallel to a vertically.

According to a preferred embodiment of the present invention, the porous material comprises two or more layers. The two layers can be made from the same or a different material. However more preferably, the material is different. Preferably the two layers differ in their porosity. Preferably, the two layers are provided coaxially.

Preferably, the two layers are produced sequentially. Firstly, the inner layer is produced and then the outer layer. Afterwards, mould cavities are machined into both porous layers.

Another preferred or inventive subject matter of the present invention is a method to produce a food forming drum, which comprises an inner cylinder a multitude of ribs and a porous member made from a sintered powder and provided between two ribs respectively, wherein the ribs move relative to the inner cylinder and/or deform during or after the sintering of the porous members, particularly due to a shrinkage-force.

Preferably a gap within the rib or between two ribs resulting from the movement and/or the deformation of the rib, particularly between two ribs or two parts of the rib is closed. This an be achieved for example by providing a filling material such as a welding material which more preferably is machined afterwards.

Another subject matter of the present invention is a mould drum, comprising an inner member and a porous member, wherein the porous member comprises two layers made from a powder material.

The disclosure made to this embodiment of the present invention also applies to the other inventive embodiments of the present invention and vice versa.

The layers can be made from the same or different materials. The layers can be treated identically or differently, for example heat- and/or pressure-treatment.

Preferably, the layers are provided at least partially coaxially, wherein the outer layer has less porosity than the inner layer. More preferably, the material of the outer layer is more compressed than the material of the inner layer.

According to yet another preferred or inventive embodiment, the porous member is produced in situ at the inner member.

In situ according to the invention means, that the porous member, is produced, preferably sintered, at the inner member, i.e. the inner member and the porous layer are not produced as separate parts and then attached to each other. A disassembly of the porous member from the inner member is impossible without destroying the porous member.

The disclosure made to this embodiment of the present invention also applies to the other inventive embodiments of the present invention and vice versa.

Preferably, each porous member comprises two layers, which are, more preferably, both produced in situ.

Another subject matter of the present invention is a food forming drum resulting from this inventive process.

Another inventive or preferred subject matter of the present invention is a system for moulding products from a mass of food material comprising the inventive food forming apparatus and/or the inventive movable unit and/or the production support means and/or the drum and/or the inventive cleaning apparatus and/or a storage unit.

The disclosure made to this embodiment of the present invention also applies to the other inventive embodiments of the present invention and vice versa.

Another preferred or inventive subject matter of the present invention is a food forming system comprising the inventive food forming apparatus and the production support means and the food forming drum.

The disclosure made to this embodiment of the present invention also applies to the other inventive embodiments of the present invention and vice versa.

Another preferred or inventive subject matter of the present invention is a transport system comprising the movable unit and the production support means.

The disclosure made to this embodiment of the present invention also applies to the other inventive embodiments of the present invention and vice versa.

The food forming drum is removed from the food forming apparatus together with the production support means and can be moved to a cleaning unit and/or to a storage unit.

Another preferred or inventive subject matter of the present invention is a cleaning system comprising a cleaning apparatus and the food forming drum.

The disclosure made to this embodiment of the present invention also applies to the other inventive embodiments of the present invention and vice versa.

Another preferred or inventive subject matter of the present invention is a storage system comprising a storage unit and the food forming drum.

BRIEF DESCRIPTION OF THE DRAWINGS

The inventions are now disclosed according to FIGS. 1-20c. These explanations do not limit the scope of protection of the present inventions. The explanations apply to all embodiments of the present invention likewise.

FIGS. 5A and 5B shows a different embodiment of a mould drum consistent with the teachings herewith.

FIG. 6 shows a different embodiment of a mould drum consistent with the teachings herewith.

FIG. 7A-7G shows a different embodiment of a mould drum consistent with the teachings herewith.

FIG. 8 shows a different embodiment of a mould drum consistent with the teachings herewith.

FIG. 9A-C shows the production of an insert

FIG. 11-12 show the movable unit.

FIG. 14A-14E show the fastening of the drum at the food forming apparatus.

FIG. 15 shows the fixation of the drum at the support- and the drive-side of the food forming apparatus.

FIG. 17 shows the cleaning of the food forming drum.

FIGS. 18A and 18B shows the cleaning of the food forming drum.

FIGS. 19A and 19B shows the cleaning of the food forming drum.

FIG. 20A-20C shows the discharge of the formed product.

DETAILED DESCRIPTION

Figure 1:
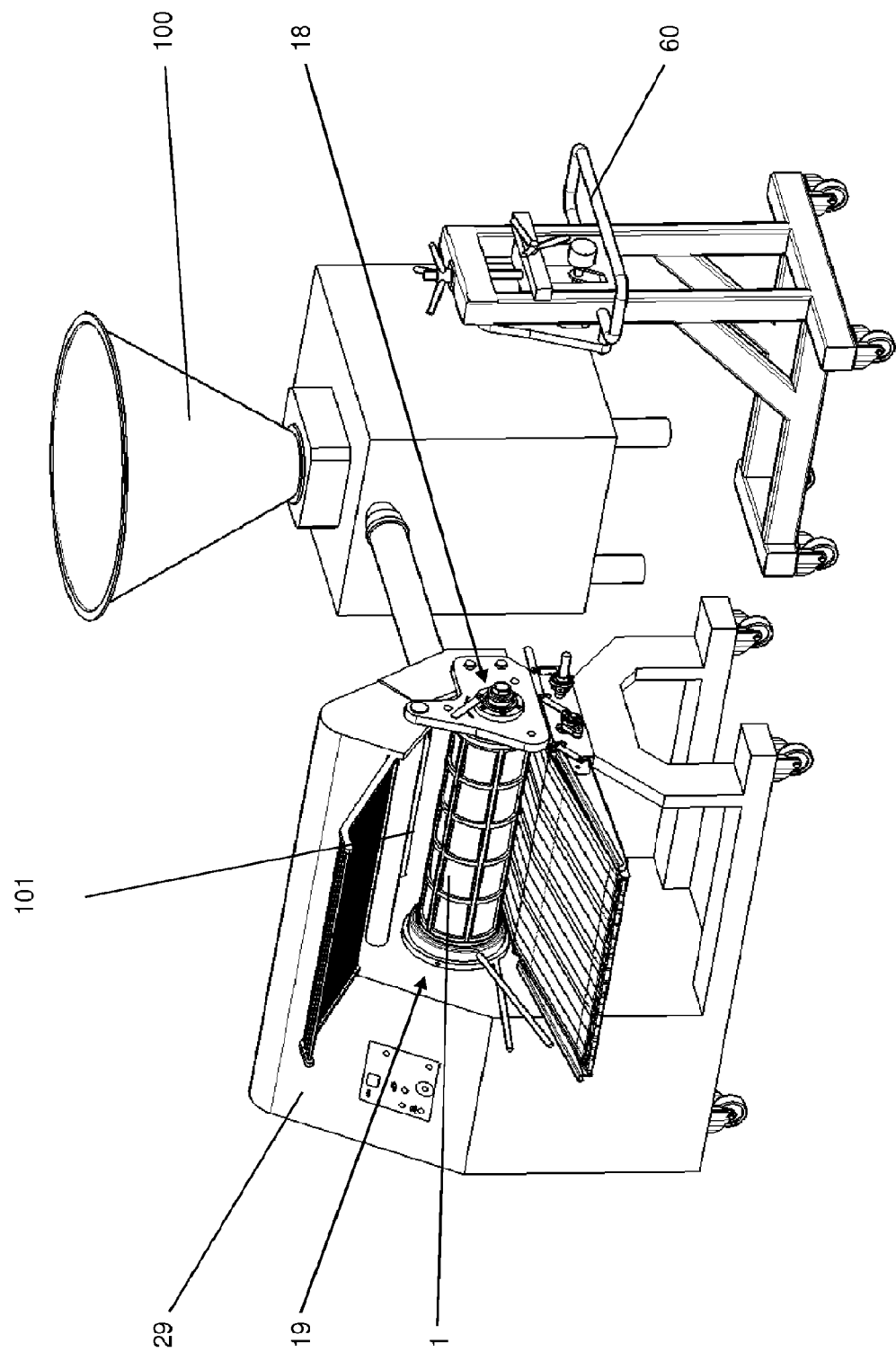
FIG. 1 shows the inventive food forming apparatus.

FIG. 1 shows a layout with a forming apparatus 29, a mass supply system 100 for supplying mass to the forming apparatus and a food mass feed member 101 for distributing the mass to the mould drum 1. A sealing member is provided which abuts against the surface of the drum around for sealing the surface of the mould drum to prevent leakage of mass during production. Mould drum 1 is provided with product cavities 2. The mould drum comprises at one end a drive side 19 which is connected to a motor means which is preferably located in the forming apparatus. At the opposite side 18, which is in the following called the support side, the drum is supported at the frame of the forming apparatus.

The drum 1 comprises basically an inner member 77 and at least partially porous, inserts. In the present case, the inner member comprises an inner cylinder 75 and a multitude of ribs 76. Two adjacent ribs form in the present case a recess. The inserts are preferably irreversibly fixed in the recesses of the inner member 77. Regarding preferred fixation technologies, reference can be made to WO2012107236 which is herewith incorporated by reference and thus part of the present disclosure.

The mould drum preferably comprises two main parts, an inner member 77, and porous inserts 78. In the present case, the inner member 77 comprises an inner cylinder 75, which can be, for example, a thick-walled preferably stainless steel tube 75 and one or a multitude of ribs 76. The ribs 76 and the inner cylinder can be provided as one part, for example, rotationally casted, or a tube whereby the necessary recesses between two ribs 76 are created by machining, preferably by milling. The inner member can also be a stainless steel tube whereby the necessary drum design, for example the ribs 76, is already casted or can be a single-piece sintered part. FIG. 2A shows another embodiment of inner member 77. The inner cylinder 75 can be for example a thick-walled stainless steel tube which is rotational casted or is a commercial available tube whereby ribs are connected to the stainless steel tube by an adhesive connection, for example welding, preferably by laser-welding.

After connecting the ribs 76 to the tube, this preassembly is preferably pre-machined. The porous inserts 78 are preferably pre-machined as well before both can be fixedly connected to each other for example by brazing in a vacuum oven. Other bonding means such as glue or stainless steel epoxy are also possible. Welding, preferably laser-welding, can also be used. The inserts will be weld to ribs 76 at the outer surface/diameter of the drum over the whole insert length. Before welding other bonding means like glue or stainless steel epoxy can be used too to seal the contact area between insert and rib. The bonding means must be approved for use in the food-industry and must be resistant against the force, the pressure, the temperature and/or the chemicals during production and/or during cleaning.

Figure 2B:
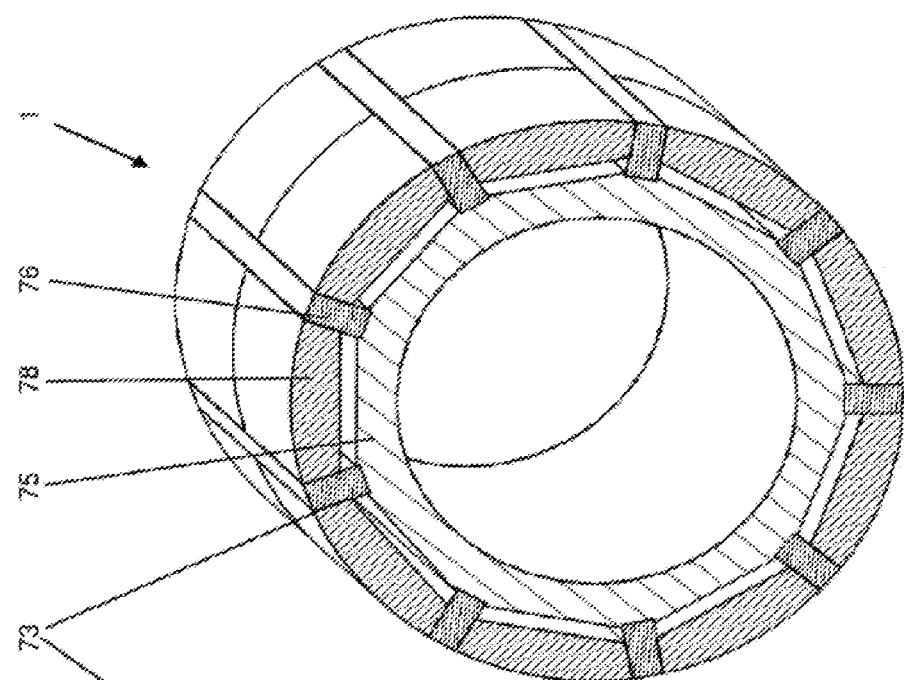
FIGS. 2A-2N and 2P-2V show different embodiments of the inventive food forming drum.
Figure 2A:
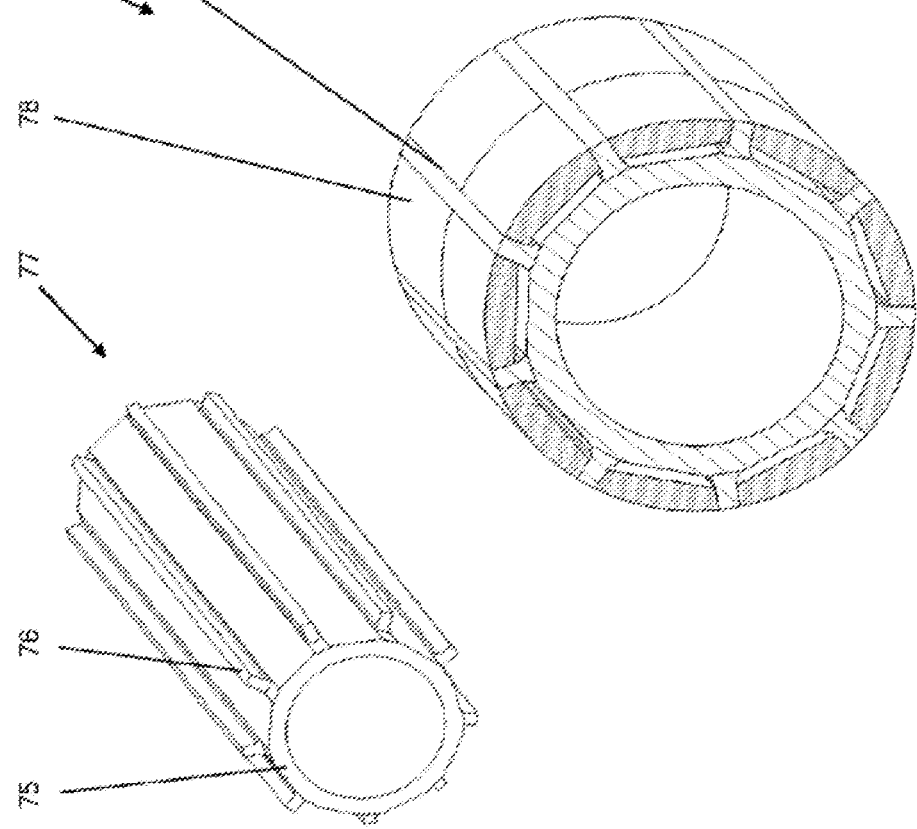

In FIG. 2B yet another embodiment of the present invention is shown. Tube 75, ribs 76 and inserts 78 will all be connected to each other in one set-up, preferably by brazing. This saves considerably in especially machining time. In this set-up no machining of the ribs is necessary. Additionally, deformation of the assembly due to welding stresses will be avoided. Brazing material will be provided between ribs 76 and tube 75, and between rib 76 and inserts 78.

Depending on the bonding mechanism which will be used, the pores of the inserts are preferably closed at the bonding locations 73, for example to prevent that bonding material will penetrate into the porous material. Even the pores of the surface of the inserts which are projected on the outer surface of the drum can be closed and/or the pores of both front ends of the inserts. After the adhesion process, preferably brazing, of the ribs 76 to the inner cylinder 75 and/or the adhesion of the inserts 78 to the ribs 76, the mould drum will preferably be further machined. For instance one or both front ends 3, 4 of the drum will preferably be machined and when required and/or not yet done, the pores of the porous inserts 78 opening out at the drum front end 3, 4 are preferably closed. This closing can, for example, be done by deep rolling and/or thermal spraying which will be explained later in this document.

Distributor means 9, for example to distribute a cleaning liquid to each passage 8, are preferably machined into tube 75 and/or porous inserts 78 and/or form-fit-means 7, to transfer a torque to the drum are preferably machined into the tube 75.

Figures 1, 2C:
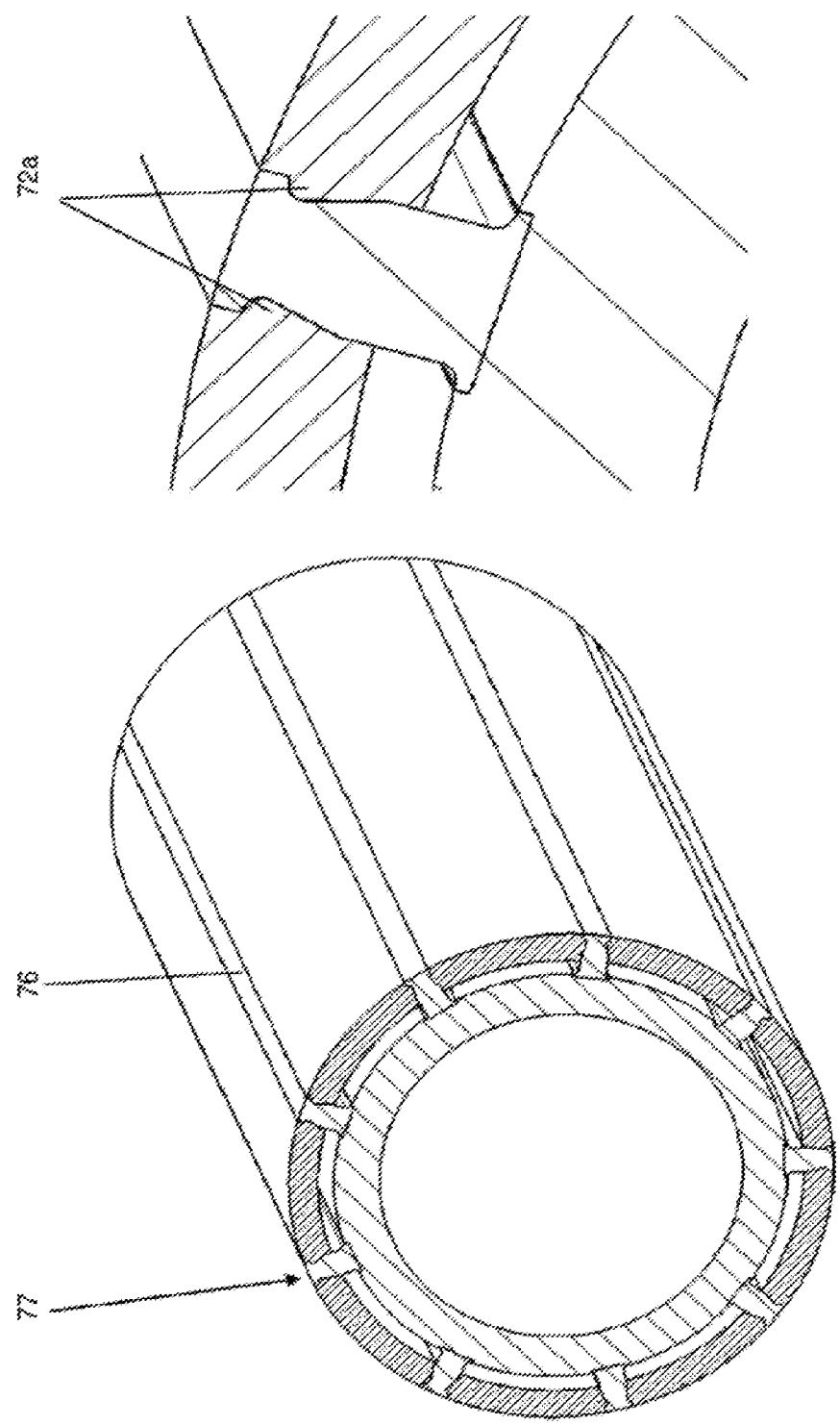

FIG. 2C-1 shows an embodiment of manufacturing a drum not by using inserts but by applying powder directly in the recesses between two ribs 76 of inner member 77. After pressing and sintering, a porous structure remains wherein product cavities 2 can be made and/or pores at the surface can be closed. Depending mainly on the contact surface between the porous material and the ribs, the ribs can be provided with recesses 72a to improve the connection between the porous material and the ribs.

To create passages 8, a filling/insert 68 can be used in every row as a space-holder to avoid that the powder from which the porous material is sintered, enters the space for the passage 8. This filling/insert is preferably a hard material that can withstand the forces during the pressing of the powder. More preferably, the filling/insert is a particulate material, that can be removed easily from the passage after pressing and before sintering these filling/inserts has to be removed without damaging the porous structure.

In another embodiment a gas- and/or fluid-permeable structure 72b is used for creating a passage 8 underneath a porous structure as shown in FIG. 2C-2 till FIG. 2C-4. The permeable structure will support the porous powder before and/or during pressing and/or sintering and/or later during the subsequent machining of the drum and/or during production of formed articles with the drum. The support structure has to be gas-, particularly air, and/or fluid-permeable in order to allow air and/or a cleaning fluid to enter and/or exit the porous structure. Preferably, the permeability of the support structure is larger than the permeability of the porous material. However, preferably, the permeability is so low that the powder from which the inserts are sintered is held back by the support structure. This permeable support structure can for example be made based on a wire mesh which has basically a larger permeability than the permeability of the intended porous structure will have. This is to prevent that air and/or fluid, particularly cleaning fluid will be blocked by the permeable structure. The wire mesh can for example have a wire diameter of 0.4 mm.

The mesh structure will have a permeability of for example 200 micron. In case the chosen permeable structure, for example the wire mesh, is not rigid enough to withstand the load during pressing of the powder, the permeable structure can be reinforced, preferably by providing a layer with a multitude of layers of permeable structures, which more preferably are connect them together, for example in a sintering process in an oven. However, the resulting permeable structure should have a permeability still larger than the permeability of the resulting porous structure.

The passage 8 preferably has a uniform cross section over the entire length of the drum. Therefore the position of the wire mesh with respect to ribs 76 and with respect to the outer diameter of tube 75 is preferably uniform as well. FIGS. 2C-3 and 2C-4 shows an embodiment with a means, here a recess 72c which accommodates the outer end of the permeable structure, here the wire mesh, so the position of the permeable structure, here the height, at the location of the ribs is secured. This assures a uniform height of the passage 8. Additionally or alternatively, the permeable structure is connected to the rib by a material fit, for example welding. The permeable structure can be supported at another location "M", here the center of the passage between two ribs. This can, for example, be achieved by providing the tube 75 with extensions, preferably over its entire length, for example multiple, preferably round, rods connected, for example with their head end, to the outer diameter of tube 75. The wire mesh can be connected to the extensions by welding or gluing. In a succeeding step the passage area provided with extensions can be filled with a filler material, for example a powder material, which filler material is able to withstand the forces during pressing of the powder from which the porous material is sintered. After pressing and before sintering the filler material must be removed.

When applying the porous material between the permeable structure and outer member 69 of the mold, as will be explained according to FIG. 2H, the used powder can also penetrate into the permeable structure, which is preferably avoided by choosing an appropriate permeable structure with openings which are smaller than the average diameter of the powder from which the porous structure is made.

During production of formed products, the load on the porous structure will be at the outer surface of the drum but also from underneath, e.g. from passage 8. The relatively weak porous structure will be deformed and will be kept in place by the connection between the ribs and permeable structure. The mechanical properties of the permeable structure can be further increased by material fitting, preferably welding, the wire mesh against the ribs, preferably over the entire length of the drum, see 72d.

In a final step during the production of the drum, the outer diameter of the drum assembly will be machined to its final diameter and when not done yet, the pores at the outer circumference of the drum will be closed and/or should be kept closed. With this step, for example grinding, or with an additional machining step the drum obtains its final diameter.

The pores can be closed, for example by grinding with a suitable grinding wheel and suitable grinding parameters or it can be done, for example, by deep rolling. During deep rolling, a rolling element, for example a sphere, but preferably by a cylinder as a roller, which is pressed against the porous surface to be closed or in case of a drum assembly, against the outer surface, preferably including ribs 76 of the drum assembly. The compression provided by the roller creates stress in the surface of the porous material and/or the ribs 76, whereby this stress will exceed the yield point and a plastic deformation takes place at the surface layer of the mould drum. The pores of the porous inserts will be closed by this deep rolling. An additional advantage of deep rolling is the increased density in the surface layer, which will increase the strength and wear resistance in this layer. During production of formed food products, a sealing member of food mass feed member 101 is acting under relatively high pressure against the outer surface of the mould drum 1. As a result of the deep rolling, the lifetime of the mould drum will be increased.

Reference can also be made to WO2012/107236 which describes the use of a spraying process, preferably a thermal spraying process to seal the outer surface of the drum. In this process a relatively thin layer will be applied to the partly porous outer surface which layer will close the porous structure. Afterwards the layer will be machined to achieve the desired surface roughness, dimensions and tolerances.

The layer doesn't necessarily have to be a metal layer. Another material can be used as well as long as the used material is approved for use in food machinery. Further a material should be chosen which has sufficient mechanical properties to withstand the load on the drum and the layer should be wear resistant due to the friction forces on the outer surface exerted by the sealing, the cutting member and the processed mass.

The prefabricated drum can be stored. Once there is an order for a drum, the desired product cavities will be machined into the cylindrical surface of the drum.

Figure 2E:
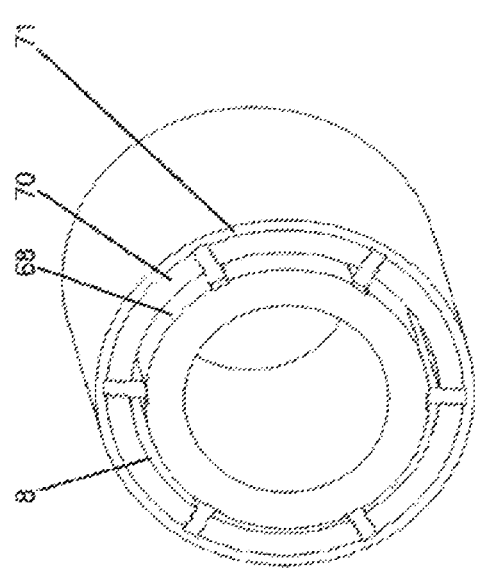
Figure 2F:
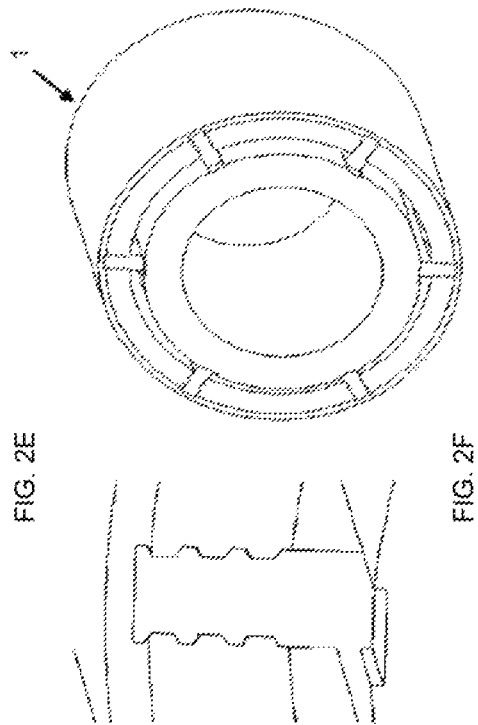
Figure 2D:
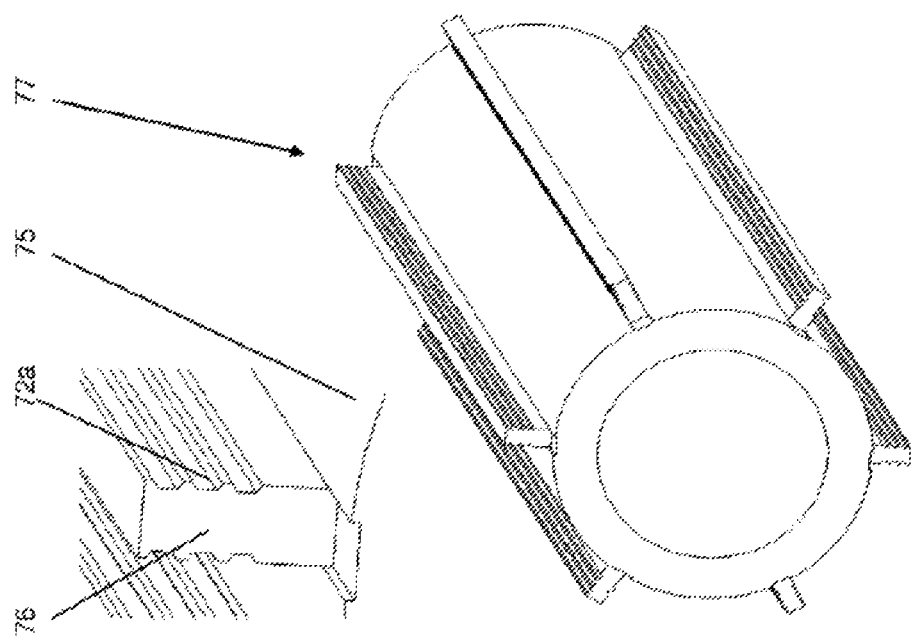

FIGS. 2D-2F show another embodiment of the production the porous member 70 in situ, here by applying powder, from which the porous member is made, directly in each recess between two ribs 76 of inner member 77. In FIG. 2D shows a preferred embodiment of the present invention. Here, the ribs 76 are provided with recesses 72a. The overall strength of the connection between the ribs and porous material will be improved by the recesses in the ribs. The recesses are optional. It is also possible to provide means which increase the friction between the rib and the porous member. The shape of the recesses is such that the porous structure form- and/or force-fits in the recesses of the ribs to improve the form- and/or force-fit between the porous member 70 and the ribs. The number of recesses will depend on the dimension of the porous part and/or the load during production and cleaning of the drum.

For producing the porous layer(s) 70, 71 in-situ, the inner member 77 is positioned such, that its center axis is preferably in a vertical position. The porous layer 70 is produced by adding powder to a mold. The mold, for example a cylinder will accommodate the inner member 77 but preferably also filling/inserts 68 to provide the passages 8 in every row. Depending on the binding between the powder and the ribs, the powder can already be (pre-)pressed and/or (pre-) sintered in order to achieve the porous structure. Subsequently the outside layer 71 will be produced. The outside layer 71 preferably has a structure with less porosity, e.g. a denser structure, than the inner layer 70 and is preferably produced by adding a different powder in a preferably different mold, into which the inner member 77 plus the inner porous layer 70 are placed. The powder for the outside layer is inserted into a gap between the inner member and the inner porous member (s) and the mould.

The drum as shown in FIG. 2E can be finished by a sinter process. Afterwards, the cavities are machined into the outer circumference of the mould drum, preferably, into both layers 70, 71.

After the sintering process, the diameter of the drum, preferably exceeds the desired diameter of the drum. Preferably, in a subsequent machining step, the drum gets its final diameter and/or its final shape. FIG. 2F shows the drum after further machining of the outer diameter which can be done after the sintering process but also later on during the manufacturing of the drum. The final diameter of the drum is provided by this machining. Advantage of this embodiment is that a dense outer layer is created with result that there is no need any more to close the pores at the outer surface of the drum by a machining step or the like.

FIG. 2G shows a preferred embodiment of the inner member 77.

Mold 72 in FIG. 2H will consist of inner member 77 and filling/inserts 68 and will preferably be vertical positioned in a press. The outer member 69 of the cast comprises a cylinder, whose diameter can be, preferably, reversibly decreased. Between two ribs, a filling/insert 68 will be provided, to allow space for a passage. After positioning the inner member 77 into the outer member of the mold 69, the gap between inner member 77 and outer mold member 69 of the mould will be filled with powder. Subsequently, the outer member can be reduced in its diameter, so that the powder is compressed to produce the porous structure with interconnecting pores. Heat can be added during the compression and/or afterwards to achieve a sintered material. The embodiment in this FIG. 2H is without a dense layer 71 but can, when required, be provided with a dense outer layer.

FIG. 2I shows the compression of the applied powder to create the porous structure. Arrows showing an inside force which can be applied and can be, e.g. provided by a pressurized fluid. This inside force prevents that the inner member will deform due to the press forces at the outer circumference of outer mold member 69. Depending on the stiffness of inner member 77 and the applied forces at outer mold member 69 these inside forces will not be necessary. The applied outside force reduces the outer mould member 69, preferably reversibly, in its diameter and thus compresses the power for the mould member 70. Preferably before sintering the porous members 70 in an oven, the filling/inserts 68 will be removed to create passages 8. In another embodiment (not shown) the drum is sintered as one piece, which is in situ connected to the inner member 77.

Preferably different powders are utilized to produce the outer porous member 71 and the inner porous member 70 and the production process can consist out of one or more pressing steps and/or sintering steps. Alternatively, the same powder is utilized for both porous layers 70, 71, wherein the material is compressed differently.

Figure 2K:
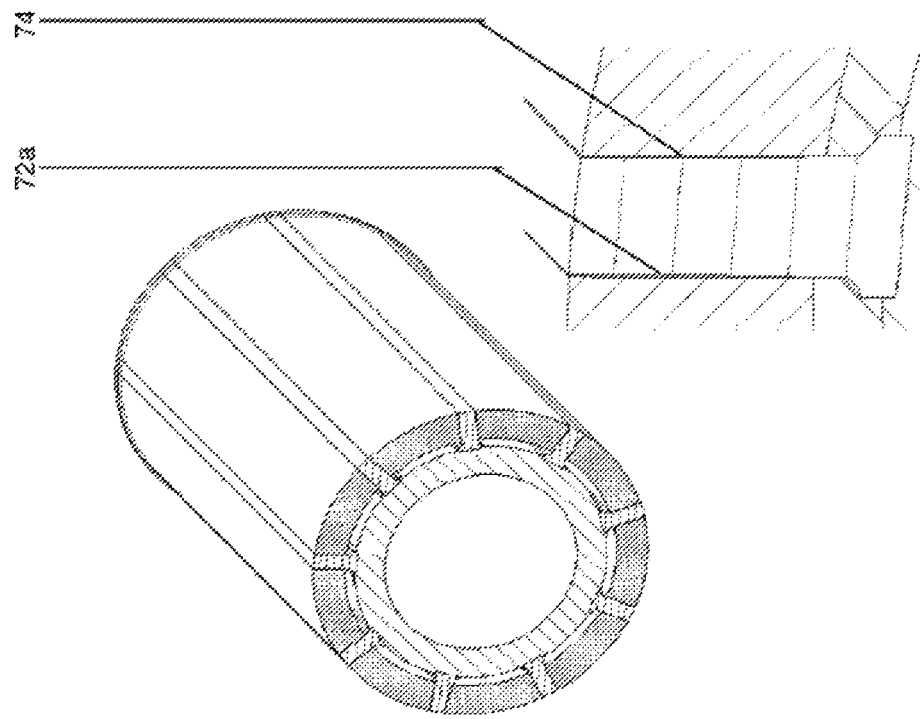
Figure 2J:
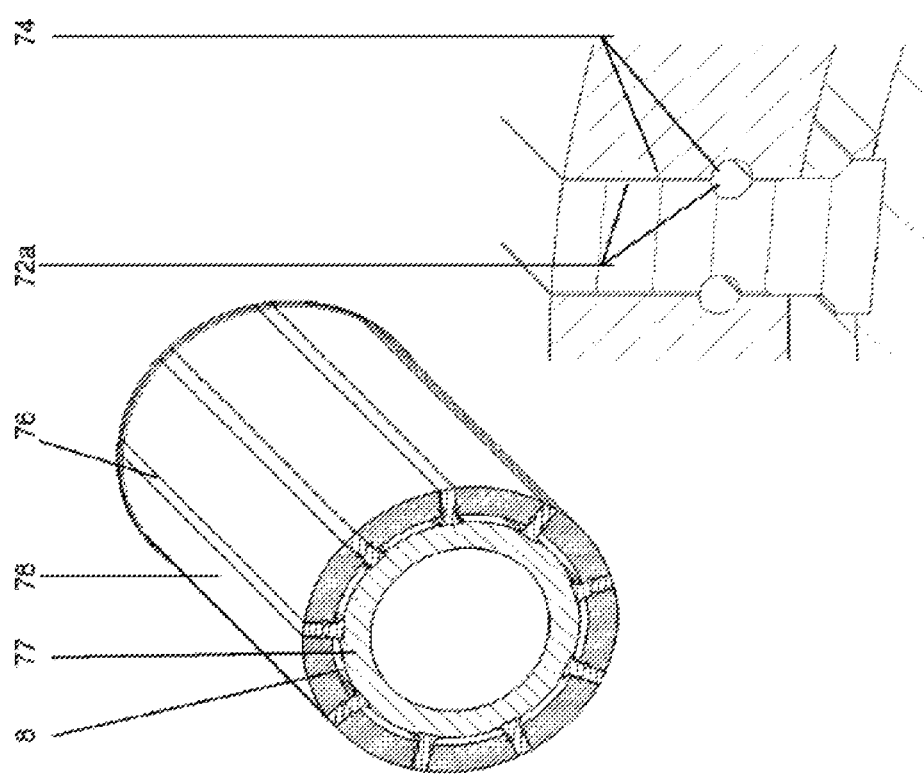

In FIG. 2J shows an embodiment with recesses 72*a* in rib 76 and recesses 74 in porous insert 78. In case the bonding agent is glue (anaerobic, epoxy based, etc) an optimized bond gap is created by the small recesses in 72*a* and/or 74. The larger recesses 74, in FIG. 2J, here circular shaped, are used to supply liquid bonding agent to this recess and to all connected recesses. The bonding agent preferably flows from the recess 74 into the slot-like gap 72*a*. The bonding agent is supplied, preferably pressed into gap 72*a*, 74 after the porous member 78 has been inserted into between two ribs. After curing this large recess functions as a form- and/or force- and/or friction-means to prevent that the porous inserts will come loose from the drum during production or the cleaning process.

FIG. 2J can be utilized to explain yet another embodiment of the present invention. The fixation of the inserts can further be improved by a combination of mechanical fixation and adhesive means. In a preferred embodiment an adhesive means is provided in the recesses 72*a* and 74. Then the inserts will be positioned between two ribs and mechanical locking means, here a pin (not depicted) will be applied into the large recess 74, in FIG. 2J the circular shaped recesses and a form-fit connection will be achieved. In case adhesive means have been added, excess adhesive means can be removed via the small recesses 72 a in the direction of the outer surface of the drum. The locking pin/locking means are preferably somewhat larger in diameter than the recess 74 in the inserts and/or rib 76 and by applying the locking pin/locking means into this recess, the porous material will deform and a pretension between the porous member and/or the mechanical locking and/or inner member will be achieved.

In another embodiment mechanical fixation in combination with a sealant/sealing means can be used. The mechanical fixation will adopt the forces during production and cleaning and the sealant/sealing means will close the small gaps which caused by tolerances during production of the several parts. Depending on de used sealant only the large recesses 72*a* and 74 for applying the locking pin will be needed and the small recesses 72*a* and 74 will not be need anymore."

FIG. 2K shows another embodiment with only small recesses to achieve an optimized bond gap. In this embodiment a bonding agent has to be applied to the bond surfaces before assembling the porous inserts in the drum.

To prevent that bonding agent will accumulate in passage 8 in both embodiments where the porous inserts are in contact with passage 8, no bond gap exists between insert 78 and rib 76. FIGS. 2L-2N and 2P-2Q show a method to produce a drum with an outer member 77*a*, which comprises a sheet metal tube 71 and porous parts 70. The powder from which the porous parts 70 are produced is placed directly in the recesses between two ribs 76 of outer member 77*a*. FIG. 2L shows a subassembly consisting of a thin-walled sheet metal tube 71 and a plurality of ribs 76. The ribs 76 can be provided with a recess and/or a convexity 72*a* as for example shown in FIG. 2D to assure a better bonding and/or a better form- and/or force-fit between the porous structure and the ribs. In a next manufacturing step, see FIG. 2M, the sheet metal tube and the ribs 76 are positioned in a mold 72, preferably in a vertical position, and porous parts 70 are created by adding powder to the mold. The mold will accommodate the outer member 77*a* and an inner member 69*a* which is preferably made of a flexible material. The powder will be added to the hollow space between the cylinders 71, 69*a* and the ribs 76. The arrows symbolize an inside force which can be created for example by a pressurized fluid. By pressing mold member 69*a* towards the powder, the applied powder will be compressed and thereafter sintering the porous structures will be carried out. An outside force (not shown) can prevent that the outer member 77*a* will deform during pressing, if needed.

Figure 2Q:
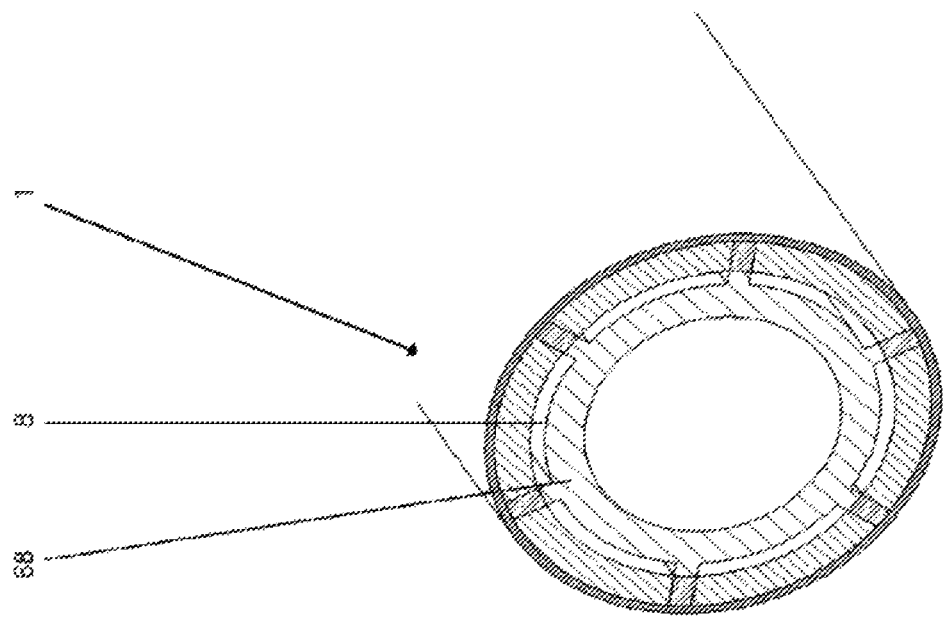

The outer member 77*a* will subsequently be connected to the inner member 77 by connection means (not shown) for example an adhesive joint, like welding, soldering, brazing and/or gluing and/or a mechanical connection, etc., as depicted in FIG. 2Q. Due to the sheet metal outer layer 71 there is no need to close the pores at the outer surface of the drum. The product cavities are later on machined into the outer member, wherein each product cavity extends through the sheet metal layer 71 and into but not through the porous structure.

Figure 2P:
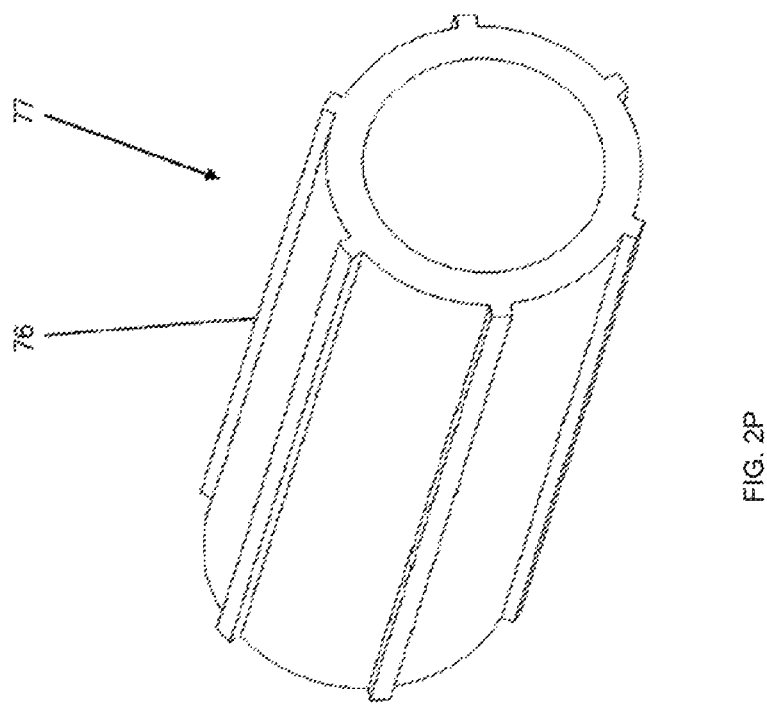

Passages 8 are a result of ribs 76 created on inner member 77 as shown in FIG. 2P. Instead of inner member 77, passages 8 can be part of outer member 77*a*. Filling/inserts 68 will then be needed to create those passages.

FIG. 2R shows another embodiment of manufacturing a drum. The final drum consists of an inner member and a subassembly of ribs, preferably a support such as a wire meshes and a porous structure.

In case a wire mesh is used, in a first manufacture step, segments of wire meshes 72*b* are connected, preferably welded to two ribs, respectively, which ribs are positioned preferably in a mold to assure the correct position of the ribs. In a next step this subassembly of ribs and wire meshes is positioned inside a press. Depending on the design of the inner mould member 69*a*, filling/inserts 68 can be provided to allow space for the passages to eject air and/or a cleaning fluid. Subsequently, the gap between the wire meshes and ribs and the outer circumference 69 of the sinter press is filled with sinter-powder and the pressing process can be started. Preferably an individual porous part is produced between two ribs, respectively, i.e. the porous sintered part is inserted between two ribs 76. After sintering the outside dimension of the subassembly will, due to shrinkage of the sinter material, be smaller than the outside diameter of the subassembly after pressing, i.e. its inner diameter is reduced. In a following step and according to one embodiment, the subassembly of ribs, preferably wire meshes and the porous structures need to be machined, i.e. its inner diameter needs to be increased, in order to be able to connect it to the outer diameter of the inner member 77.

The inner member 77 comprises an inner cylinder. The subassembly is preferably slid over the inner member and both will be connected to each other rigidly in order to withstand the forces during production and cleaning. This connection can be achieved by using connection means known to the person skilled in the art, e.g. bolts but other connection means such as welding and/or a mechanical connection is also possible as long as the connection meets the hygiene- and/or mechanical requirements. By using end caps 3' and 4', as for example shown in FIG. 4 of this application, the stiffness of the drum can be further improved by, for example, securing the position of the ribs to recesses in the end caps.

In another embodiment not only the subassembly of ribs and preferably a support structure such as wire meshes will be positioned in the sinter press but also the inner member 77. Suitable powder or other material, which creates a material-bond between the ribs and the inner member within the oven and/or during pressing, can be applied between the rib and the inner member. During the sinter process not only a connection of the porous powder with the ribs and the support structure will occur but also a connection between the ribs and the inner member.

Figure 2U:
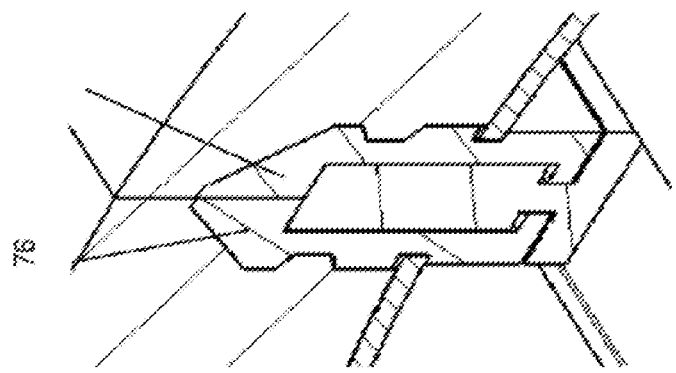
Figure 2T:
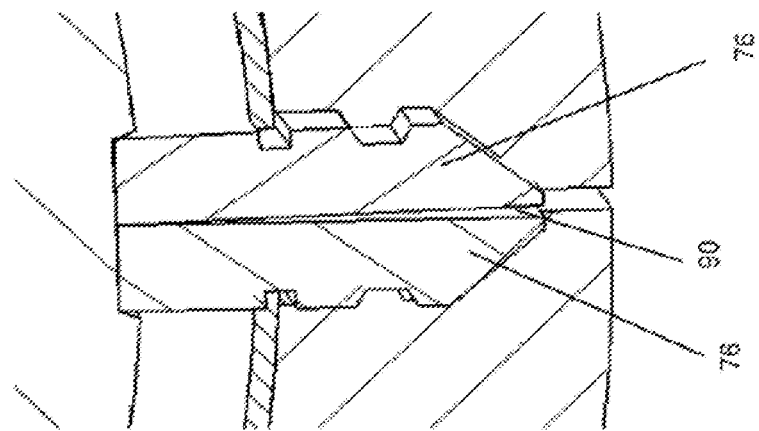
Figure 2S:
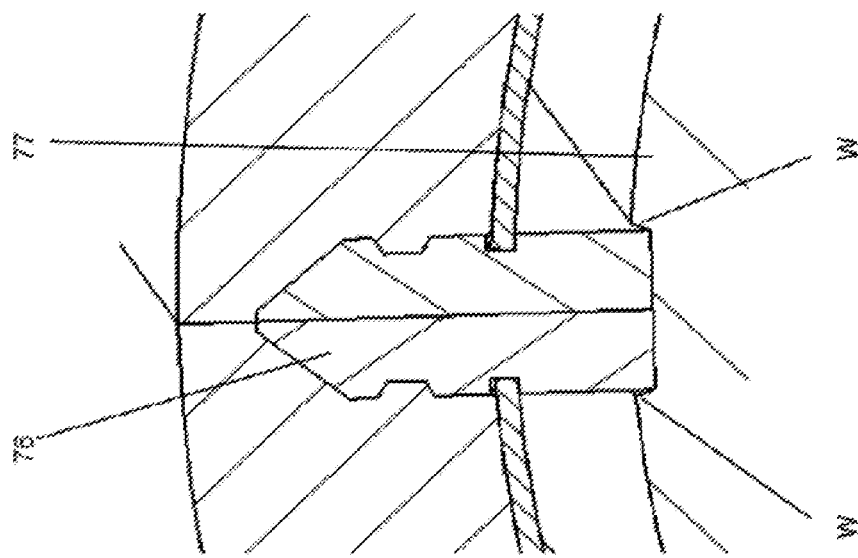

FIG. 2S shows another embodiment of the inventive mould drum. A single rib as described in previous embodiments will be replaced by two or more smaller ones 76, which extend along the outer circumference of the inner drum an along the entire length of the drum. The smaller ribs are each be connected to the inner member, preferably in a flexible manner and/or are flexible in itself so that they can be displaced and/or deformed under the forces due to shrinkage. In FIG. 2*s* the ribs are connected to the inner member 77 by a weld-seam or multiple weld points at position "W" in a direction parallel to the axis of rotation of the drum, preferably before positioning the inner member 77 in the sinter-press. The welding is such that the rib can move, e.g. rotate, in the direction of the porous structure as it will be subjected to forces for example due to shrinkage.

During the sintering process the porous structures will adhere to the ribs, respectively. FIG. 2T shows the situation after shrinkage. Due to the bonding between the rib and the porous structure each rib 76 is forced to follow the movement that the porous structure will make during shrinkage, respectively. The resulting gap between two ribs 76 will preferably be subsequently closed for example by welding. In case this gap is relatively large, first filler material can to be added into the gap in order to prevent that shrinkage of the weld will result in a broken bonding of the porous material with the ribs and/or cracks in the weld. The two parts from which one rib is made, are provided mirror-symmetrically, respectively.

From FIG. 2S it can be further seen that after pressing preferably a small gap is created within the porous structure which extends radially from the outer circumference of the ribs 76. This can be achieved by removing a small strip of porous material or by adding a non adhering material above the rib before filling the mold. This gap will prevent that the rib will be stick in its initial position during shrinkage of the porous structure. However, in case the porous material is only provided between two ribs and each porous segment is produced separately from the other segments between two ribs, such a gap is not needed.

FIG. 2U shows yet another embodiment to prevent damage of the connection between the rib and the sintered porous material. Here, the rib 76 comprises two parts, which are able to follow the movement of the porous structure during sintering, particularly during shrinkage of the porous material. Preferably a small gap is created above the rib in order to allow the rib to follow the movement of the porous structure during shrinkage. Here, each part of the rib has a U-shaped cross section and the two parts from which one rib is made are provided mirror-symmetrically.

FIG. 2V shows another embodiment of the inventive drum, wherein a single rib 76 can be used which rib will be connected, for example welded, rigidly to the inner member. Seen from the upper side of the rib, which is not connected to the inner member, a groove/gap 90 can be applied for example along the center line, line of symmetry of the rib and preferably over a certain height, so that the rib is divided into two parts but has a base 92 into which the groove/gap 90 does not extend. This groove/gap is preferably extending over the entire length of the rib. Hence, each rib comprises two smaller flexible segments. By preferably providing one or more indentations, e.g. notche(s) 91 in the base 92 or other parts of the rib 76, the smaller segments are even more flexible and are particularly able to follow the movement of the porous structure during shrinkage.

Figure 3:
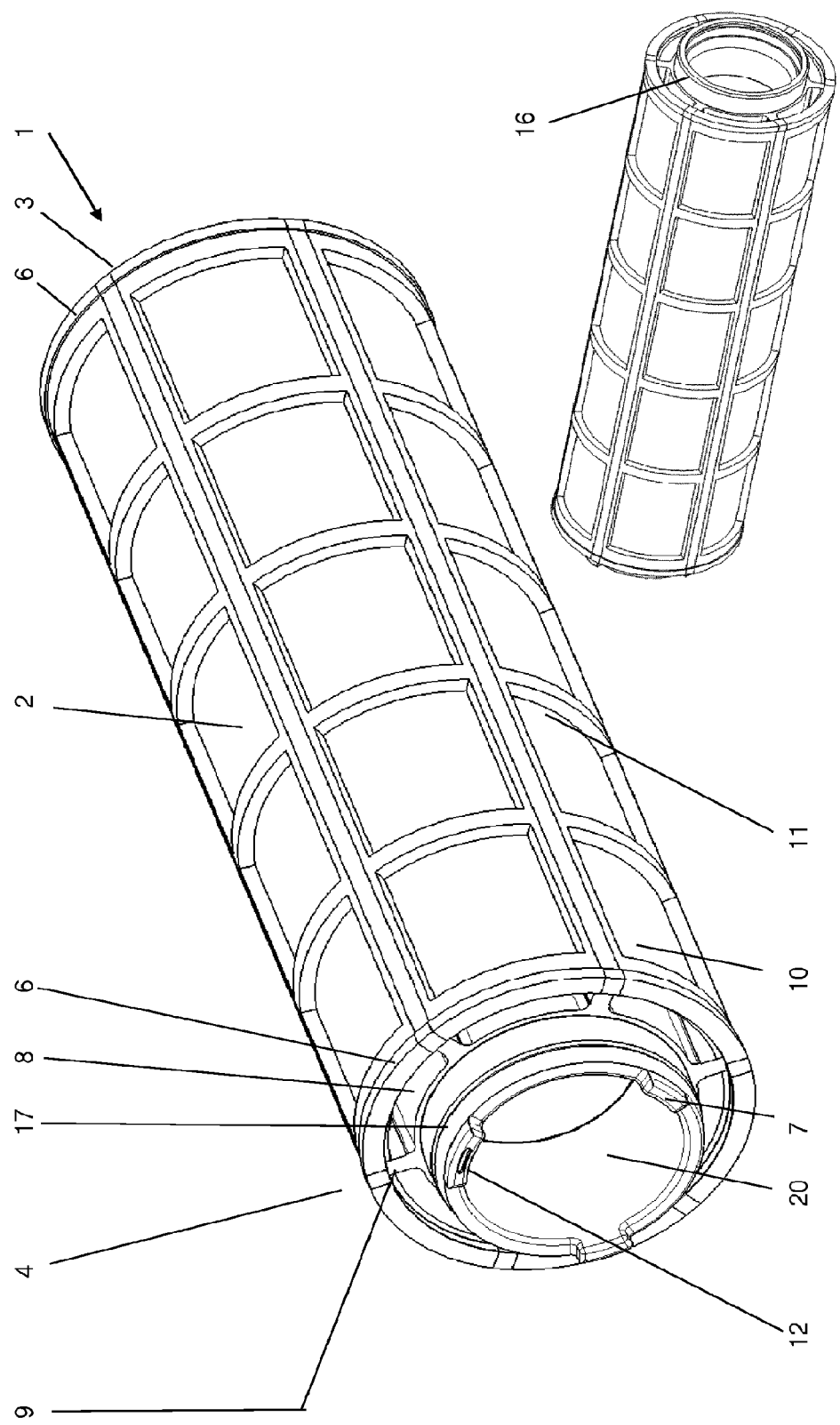
FIG. 3 shows another embodiment of a mould drum consistent with the teachings herewith.

In another not depicted embodiment an insert will be used in the design of the drum. The insert will be manufactured within a sinter mold. The bottom wall of the mold is preferably provided with a support, for example a wire mesh, and preferably both sidewalls (extending in the direction of the axis of the drum) will be provided with sheet metal or a strip, respectively. Then the recess within the mold preferably between the wire mesh and the sheet metals or strips will be filled with powder. After pressing the powder the insert is consisting of a wire mesh, sheet metal and/or strips and the porous structure. In a next step the insert will be sintered. Due to shrinkage the outside dimension of the insert will decrease in dimension. In a following step the outer sidewalls will be machined such that the inserts can be, depending on the final design of the drum, connected against the inner cylinder of the inner member and/or the ribs of the inner member. The machined outer sidewalls can also be provided with cams and/or recesses such that the inserts are well positioned with respect to the ribs. Further these cams/recesses can contribute in holding the inserts in a mechanical way at their position within the drum. In one of the following steps the pores at the outer surface will be closed FIG. 3 shows an embodiment of a mould drum 1. Each product cavity 2 is connected to at least one passage 8 of the mould drum and consists of a bottom wall 10 and a sidewall 11. Passage 8 preferably extends from first front end 3 to second front end 4 of the drum. Via the passage 8, gas can be provided to the mould cavities of one row to eject the formed food product from each cavity and/or the cavities can be vented during their filling. Additionally a cleaning fluid can be pumped into each channel 8 in order to clean the channel and/or the cleaning fluid is forced through the porous material into each cavity to clean the mould cavities. Preferably the drum is provided with conical part(s) 16 and 17 at one or both ends 3, 4 for assembling and securing the drum in the forming apparatus as for example depicted in FIG. 1. Protection rims 6 are preferably integrated at one or both outer ends 3, 4 of the drum. Each rim 6 protects the outer surface of the drum, particularly the porous material, for example when it is positioned in a storage unit. The rim can be part of the inner cylinder or part of the porous member 78. Form-fit-means 7 are preferably provided to rotate the drum in the forming apparatus during production. The drum is provided with a large inner opening 20, which is in the present case cylindrical. This opening 20 preferably extends from the first end 3 to the second end 4.

The distributor 9 is, preferably provided for cleaning purposes and is in the present case a ring shaped groove integrated in at least one front end 3, 4 of the inner cylinder 75 and the porous inserts 78. Reference is made to WO2012084215. This patent application is incorporated by reference and its disclosure is thus part of the disclosure of the present application. In WO2012084215 the use of a distributor in the drum is described.

By using an inner member with an inner tube and ribs which extend to the outer surface of the drum together with porous material which is positioned between two ribs, no air/fluid will leak away to other rows with product cavities during discharge. This will reduce air consumption which is a main benefit of this design.

Figure 4A:
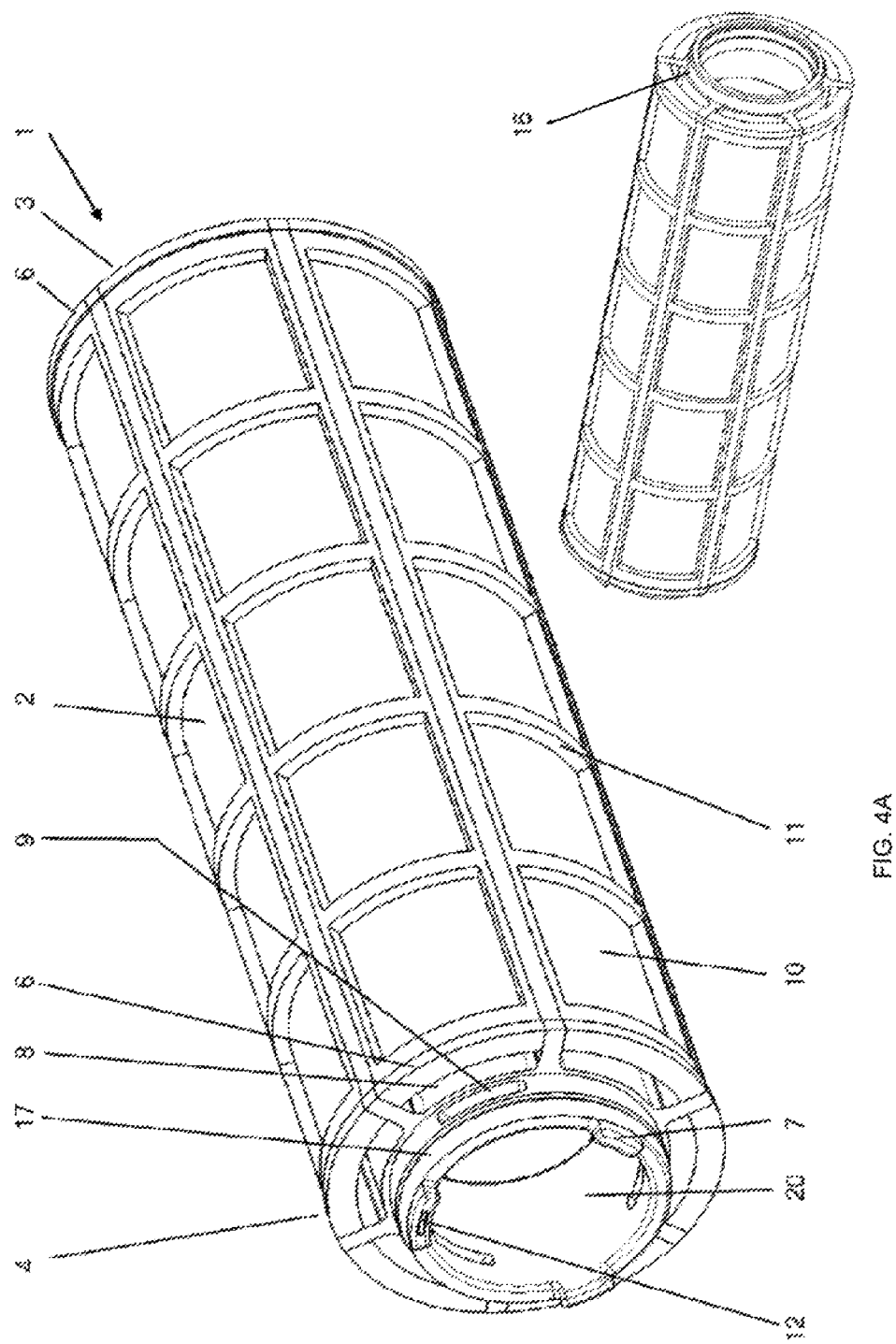
FIGS. 4A and 4B shows a different embodiment of a mould drum consistent with the teachings herewith.

FIG. 4A shows yet another embodiment of the mould drum 1 where distributor 9 is integrated in the flange part here at second front end 4 of the drum. The distributor comprises in the present case a multitude, here three, long hole-shaped openings 9 which extend in the circumferential direction of a cylindrical part of the flange part of the front end. This can be advantageous to provide a high volume of cleaning fluid through the passages 8 of the drum to assure sufficient cleaning.

Figure 4B:
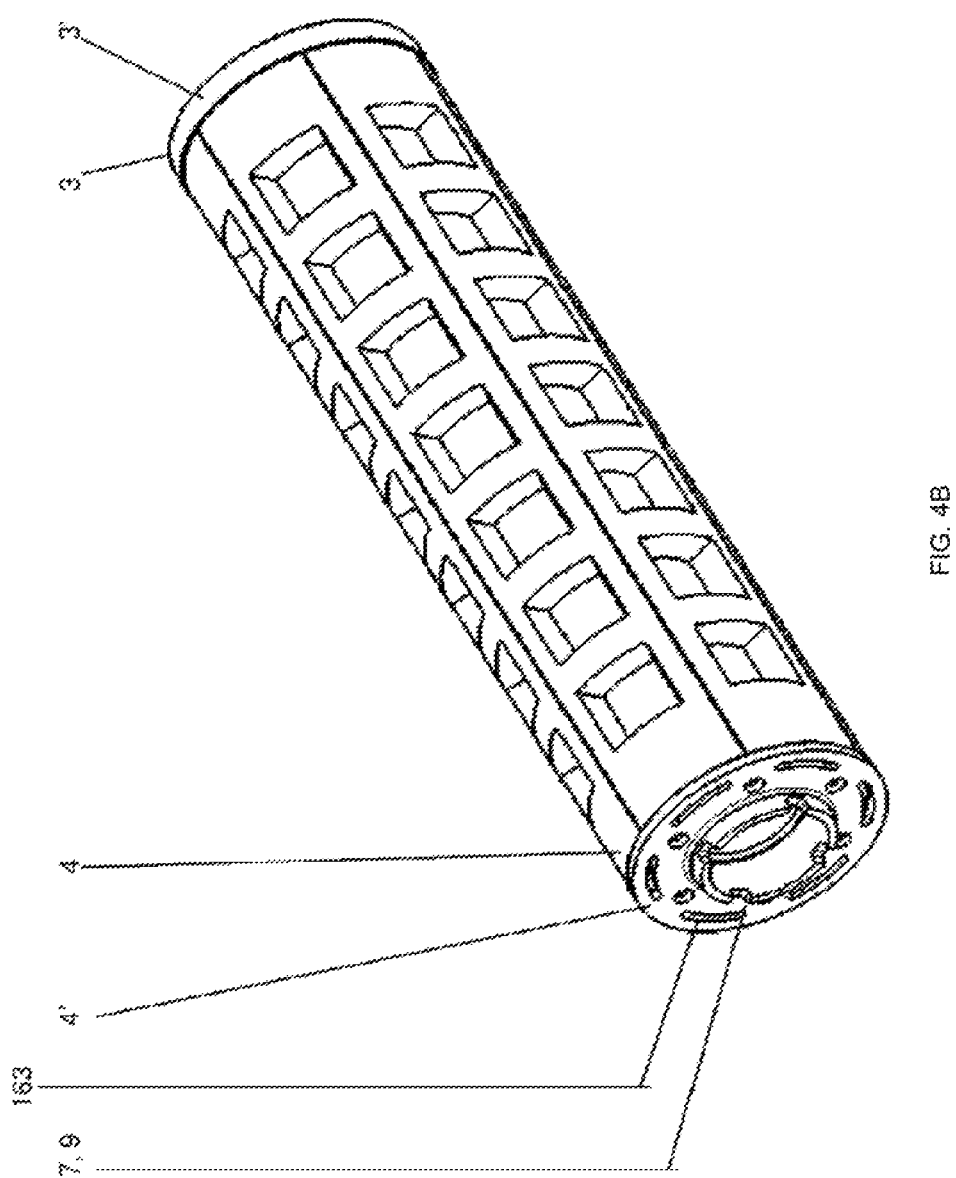

Reference can be made to WO2012/107236, FIG. 58 which shows a drum provided with end caps. In FIG. 4B end caps 3' and/or 4' are provided at the respective front- and rear end of the drum. Form-fit means 7 can be part of end cap 4' and in the embodiment according to FIG. 4, the recesses intended as the form-fit-means will also be used as distributor 9 for the cleaning fluid in a cleaning apparatus. By using end caps, cover 81 described in this document (see FIG. 11 and FIG. 16a) will not be needed anymore which will simplify loading/unloading of the drum in the forming apparatus. Further, the flexibility is increased regarding the use of different thickness of the porous structure (thickness can vary approximately between 18 mm and 55 mm depending on the dimension of the food product that will be formed). The inlets/outlets for the cleaning fluid 163, here slots in the end caps for fluid flow will, independent from the chosen thickness of the porous structure, open out at the same position at the head end(s) of the drum assembly. Further the inlets/outlets 163 will be designed such that at the opposite side they open out in the passage 8 of the drum. The cones 16 (drive side) and 17 (support side) can be part of the end caps and can have the same dimension regardless the thickness of the porous structure.

In FIG. 5A an embodiment with multiple passages 8a, 8b and 8c per row 2' of mould cavities. The porous structure of the porous insert is open towards these passages. The passages 8a-c are created by recesses in the material of the porous inserts. This can be, for example, achieved by machining but preferably the passages are part of the mold during manufacturing the inserts. In comparison to the embodiments in FIG. 3 and FIG. 4 the embodiment according to FIG. 5A has the advantage that the fluid flow, for example pressurized gas and/or a cleaning liquid, can subjected only to one or more but not all passages 8 a-c of one row 2' and thus be directed only to a desired region of each mould cavity in one row 2' Thereby only a limited volume of fluid flow must be provided. The fluid consumption of the forming apparatus will be reduced. Fluid can also be directed through all the passages 8 a-c in one row 2' simultaneously and will flow to the bottom wall and sidewall of all the product cavities.

Additionally or alternatively at least one support area 14 which supports the relatively weak porous insert can be provided. Result is that the thickness of the porous structure underneath the product cavities can be reduced without risk that this porous structure will be deformed during operation.

Preferably all formed food products are released from cavity 2-I-IV substantially simultaneously. FIG. 5B shows an embodiment with a multitude, here five passages 8 designed for an insert which is provided with two rows 2' of cavities. To achieve that the products in two certain rows 2' will be discharged in a particular sequence, a selection can be made which passage will be provided at what time with fluid, here pressurized gas.

It can be advantageous for discharging formed products to direct the fluid for example first to the bottom and then to the sidewall of the product cavity to remove the adhesion forces first between the bottom and then between the sidewall of the formed product and the porous structure. FIG. 6 shows such an embodiment. The porous structure of the insert is open towards passages 8a and 8c. The porous wall 8bh of passage 8b is open and the porous walls 8bv are closed. Closing the pores can be done by machining but can also be done during manufacturing of the inserts by using different powder in the mold. Plate 15 acts as a fluid restriction and is preferably a strip with apertures, for example circular holes, at each position were a product cavity is located. The plate 15 is fixedly connected to wall 8bh for example, by bonding means and is provided with recesses which are open out to the bottom wall of a cavity. By providing channel 8b first with fluid, for example a pressurized gas, it can be achieved that the bottom of product cavities in a certain row will firstly provided with fluid. After a certain time, fluid can be provided to channels 8a and 8c with result that the side wall and/or remaining parts of the bottom wall will be provided with fluid to discharge the formed food product out of the cavity. Other embodiments of directing air to one or more passages simultaneously or with a time-lag are also possible.

FIG. 7 shows other embodiments of a mould drum 1 which each consist of an inner tube 75 and relatively large porous members 78, preferably two or three porous members 78. FIG. 7A shows an assembly which can be used when the drum will be provided with an even number of rows 2' with product cavities 2.I-IV. The drum comprises here only two porous members 78. FIG. 7B shows a drum with three porous members 78 which can be used for an odd number of rows 2' with product cavities 2.I-IV. Rib 76, is provided to create passages 8 and to maintain the porous members 78 in a concentric position relative to the inner tube 75. Rib 76b is provided to preferably additionally improve the bonding between the porous members. FIG. 7C shows a drum in accordance with FIG. 7A with the difference that no rib 76a is provided and that the outer surface is entirely out of a porous material. This is advantageous for closing the pores of the porous material at the outer circumference of the porous member 787 not by grinding but by deep rolling. When inserts are interspersed with ribs 76a, b which are not porous, deep rolling can result in undefined result e.g. non-round external diameter of the drum.

Shot-peening, preferably controlled by a robot to achieve a uniform sealing of the pores at the outer circumference of the porous member, is a technique which can be used even with ribs.

Figure 7B:
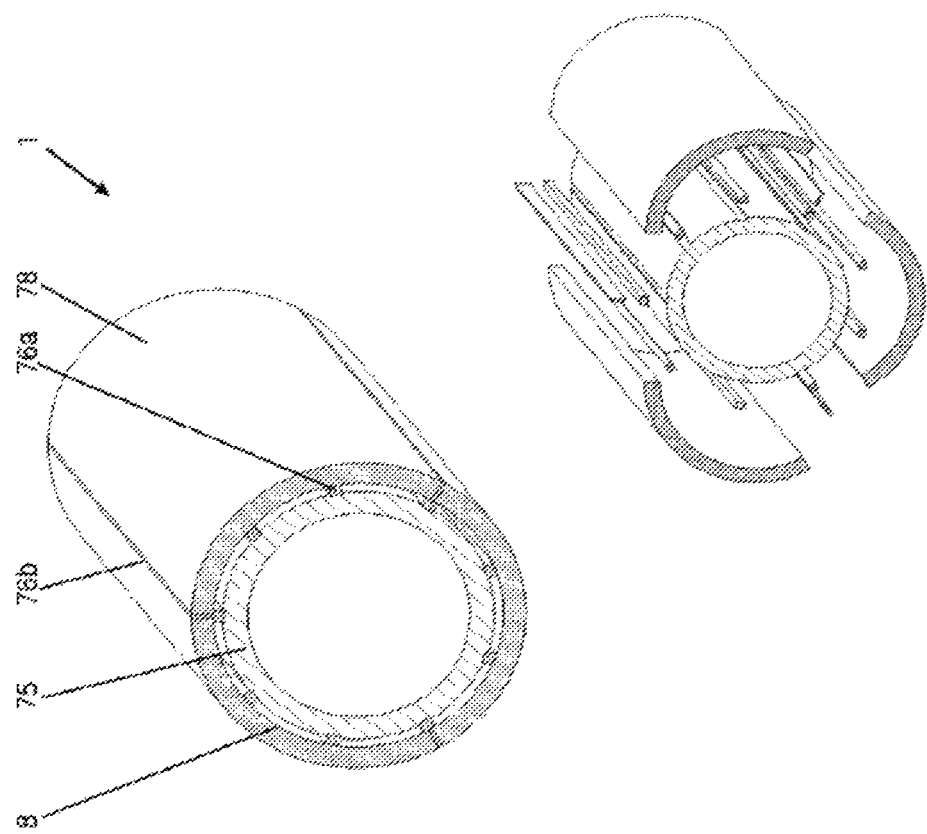
Figure 7A:
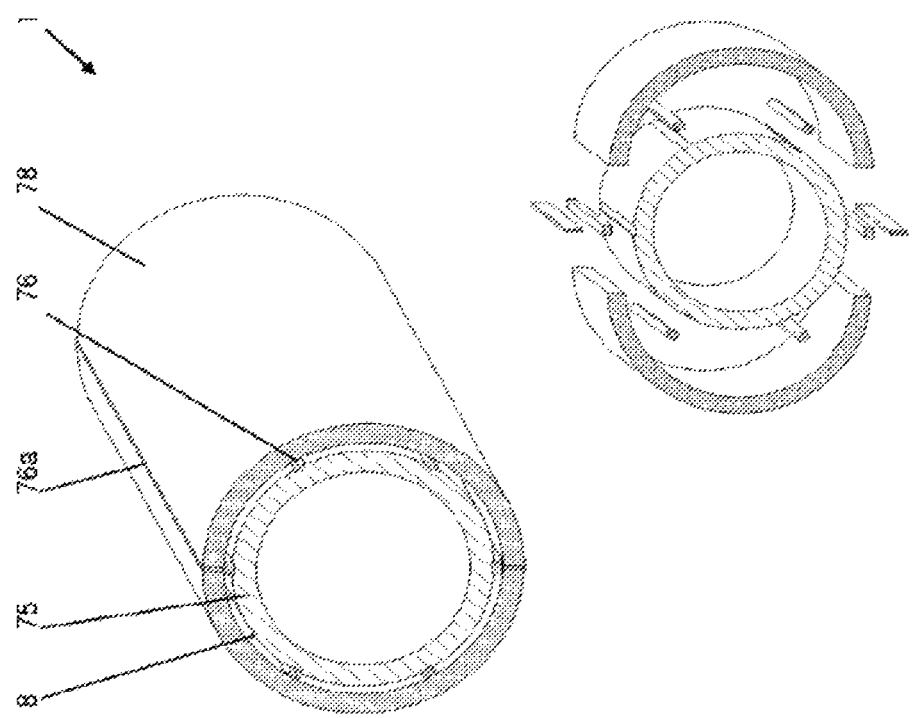
Figure 7D:
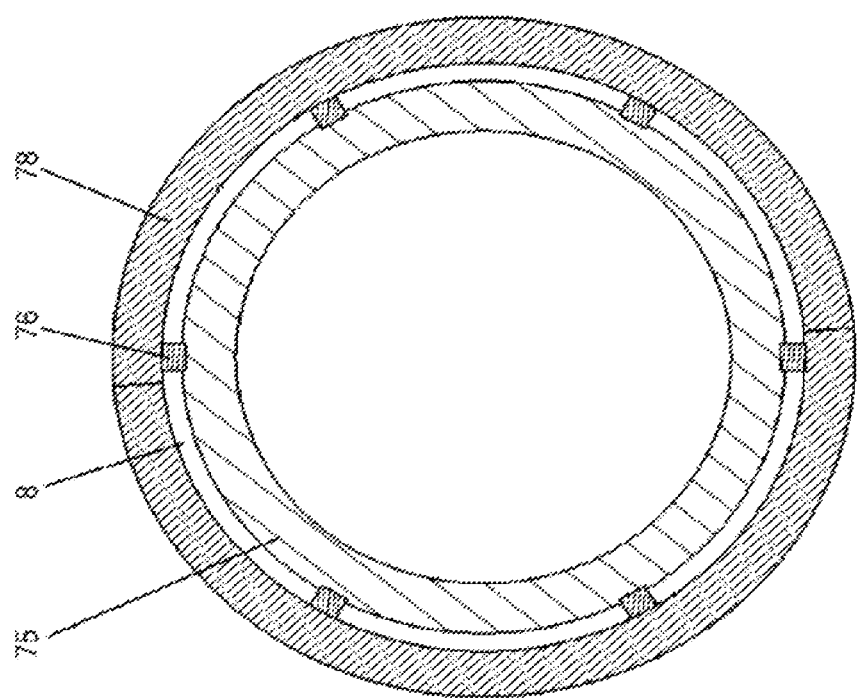

The inserts of FIG. 7A-C are preferably connected to each other by applying bonding means to the front ends of the inserts where the inserts are connected to each other.

Depending on the design to discharge formed food products, it can be advantageous that there is no barrier between two adjacent rows of cavities with the result that during discharge of a row of food products fluid, for example air, can flow freely via the porous structure to adjacent rows 2' of cavities and even into the adjacent passages 8. The porous structure of the row of cavities which is already emptied can, for example, be cleaned by this fluid and the passage of the row of cavities which is just filled is already pre-filled with fluid, e.g. air. Depending on the thickness of the porous structure, the openness of the porous structure and/or the adhesion between formed product and product cavity a fluid flow between adjacent rows of cavities will not result in undesired discharge of the formed products due to the fluid flow between two adjacent rows 2" of cavities. An at least partially free flow of fluid can be achieved by positioning the contact surfaces of the porous member not directly above the location of ribs 76, see FIG. 7D. Same is achieved in FIG. 7E where the porous members 78 are connected to each other for example by welding, preferably TIG, at the outer diameter and/or at the inner diameter of the porous member.

Figure 7F:
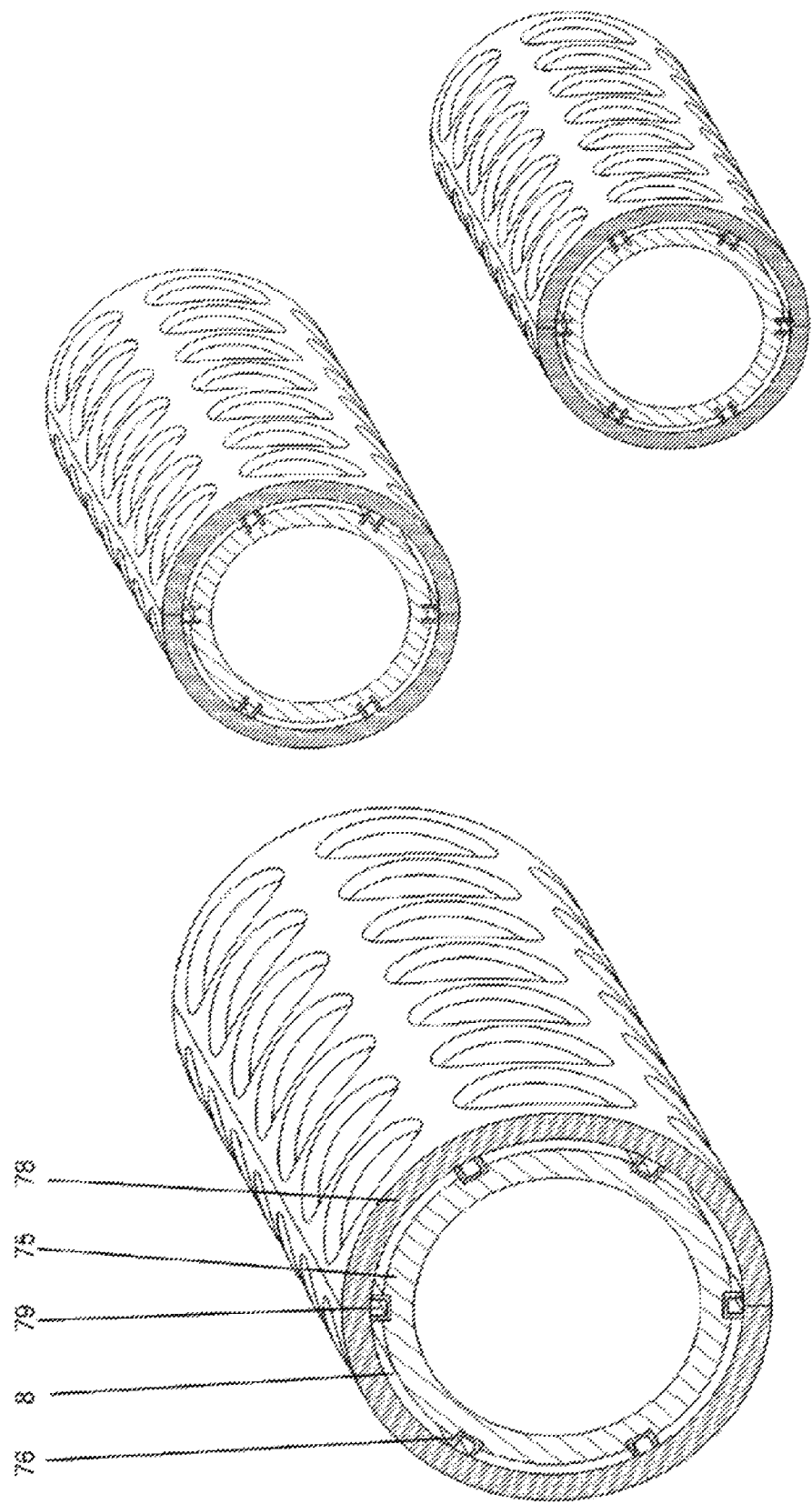

Between two adjacent rows of cavities in FIG. 7F a rib 76 is provided, respectively, each with a channel 79 or each channel 79 is provided by ribs. Each channel can be, preferably separately, connected to a reduced pressure connection, so that cross flow of gas, for example during discharge of the formed products in one row by ejecting gas, to an adjacent row of cavities can be at least reduced.

In all the embodiments of FIGS. 7A-F the ribs 76 are preferably connected with bonding means to the tube 75 and/or to the porous member 78.

Figure 7G:
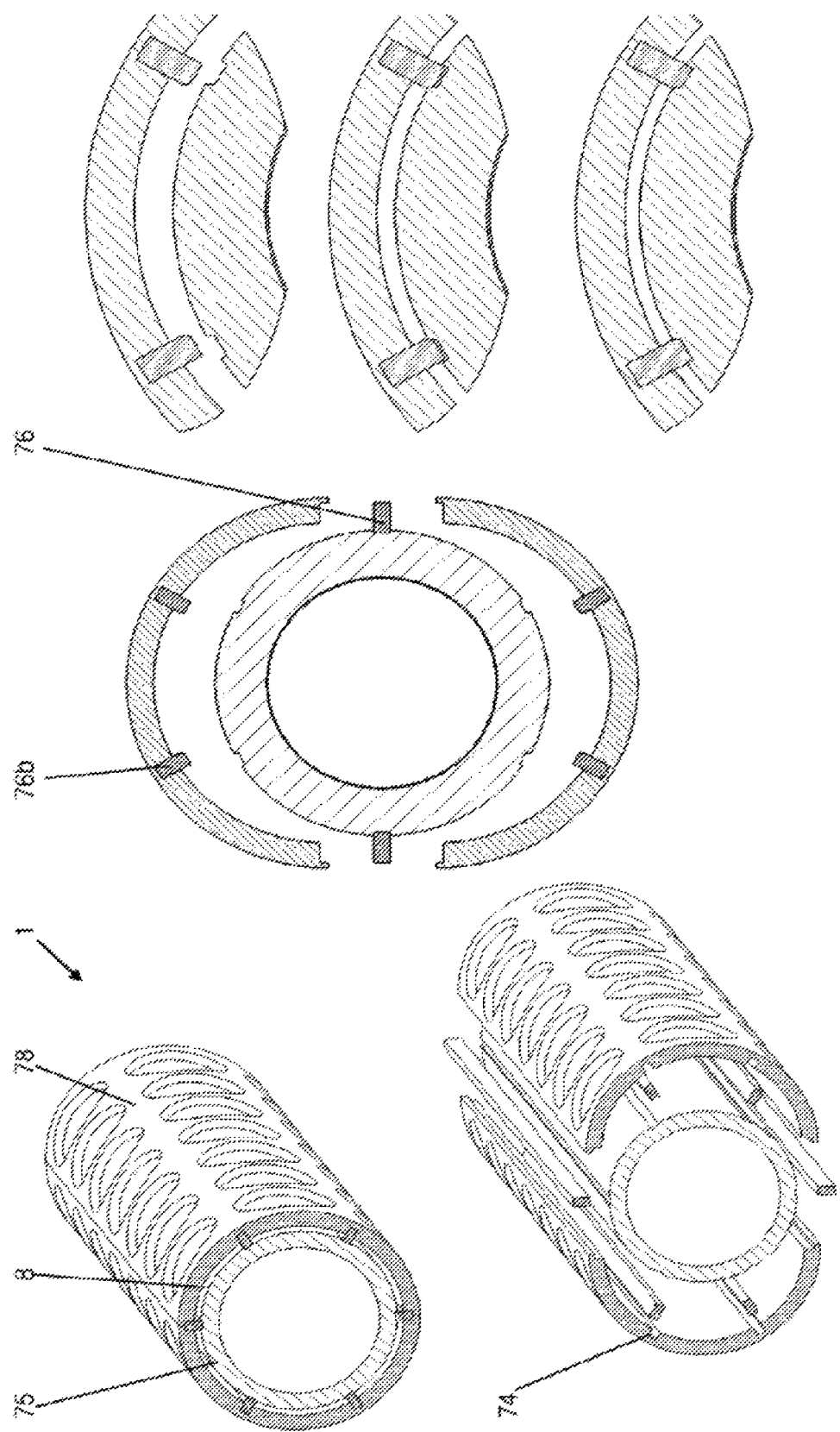

FIG. 7G shows, similar to the embodiment according to FIGS. 2-6, an embodiment which can be used in case a flow of fluid between two adjacent rows of cavities is undesired and results in for example in leakage of air, an excessive air consumption and/or an airflow to a row of cavities.

A recess 74 in the porous member 78 and/or a rib 76, the recess and/or the rib may function as a resistance for the airflow from one passage to another passage.

The drum design depicted in FIG. 7G is advantageous regarding the drum assembly. As shown in FIG. 7G first ribs 76b will be connected in the recesses of inserts 78, respectively and another set of ribs 76 will be positioned in recesses in tube 75, respectively. Subsequently, the pre-assemblies can be slid into each other. The ribs 76b are preferably provided with a chamfer.

According to another preferred or inventive design to at least reduce the air flow from one passage to another passage via the porous material is to impregnate the porous structure between two rows of product with a material which is approved for use in the food-industry and which is resistant against circumstances during production and during cleaning (cleaning agents, cleaning temperatures, etc.).

FIG. 8 is showing a different embodiment of a drum which consists of an inner cylinder 75 and relatively small porous members preferably each row 2' with product cavities has a separate porous member 78.

The strength and stiffness of the mould drum is determined by the dimensions of the inner member 77 and by the design of the porous members 78. Because of the limited strength and stiffness properties of porous material it can be necessary to provide support means (not shown) between two adjacent ribs 76.

FIG. 9 shows some embodiments in manufacturing inserts 78.

The Inserts in one of the above mentioned drum embodiments can be made in several ways. First they can be made for example by dividing, for example sawing, milling or waterjet-cutting segments out of a sintered porous tube which is manufactured for example by isostatic pressing of preferably stainless steel powder. Second the inserts can be made by vertical pressing of stainless steel powder in a pre-shaped mold and afterwards sintering this pre-shaped insert. The inserts, for example, in the drum embodiments in FIG. 7 will preferably be made out of a porous tube and the inserts shown in FIGS. 3, 4 and 8 out of a vertical pressed insert.

In FIG. 9A insert 78 consist of a porous base 70 which is, for example, made from an isostatic pressed tube of porous sintered material with an outside layer 71 which has a different porosity than the isostatic pressed tube. This outside layer has preferably a dense structure and can be for example foil, a rolled plate or a thin walled tube, preferably made from stainless steel. This can be advantageous because it saves the process to close the pores at the outer circumference of the drum. Also possible is that the layer is made by providing different powder in the mold which will after pressing and sintering result in a closed structure. Important is that after the sintering process porous base 70 will adhere to the outside layer 71.

Figure 9C:
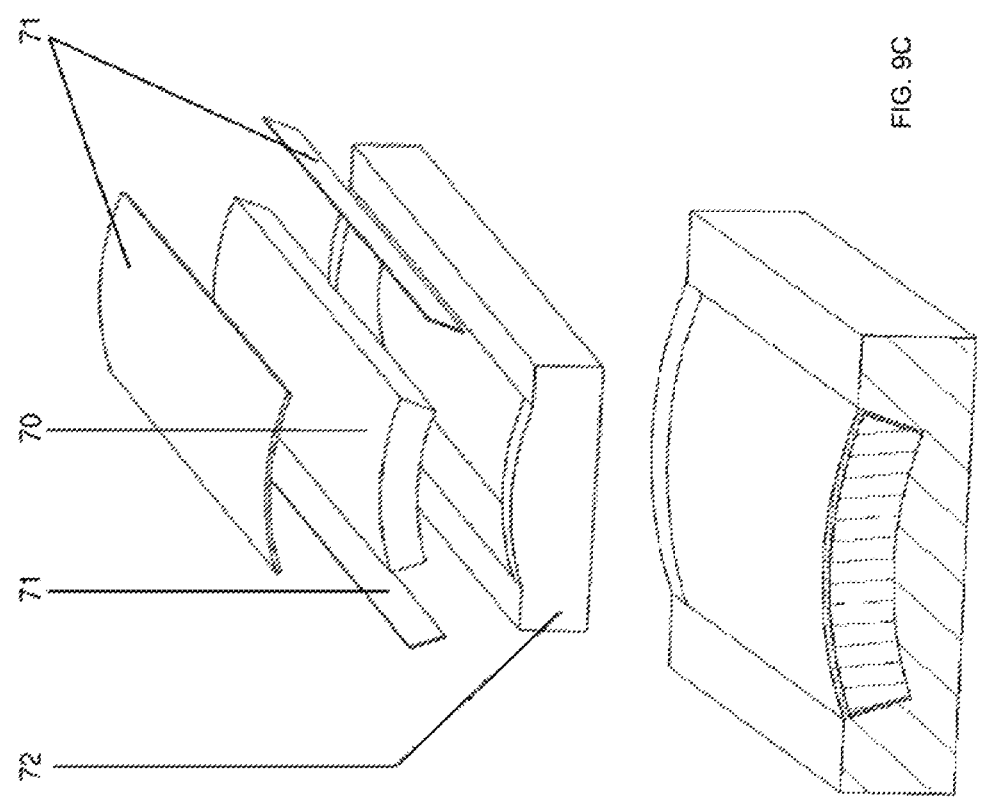

FIG. 9B shows two embodiments of a drum with inserts 78 whose porous base 70 are shaped for example by vertical pressing. Each insert is produced by providing an outside layers 71 as well as an outside layer at both head ends of the insert in the circumferential direction respectively. The outside layer at both head ends can be utilized as ribs and/or to fix the inserts to the inner member 75. A rib preferably provides a space between the inner member and the porous insert, which can be utilized as a channel for a gas to discharge the product and/or for a cleaning fluid to clean the porous inserts. Each outside layer can be, for example, a foil, a plate(s) or made by providing different powder in the mold which will after pressing and sintering result in a closed structure. Important is that after the sintering process porous base 70 will adhere against outside layers 71. FIG. 9c shows how inserts could be manufactured using a mold 72. At least one preferably all outside layers of each segment are placed in a mold 72. Afterwards, the powder of the sintering material is filled into the cavity provided by the mould 72 and the outside layer(s) 71. Preferably, the powder is pressed and then sintered. During sintering, the sintering powder is adhesively and/or mechanically bonded to the outside layer (s). Subsequently, the insert is fixed to the inner member of the drum, preferably by an adhesive joint and/or by a mechanical bond. In a last step, the outer surface of the circumferential outer layer can be machine to achieve the final diameter of the drum. The product cavities are preferably machined, preferably milled, into the outer layer as a final step. Due to the outside layer 71 at the radial circumference of the drum, the pores at the outer circumference of each segment need not be closed.

The embodiments according to FIG. 9 all to prevent that certain surfaces of the inserts are open after the sintering process.

FIGS. 10-19 are showing an embodiment of a movable unit, a forming apparatus, a cleaning apparatus and a storage unit.

Figure 10:
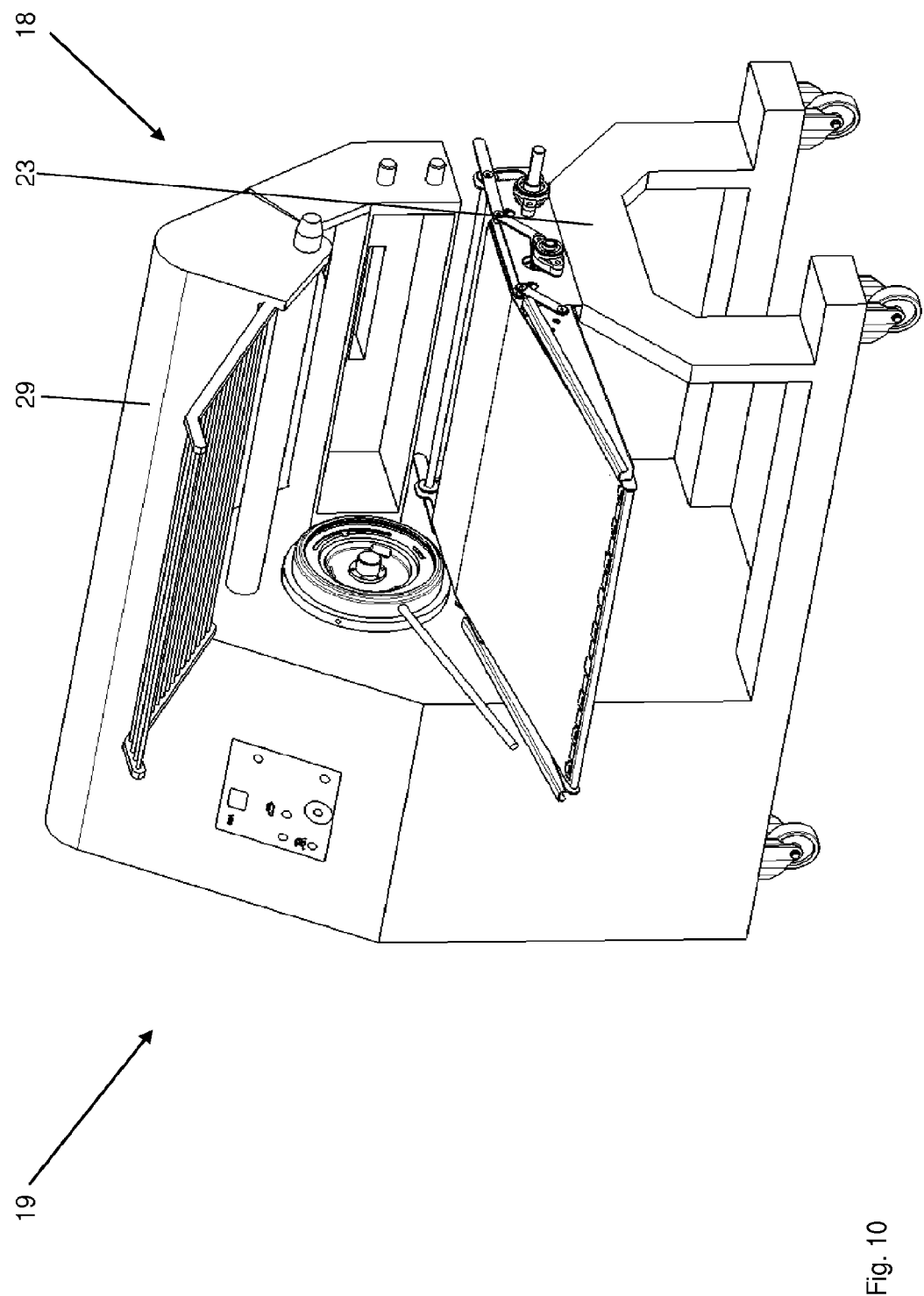
FIG. 10 shows the inventive food forming apparatus.

As can be seen from FIG. 10 the forming apparatus 29 comprises a drive side 19 and a support side 18 for the mould drum 1 (not depicted). The drive side 19 is provided with drive components which rotate the mould drum during production. The drive side comprises a motor and/or a gear box that rotate the mould drum 1. At the support side 18, the drum is supported during production against the frame 23.

Figure 11:
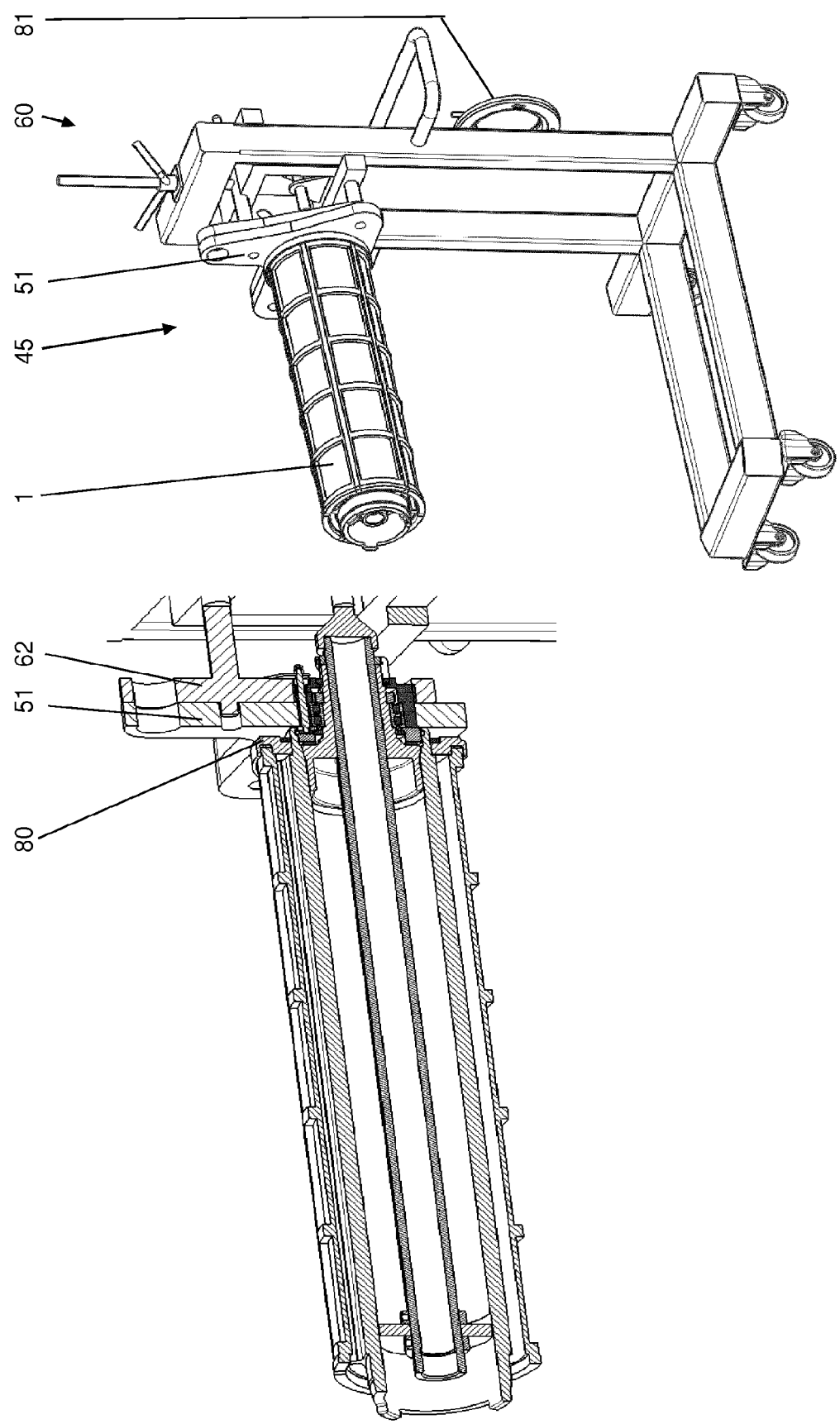

FIG. 11 shows a movable unit 60 which transports the mould drum for example from cleaning to production or to a storage unit and vice versa. The movable unit is releasably provided with so called production support means 45. This production support means is explained in further detail according to FIG. 13. In the present case, the production support means is provided with a cover 80 and a mould drum 1 is fixed to the production support means 45. The cover 80 will seal and/or supply fluid to the front end 3 of the drum and can be a separate part as shown but it can also be an integrated part of the support structure 51 of the production support means 45.

The movable unit 60 in FIG. 12 comprises of a frame 63 and a support frame 62 to support the production support means 45 and mould drum 1. This support frame 62 is provided with an align mechanism 61 to adjust the angle of the production support means and mould drum 1 relative to the forming apparatus, cleaning apparatus and/or storage unit. Height adjustment 64 will preferably be used to adjust the height of the mould drum 1 relative to the forming apparatus 29, cleaning apparatus and/or storage unit. Furthermore, the movable unit preferably comprises an adapter 67 which can, for example rotated by a rotating knob 65. The adapter 67 can be brought into a from- and/or force-fit connection with a coupling head 57 of the production support means 45 This will be for example done to secure the mould drum 1 to the drive side 19 of the forming apparatus 29. Furthermore the movable unit is preferably provided with positioning means 66 to position the movable unit 60 relative to the forming apparatus 29 and/or cleaning apparatus and/or storage unit. Means can be provided (not shown) to secure the production support means 45 to the movable unit 60.

Figure 13:
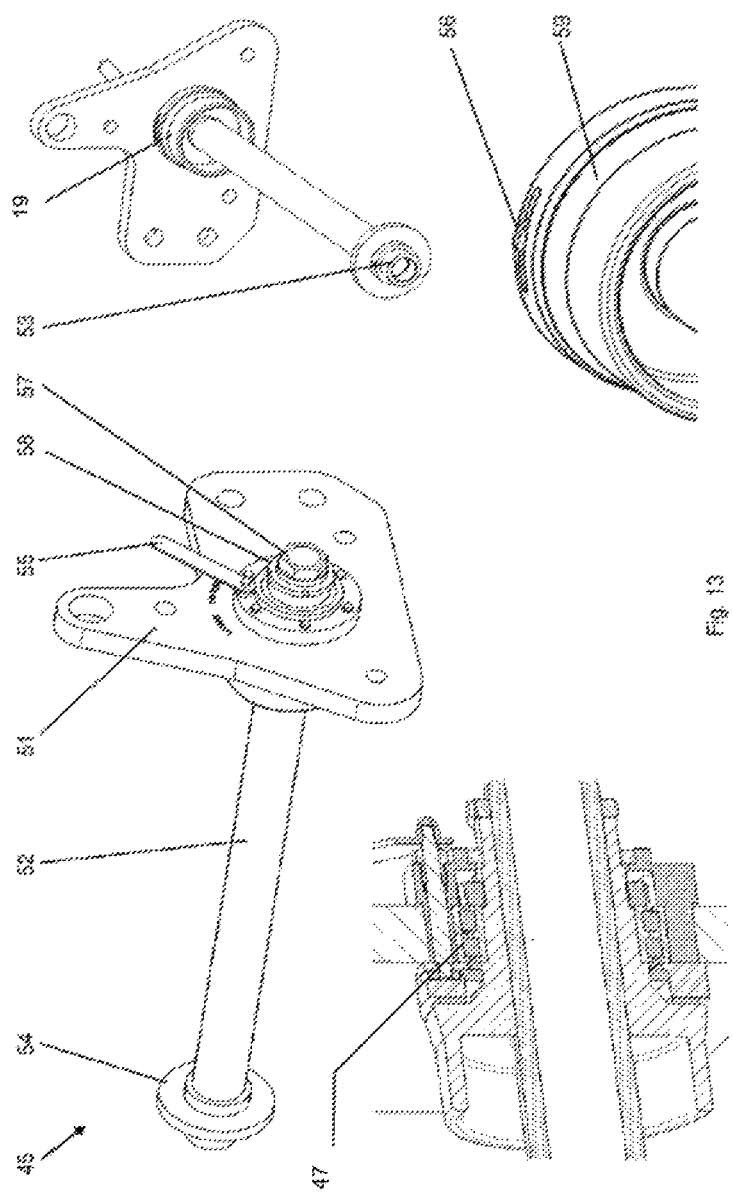
FIG. 13 show details of the production support means.

In FIG. 13 production support means 45 are shown. The production support means support the drum on the movable unit but also at the support side 18 of the forming apparatus 29. The production support means are removed from the forming apparatus. The production support means comprises, preferably at one of its ends, a support structure 51 with bearings, which are preferably provided in a housing 46. Preferably, the support structure is provided with a structure, as depicted in FIG. 13, to align and/or connect the production support means to the forming apparatus. The production support means further comprises a spindle 52. Spindle nut 53 and coupling head 57 are preferably part of spindle 52. The spindle 52 is supported at one end in the bearings, which are, in the present example provided in the housing 46. By rotating coupling head 57 clockwise spindle nut 53 is connected to a driveshaft 21 which is part of the forming apparatus. Thus the spindle 52 and the mould drum 1 will be secured at drive side 19 of the forming apparatus 29. A support disc 54 can provided for additional support and/or guidance of the drum on the spindle 52. Furthermore, the production support means may comprise locking means 56, to secure the mould drum 1 to the production support means 45. A lever 55 can activate/deactivate the locking means 56. A tension nut 58, which is preferably also part of the production support means, can be utilized to clamp the mould drum at support side 18 and/or at the drive side 19 to the forming apparatus. Further the tension nut 58 preferably prevents that spindle 52 and consequently the mould drum can be removed from the movable unit 60 unintentionally. Means can be provided to prevent that the tension nut 58 is removed from the spindle. When the drum will be positioned in the cleaning apparatus, the production support means preferably remain on the movable unit.

Before picking up the drum from storage unit, preferably a cover 80 is placed against the first front end 3 of the drum. With the movable unit 60, which is already provided with production support means 45, the drum is placed on these production support means, for example, by inserting the spindle 52 into the inner opening 20 of the mould drum. Subsequently, the drum is preferably secured to the production support means 45 to prevent that it will slide off the means during transport. This can for example be done by turning lever 55 and thus bringing locking means 56 into a lock position. Cover 81, see also FIG. 11, can be positioned against second front end 4 of the mould drum. In another embodiment, cover 81 can be an integral part of fluid control member 82 at the drive side 19 of the forming apparatus 29. Now the movable unit 60 can be moved to the forming apparatus 29 and can be positioned in the right position via positioning means 66 and connected to the forming apparatus.

Figures 14A, 14B:
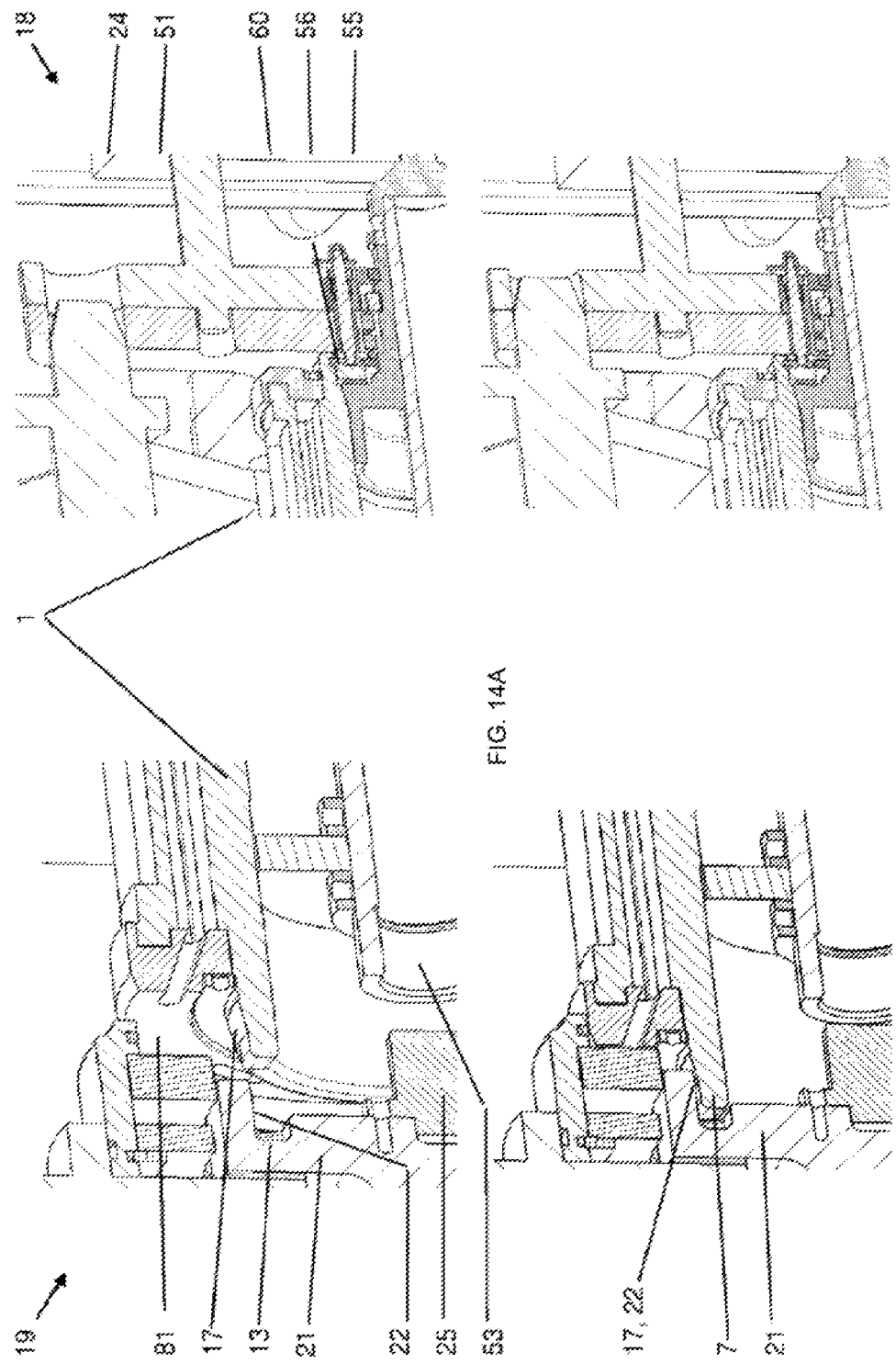

FIG. 14 shows the installation of the mould drum 1 in the forming apparatus 23. In the embodiment according to this figure the production support means 45 are provided with a support structure 51 to align and/or connect the production support means to the forming apparatus as shown in FIG. 13. In FIG. 14A production support means 45 will slide over one or more pilot pin(s) 24 on the support side 18 of the forming apparatus. In FIG. 14B a cone 17 at the drive side of the drum comes in contact with a cone driveshaft 22. Form-fit-means 7 of the mould drum 1 have to correspond with the corresponding form-fit-means in the driveshaft 21. In case the form-fit-means are designed differently, for example with different cams as in FIG. 3 and FIG. 4 the drum will fit only in one single angular position relative to the driveshaft 21 of the forming apparatus. According to another, not depicted embodiment, instead by form-fit-means 7 the drum is driven by friction-force between the cones 17 and 22. Loading the drum into the forming apparatus is thus simplified. Preferably cone 17 is made from stainless steel and cone 22 from another material like brass to prevent galling. It is even possible to position cone 17 at the outer circumference of the drum to create more friction and it will ease the loading of the drum in the forming apparatus while you view cone 17 moving into cone 22. Theretofore the design as shown in FIG. 14 needs to be redesigned. FIG. 14C shows the mould drum 1 in a manually set position, here with a small gap between cone 17 of drum 1 and cone 22 of driveshaft 21. Tension nut 58 is in a reversed position on spindle 52. FIG. 14D shows that via rotating knob 65 clockwise, adapter 67 and coupling head 57, the spindle nut 53 will be tightened on threaded part 25 of driveshaft 21.

During this tightening, the driveshaft 21 remains in a standstill position. Depending on the necessary torque to tighten or loosen threaded part 25, the gear ratio of the gearbox can be sufficient to prevent that driveshaft 21 will rotate. When the gear ratio is not high enough, rotation of the drive shaft can be prevented by using a drive motor provided with braking means or other mechanical means.

Figure 14E:
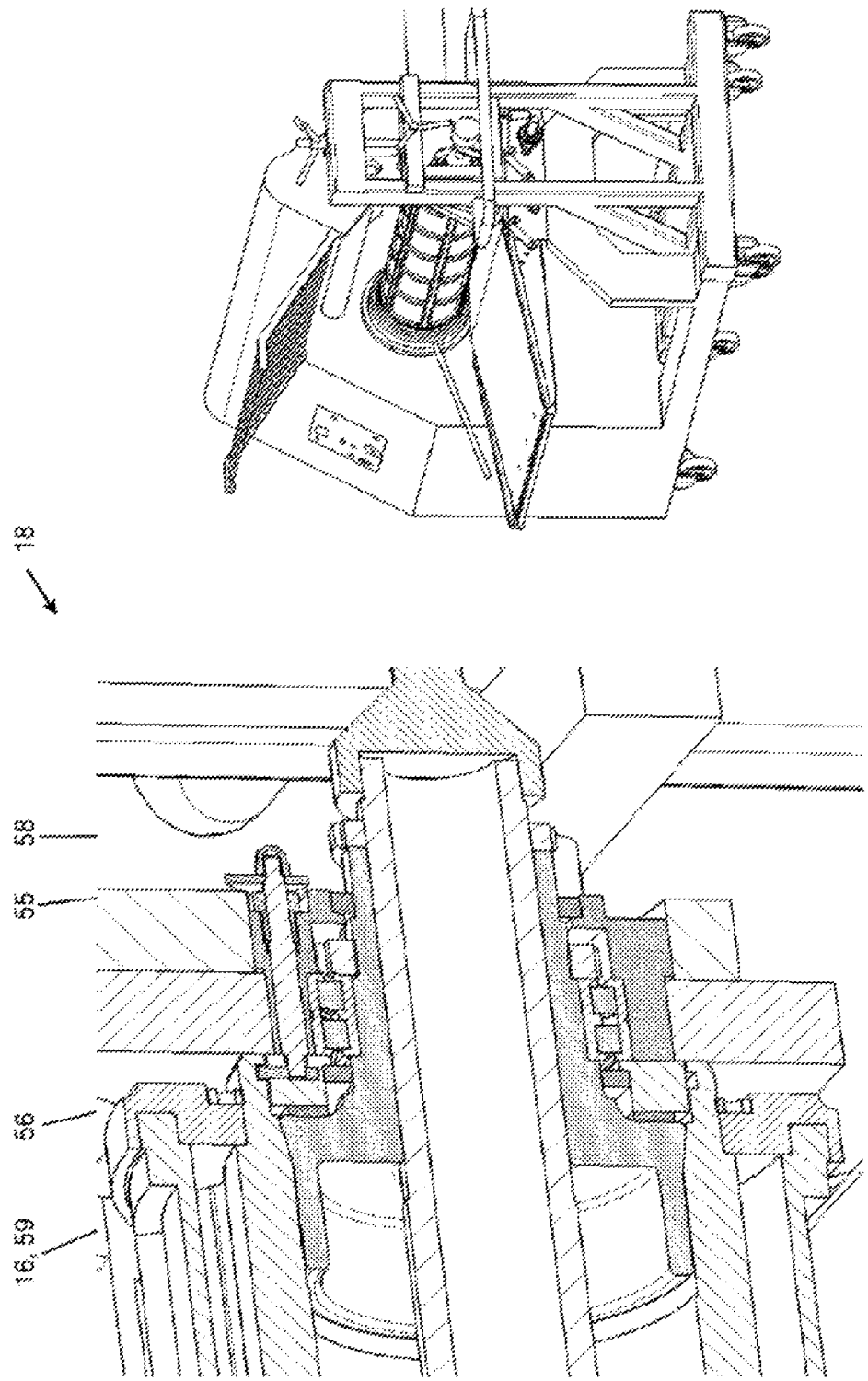

FIG. 14E shows the final step in securing the mould drum 1 to the forming apparatus 29. Tension nut 58 will be rotated here clockwise, preferably by a torque wrench with a preset value, in order to remove the clearance between the cones 17, 22 and apply pre-tension between cone 17 of the drum and cone 22 of the driveshaft at the drive side 19 of the forming apparatus 29 and further between cone 16 of the drum and cone 59 of bearing house 46, which is part of production means 45, at the support side 18 of the forming apparatus 29. Drum 1 is in its final position and the drum is now clamped and secured to drive side 19 and also clamped and secured to support side 18 of the forming apparatus 29.

This step can be done while the movable unit is still connected to the production means as shown in FIG. 14E but due to the limited accessibility of the tension nut 58, it is preferable to move first the movable unit away from the forming apparatus, preferably by removing the connection (not shown) between production support means 45 and movable unit 60.

In an alternative embodiment spindle 52 and tension nut 58 are fixed to each other or are made as one part. By rotating coupling head 57 clockwise spindle 52 and tension nut 58 will rotate till the clearance between the cones 17, 22, 16, 59 is removed and pre-tension between cones 17 and 22 and cones 16 and 59 is applied.

In an embodiment where the production means are not provided with a support structure 51 to align and/or connect the production means to the forming apparatus the drum can be clamped and secured to the support side 18 of the forming apparatus by connecting/clamping the bearing to frame 23 of the forming apparatus.

In another preferred embodiment the drum will not be clamped manually to the forming apparatus but by, preferably pneumatic driven, actuators. In this embodiment the actuators are connected to a rod which can be driven in axial direction of the drum. This rod and spindle 52 are able to hook into each other. As soon as the drum is loaded in the forming apparatus and the rod is hooked to the spindle, the actuators will be activated and will pull the rod and thus the spindle and hence the clearance between cones 17 and 22 and cones 16 and 59 will be removed. By applying the desired force to the actuators the drum will be clamped and secured sufficiently to the forming apparatus. Unloading the drum can be done in the opposite way.

During the forming process especially the sealing member will cause high mechanical forces on the outer surface of the drum. Components which have to absorb these forces will have large dimensions and will be relatively heavy. By connecting the sealing member directly with the bearings of the drum a so called force-closed system will be created which will result in smaller and lighter components.

The forming apparatus may only be started when a drum is positioned and is secured in such a way that it cannot get loose from driveshaft 21 at the drive side 19 and production means 45 at the support side 18, for example by a suitable choice of the dimensions of the cones 16, 17, 22, 59 and form-fit-means 7. Even when even spindle 52 and tension nut 58 are not fully tightened or will be lost during operation of the forming apparatus the drum shall preferably not fall out of position. Covers preferably prevent unsafe situations and can only be closed when the mould drum is secured in the forming apparatus and (or the production support means 45 are secured to the forming apparatus. Only closed covers can activate sensors whereby the forming apparatus can be started.

In FIG. 15 the production support means 45 and drive means for the drum are shown. At drive side 19 the driveshaft 21 is driven by a drive motor 34 and preferably a gearbox 35. The gearbox 35 is here provided with a hollow shaft 31 and driveshaft 21 is supported in bearings 33 preferably located in a bearing houses 32 more preferably on each side of the gearbox (not shown). At the support side 18 of the forming apparatus 29 the mould drum is beared by bearing 47, which is preferably assembled in bearing house 46, and is part of production support means 45. One of the requirements for the bearings is to withstand the acting forces during operation and to be suitable for the use in a forming apparatus. The embodiment of the bearing houses including bearings, lubrication, assembling/disassembling of the bearings, sealing means and overall design of the bearing houses is a preferred embodiment and not limited to the embodiment shown in this figure.

Figure 16A:
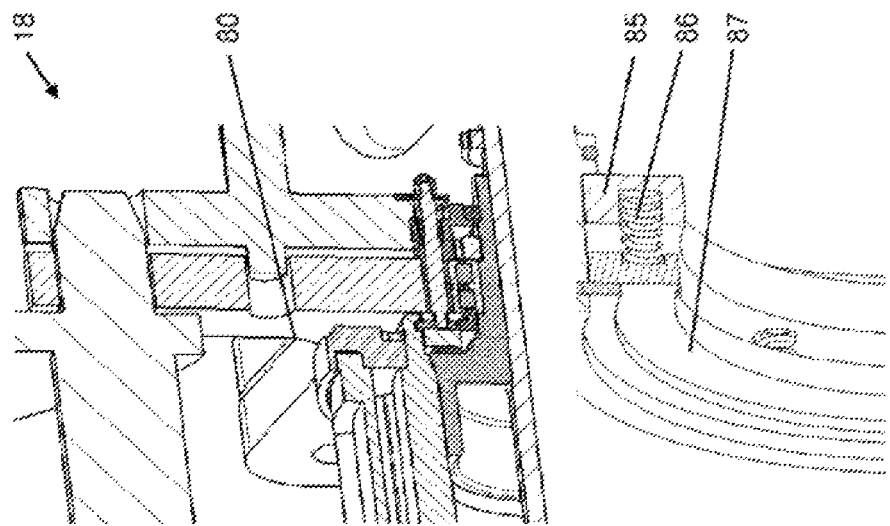
FIG. 16A-B show the fluid control of the food forming apparatus.

FIG. 16A shows an embodiment of the fluid control from the forming apparatus 29 to and/or from the drum 1. The fluid is preferably a gas, more preferably a pressurized gas. The cover 80 at support side 18 will close passages 8 and will rotate together with the drum. This cover prevents also that the fluid will flow from one passage to another passage. In case cover 81 is a separate part as shown in FIG. 16, this cover must be connected to the drum at drive side 19 before the drum will be positioned in the forming apparatus 29. The cover 81 will rotate together with the drum and is used to reduce the dimensions of the passages in the drum to smaller openings to prevent that fluid will enter in more than one passage simultaneously. The number of channels in the cover 81 is preferably in accordance with the number of rows 2' of cavities in the mould drum 1.

Figure 16B:
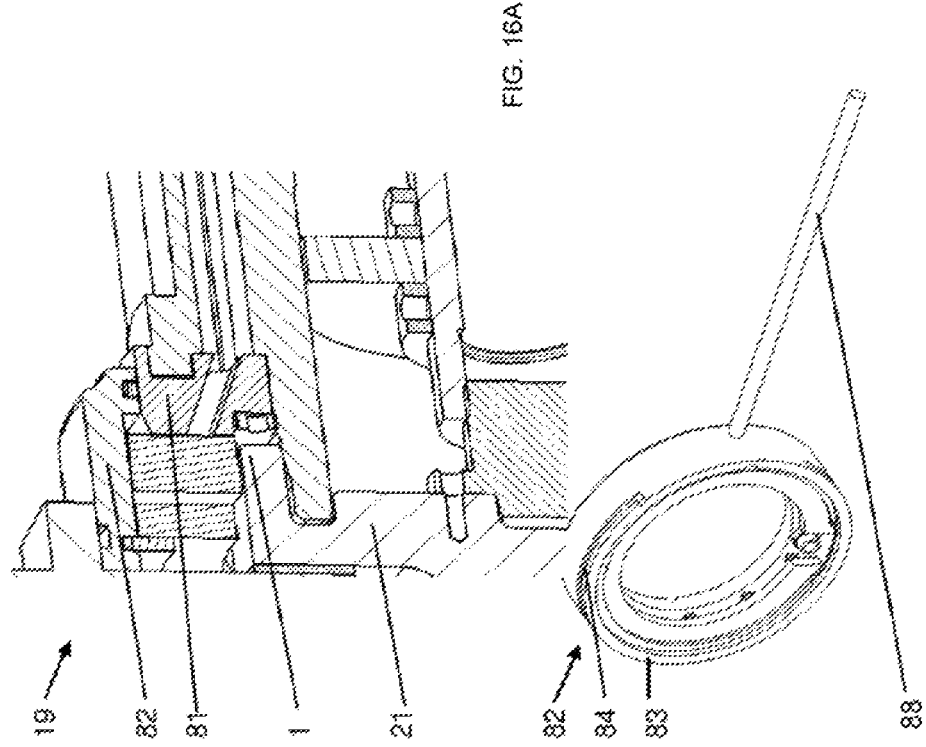

FIG. 16B shows a fluid control member 82 which comprises several parts and can be secured at the drive side 19 of the forming apparatus via fastening means for example a bayonet connection 84 in ring element 83. Other main parts are contact ring 85, spring element 86, counter ring 87, adjusting rod 88. Adjusting rod 88 is an option and can be used to change the discharge position manually. The discharge position is mainly determined by the size and/or shape of the formed products. Preferably the discharge position can be changed via valves to achieve that succeeding rows of discharged products are each with equal distance on the outfeed conveyor the starting moment of the air (fluid) supply to a passage is crucial and this starting moment should be the same at every succeeding row. When changing the speed of the drum this starting moment of air supply in relation to the position of the row of cavities in the drum to be discharged has to be changed too due to the inertia of pressure build up in the passage. Changing this starting moment can be done manually via an Operating Panel but preferably it will be an automatic adjustment related to the speed of the drum. When the speed of the drum increases the starting moment of air supply must occur earlier.

The air supply requires preferably a fast operating valve. Beside the starting moment the valve should preferably delivers in every succeeding row approximately the same amount of air to prevent that formed products will be discharged differently at every succeeding row to prevent that the formed products are not positioned properly in one line on the outfeed conveyor. Additionally a fast closing of the valve will result in less air consumption during production. and/or via a fluid control member which will be driven according settings in an operating panel. Contact ring 85 is in direct contact with cover 81 and is provided with recesses and channels to control the fluid to the drum. Spring element 86, for example air bellows, cylinders, compression springs, etc., will keep contact ring 85 in direct contact with cover 81 to prevent leakage of fluid. The friction between contact ring 85 and cover 81 must be kept as low as possible to prevent that these parts will wear too quickly. This can in a more preferred embodiment be achieved by a smaller contact ring 85 which has only a limited contact surface with cover 81.

In FIG. 17 shows cleaning apparatus 140 which is provided with a hood 160 which can be opened for loading/unloading the mould drum and will be closed during the cleaning process. The hood can be provided with window(s) to inspect the cleaning process. With the movable unit 60, which is provided with production support means 45 and with a mould drum 1, the mould drum is loaded at load side 141 into cleaning apparatus 140. The mould drum is placed into the cleaning apparatus without the production support means. The mould drum can be disconnected from the production support means by lever 55 which will deactivate locking means 56. After the drum has been positioned in cleaning apparatus 140 the movable unit with the production support means will be removed. The production support means 45 will remain on the movable unit and can for example be used to pick another drum out of the storage unit and load this mould drum into forming apparatus 29. When during production of food products the cleaning process of the drum in the cleaning apparatus is finished and production support means 45 are still used in the forming apparatus, this cleaned drum can be unload from the cleaning apparatus by the movable unit together with a second available production support means or with simplified means without built-in bearings.

Cleaning apparatus 140 can be provided with a heating element for heating the fluids used during the cleaning process. In most cases factories have already hot water taps whereby a temperature control valve satisfies and a heating element is not necessary anymore which result in lower costs for the cleaning unit.

To prevent that drum 1 will not be cleaned according the prescribed cleaning process as a result of a lack of cleaning agents, the reservoirs for cleaning agents is preferably provided with level detection. When the cleaning agent levels are too low the cleaning apparatus will not start and this will be showed by an operating panel and/or a signal lamp.

Figure 18B:
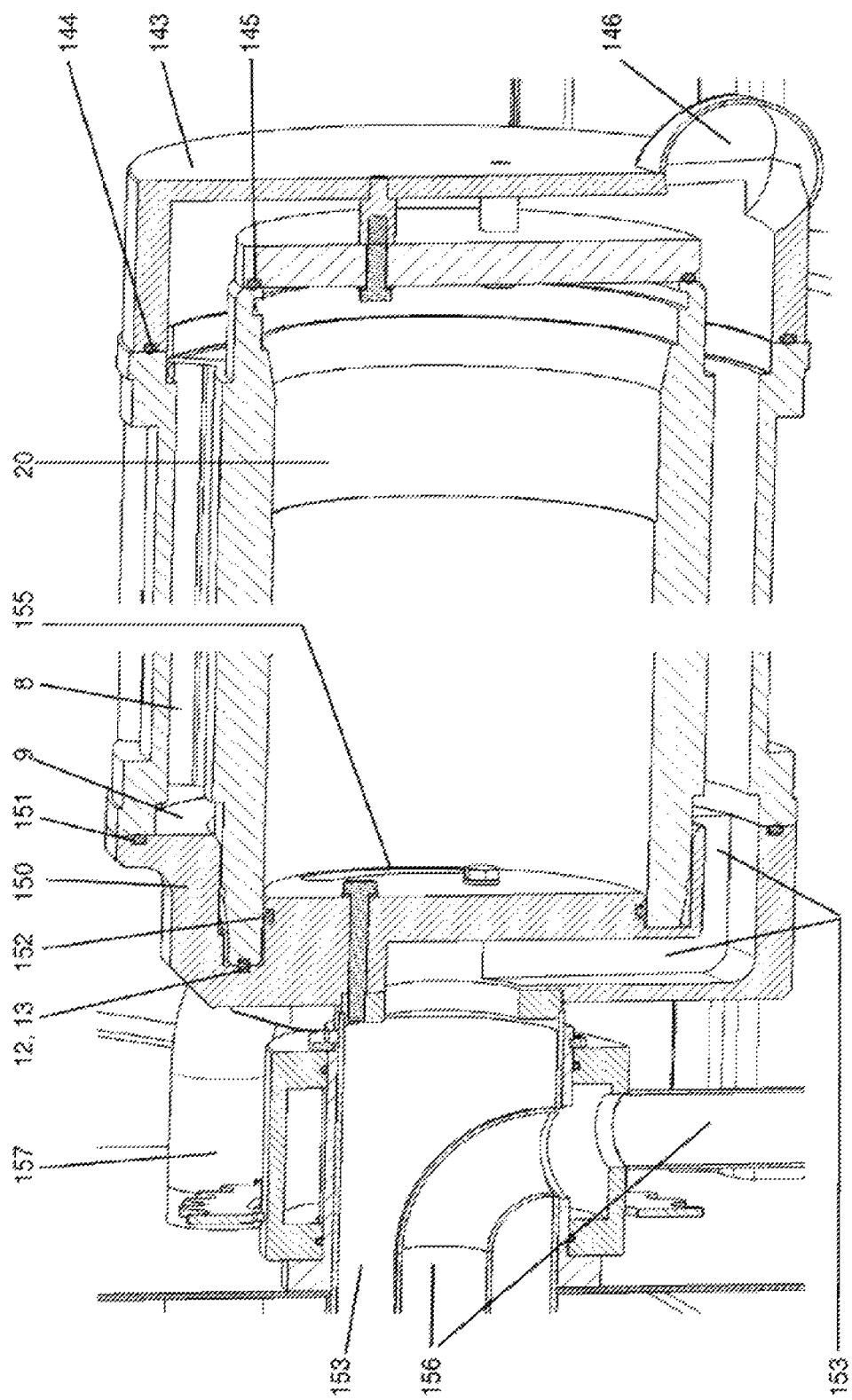

FIGS. 18A and 18B showing a first embodiment of cleaning apparatus. After the drum has been placed into its position in the cleaning apparatus, the cover- and/or fastening means 143 is moved towards the drum, until it is in contact with the respective front end. With fastening means the cover can be secured to the drum. At their contact side with the drum, cover means 143 preferably comprises outside sealing means 144. The cover is preferably further provided with a disc which is provided with inside sealing means 145. Both sealing means preferably ensure that the cleaning fluid will be directed to discharge opening 146. At the distributor side 142 cover means 150 is provided. Both outside sealing means 151 and inside sealing means 152 preferably prevent that cleaning fluid will not be directed to the passages 8 of the mould drum to be cleaned.

FIG. 18B shows one or more fluid channel(s) 153, which are integrated in cover means 150 and which direct the cleaning fluid to the ring shaped distributor 9 of the drum and from there into passages 8. The amount of cleaning liquid that can be provided depends mainly on the dimension of channel 153, the dimension of the distributor, the dimension of the passages in the drum and the porosity of the inserts and the size of the pump.

By designing the form-fit means 7, 12 in a way that the mould drum 1 will fit only in one single rotational position to the cleaning apparatus the channels 53 which open out in the distributor of the drum can be relatively large.

Reference is made to WO2012084215 which is herewith incorporated by reference and is thus part of the present disclosure, describes a preferred cleaning process. During cleaning the mould drum is standstill, i.e. does not rotate and a spray means 161 with a multitude of nozzles rotates via drive means 162 around the drum and is connected to fluid supply channel 156. The run time of the nozzles, the rotation speed of the nozzles and the cleaning fluid to be used can be standard values or can, for example, be chosen depending on the contamination of the drum. In order to clean the passages 8 of the mould drum, discharge opening 146 must be open.

When the porous product cavities 2 have to be cleaned the discharge opening 146 must be closed. Therefore the discharge opening is in connection with a valve (not shown) which will be operated via, for example, a PLC in order to automate the cleaning process.

Fluid supply 157 is preferably directing cleaning fluid to fluid channel 155 and from thereon to the inner opening 20 of the mould drum. Cleaning the inner opening of the drum is an option and can be done either by filling the inner opening with cleaning fluid and let the cleaning fluid work for a certain time. When cover 143 is provided with drive means it is also possible to make use of a continuous flow of cleaning fluid which can be controlled by opening and/or closing cover 143.

Figure 19A:
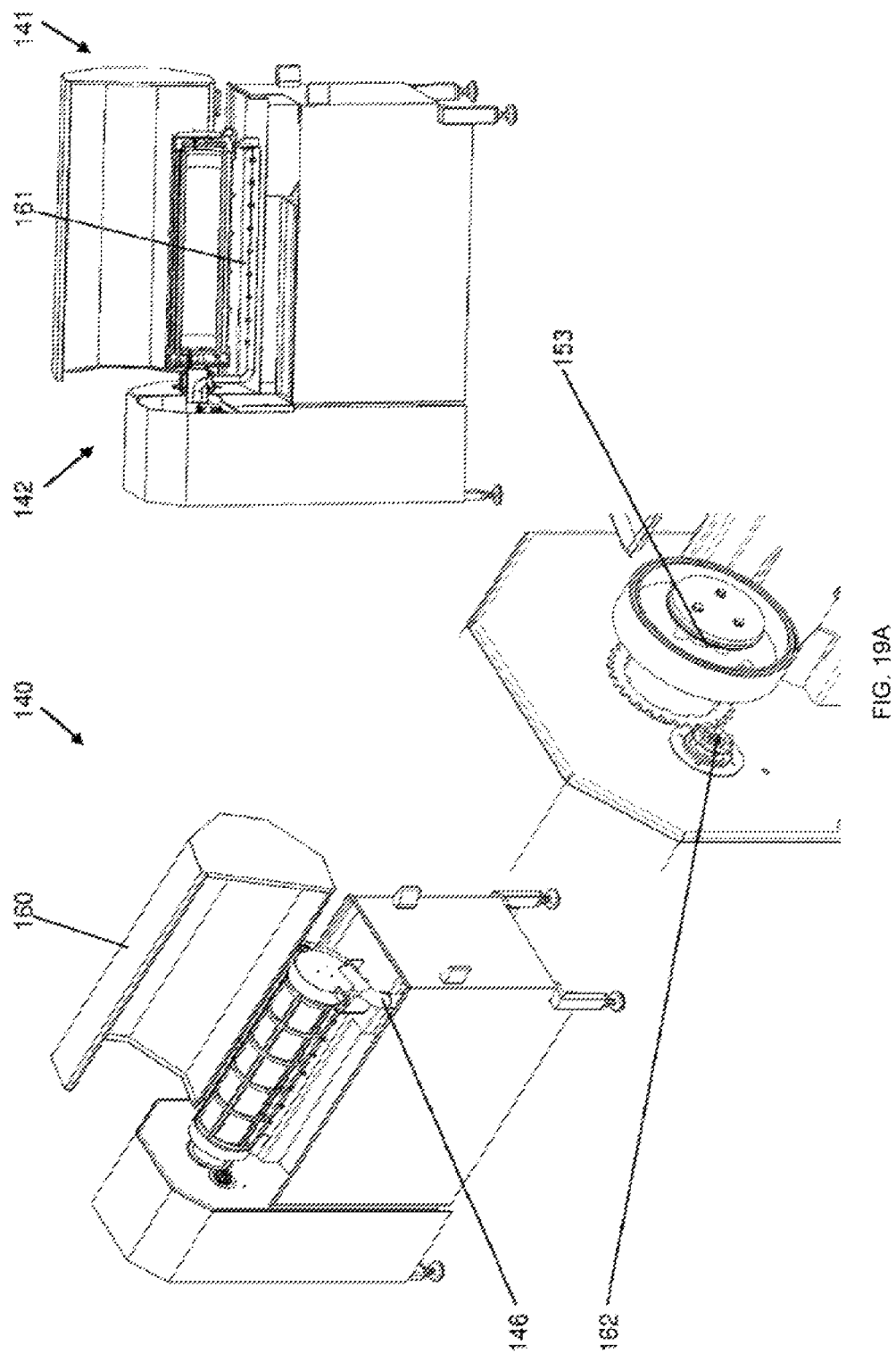

FIGS. 19A and 19B show a second embodiment of cleaning apparatus 140 and is based on the drum described in FIG. 4. Difference with FIG. 18 is that distributor 9 of the drum is integrated in the flange part at second front end 4 of the drum. Due to the design of the distributor a higher volume of cleaning liquid can be circulated in this embodiment. The person skilled in the art understands, that the cleaning fluid is preferably recycled during the cleaning process and that the fluid path may comprise a filter to filter particles out of the cleaning fluid. The cleaning fluid is preferably water. This water can be heated by a heater and/or a chemical substance can be added depending on the contamination of the mould drum. After cleaning of one or more mould drums, the cleaning fluid is preferably, at least partially renewed.

In a third embodiment of cleaning apparatus 140 cover means 150 will be provided without fluid stop 158. The inner opening of the drum can now be cleaned by filling the inner opening with cleaning liquid and let the cleaning fluid soak for a certain time. When cover 143 is provided with drive means it is also possible to make use of a continuous flow of fluid which can be controlled by opening and/or closing cover 143.

Figure 20C:
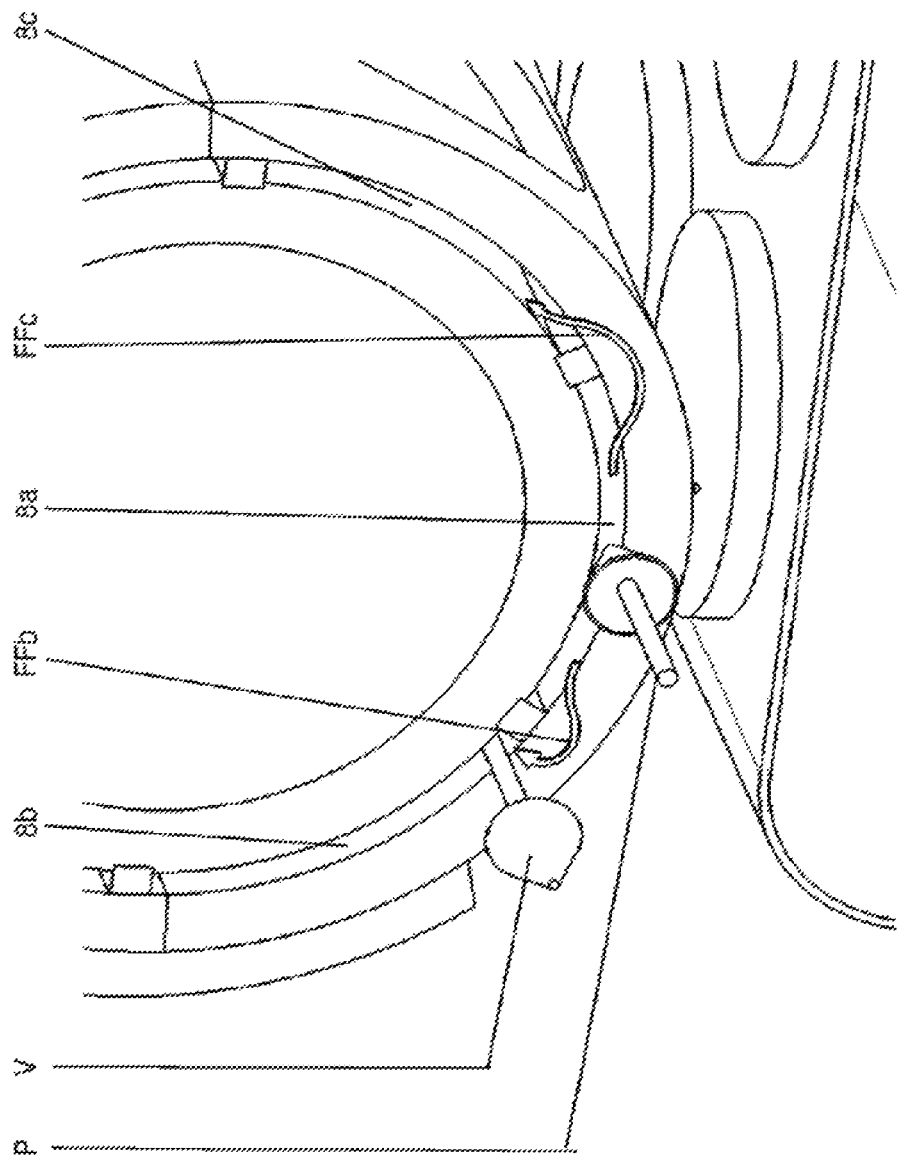

FIG. 20 shows several embodiments of discharging formed food products from the cavities. As depicted in FIG. 20A during rotation of the mould drum, for example a mould drum according to FIG. 7F a gas, here compressed air, will be provided, see arrow P, to passage 8 of the row of cavities which is in the discharge position. The gas will flow via the porous structure also to the adjacent rows of cavities see arrows FF. In FIG. 20B channel 79a is connected to a region with a relatively low pressure for example the ambient pressure but preferably a reduced pressure (vacuum)-connection see arrow V. The reduced pressure in channel 79a will prevent that fluid will flow from channel 8a to the adjacent channel 8b and will prevent a flow of fluid through the porous structure to the product cavities in row 8b by removing fluid which is within the porous structure, see arrow FFb. In this embodiment fluid will still flow to channel 8c, see arrow FFc, this can be prevented by connecting channel 79b also to a region with relatively low pressure. FIG. 20C shows a mould drum, preferably the mould drum according to FIG. 7A-E, where passage 8b is connected to a region with a relatively low pressure to remove the fluid which is within the porous structure. If a fluid flow to the porous structure in row 8c is undesired, this passage can also be connected to a region with low pressure.

The drum preferably comprise identification means (reference sign 12 in FIGS. 3 and 4), the forming apparatus can comprise recognition means (reference sign 13 in FIG. 14A), the cleaning apparatus can comprise recognition means (reference 13 in FIG. 18B and FIG. 19B) and preferably the storage unit too.

In FIG. 3 and FIG. 4 the form-fit means 7 are designed as a multitude, here three cams wherein at least one cam is different in size and/or shape with the result that the drum will fit only in one rotational position in the forming apparatus and/or cleaning apparatus. Especially in the forming apparatus it can be preferable to stop the rotation of the drum always in the same position of the drum. The exact knowledge of the rotational position of the mould drum in the forming apparatus can be utilized to control the filling- and/or discharge process of the forming apparatus.

Identification means 12, preferably an RFID, will be positioned preferably in one cam of form-fit-means 7. As a result, it is possible to recognize which drum is during what timeframe connected to the forming apparatus. During production the exact position of the drum is known and during production as well as during cleaning, a screen with a pre-programmed menu can automatically pop-up and production parameters and cleaning parameters (process parameters, what cleaning fluids are used during what timeframe) can be logged. In a simplified version, instead of identification means 12 the drum can be provided with a cam. The forming apparatus can be provided with a sensor instead of recognition means 13. During production the exact position of the drum is known. The menu for the drum to be used must be selected manually. Production and cleaning parameters can be logged.

When positioning a drum with a simplified ID as for example, an engraved unique number in the forming apparatus the customer put this ID number manually in the operating panel and a menu which contains the operating parameters pops up.

When the drum is positioned in the cleaning apparatus the menu which contains the cleaning parameters and/or the prescribed cleaning procedure pops up after putting the drum's ID manually in the operating panel.

In a preferred embodiment without recognition means in the forming apparatus and cleaning apparatus the drum can be provided with a RFID tag which tag is provided with a memory for storing information on it. When the drum is positioned in the forming apparatus the information on the tag can be read, for example by manual operation into the operating panel/control unit. This information can contain a menu/recipe with operating parameters and/or it contains also information about previous runs of the forming apparatus. After production with the forming apparatus information which was read but also information about the finished production run can be sent and stored automatically on the memory of the tag.

When the drum will be cleaned in the cleaning apparatus the information on the tag can be read, for example by manual operation into the operating panel/control unit, which information can contain a menu/recipe with cleaning parameters and/or the prescribed cleaning procedure for this particular drum and/or information about previous cleaning actions. After cleaning the information which was read but also information about the finished cleaning action can be sent and stored automatically on the memory of the tag.

In this way the customer can always check the history of production runs and/or the history of cleaning actions and can check if a particular drum is cleaned according the prescribed cleaning procedures (dates and times, process, used cleaning fluids).

In all above mentioned embodiments the production menu and/or production history can be stored in the memory of the forming apparatus and the cleaning menu and/or prescribed cleaning procedure and/or cleaning history and/or volume used cleaning fluids can be stored in the memory of the cleaning apparatus but this is not preferable.

LIST OF REFERENCE SIGNS 1 mould drum
2-I-V product cavities
2' row of cavities
3 first front end (left side)
3' end cap at front end 3
4 second front end (right side)
4' end cap at front end 4
6 protection rim
7 form-fit-means
8 passage
9 distributor
10 bottom wall 11 sidewalls
12 identification means
13 recognition means
14 support area insert
15 fluid restriction
16 truncated cone (support side)
17 truncated cone (drive side)
18 support side forming apparatus
19 drive side forming apparatus
20 inner opening drum
21 driveshaft forming apparatus
22 cone driveshaft forming apparatus
23 frame/frame member forming apparatus
24 pilot pin forming apparatus
25 threaded part driveshaft
29 forming apparatus
31 hollow shaft within gearbox
32 bearing house (drive side)
33 bearing (drive side)
34 drive motor
35 gearbox
45 production support means
46 bearing house (support side)
47 bearing (support side)
51 support structure
52 spindle
53 spindle nut (part of spindle 52)
54 support disc
55 lever
56 locking means
57 coupling head (part of spindle 52)
58 tension nut
59 cone bearing house
60 movable unit
61 align mechanism
62 support frame
63 frame movable unit
64 height adjustment
65 knob
66 positioning means
67 adapter
68 filling, insert
69 outer member mold, outer circumference of the sinter press
69a inner mould member
70 porous base, porous layer, porous member
71 layer
72 mold
72a form fit means, recess in rib 76
72b permeable support structure
72c recess in rib 76 to accommodate wire mesh
72d weld to connect wire mesh against rib
73 bonding location
74 recess in porous inserts 78
75 inner cylinder, tube
76 rib
77 inner member
77a outer member
78 (partially) porous insert, (partially) porous segment, (partially) porous member
79 channel
80 cover support side
81 cover drive side
82 fluid control member
83 ring element
84 bayonet connection
85 contact ring
86 spring element
87 counter ring
88 adjusting rod
90 gap, groove
91 indentation, notch
92 base
100 mass supply system
101 food mass feed member
140 cleaning apparatus
141 load side cleaning apparatus
142 distributor side cleaning apparatus
143 cover-means, fastening-means
144 outside sealing means for cover-means 143
145 inside sealing means for cover-means 143
146 discharge opening
150 cover means
151 outside sealing means for cover-means 150
152 inside sealing means for cover-means 150
153 fluid channel to distributor
155 fluid channel to inner opening drum
156 fluid supply spray means
157 fluid supply inner opening drum
158 fluid stop
160 hood
161 spray means
162 drive-means for spray means 161
163 inlet for the discharge fluid and/or cleaning fluid, slot

The invention claimed is:

1. A food forming drum comprising:
a multitude of rows of product cavities, each of the multitude of rows comprising one or a multitude of product cavities,
wherein the one or multitude of product cavities are provided as one or more at least partially porous members made from a porous material with interconnecting pores, which are beared rotationally at a forming apparatus, and
wherein the food forming drum comprises a truncated cone at least at one of its front ends.

2. The food forming drum according to claim 1, wherein the one or more at least partially porous members are directly or indirectly connected to an inner cylinder at at least one bonding location,
wherein the pores at a surface of the one or more at least partially porous members, in the bonding location are at least partially closed.

3. The food forming drum according to claim 1, wherein the pores at a surface of the one or more at least partially porous members adjacent to at least one of the front ends of the food forming drum are at least partially closed.

4. The food forming drum according to claim 1, wherein the food forming drum comprises an inner cylinder and at least one rib between the inner cylinder and the one or more at least partially porous members,
wherein the at least one rib is connected to the inner cylinder by a form- and/or force-fit or by an adhesive bond.

5. The food forming drum according to claim 1, wherein the food forming drum comprises at least two form-fit-means to rotate the food forming drum.

6. The food forming drum according to claim 5, wherein a shape of one of the form-fit-means is different than a shape of another one of the form-fit means.

7. The food forming drum according to claim 1, wherein the one or more at least partially porous members are directly or indirectly connected to an inner member at at least one connecting region, that is made by an adhesive connection and/or by form- and/or force- and/or friction-fit-means.

8. The food forming drum according to claim 7, wherein the form- and/or force- and/or friction-fit-means extend through an entire axial length of the food forming drum.

9. The food forming drum according to claim 7, wherein each of the one or more at least partially porous members is fixed by two or more form- and/or force- and/or friction-fit-means.

10. The food forming drum according to claim 1, wherein the food forming drum comprises end caps, and
> wherein the end caps comprise form-fit-means and/or friction-means to rotate the food forming drum and/or an inlet and/or outlet for a discharge fluid and/or cleaning fluid.

11. A food forming apparatus comprising:
the food forming drum according to claim 1, and
a cone that is configured to cooperate with the truncated cone at the front ends of the food forming drum.

12. The food forming apparatus according to claim 11, wherein the cone at the apparatus is part of a drive shaft.

* * * * *